(12) United States Patent
Uchiyama et al.

(10) Patent No.: US 8,203,676 B2
(45) Date of Patent: Jun. 19, 2012

(54) RETARDATION FILM, LAMINATED POLARIZING FILM, AND LIQUID CRYSTAL DISPLAY DEVICE

(75) Inventors: Akihiko Uchiyama, Hino (JP); Yuhei Ono, Hino (JP); Jyuhou Matsuo, Hino (JP); Satoshi Kitazawa, Hino (JP)

(73) Assignee: Teijin Limited, Osaka (JP)

( * ) Notice: Subject to any disclaimer, the term of this patent is extended or adjusted under 35 U.S.C. 154(b) by 226 days.

(21) Appl. No.: 12/602,595

(22) PCT Filed: May 30, 2008

(86) PCT No.: PCT/JP2008/060072
§ 371 (c)(1),
(2), (4) Date: May 13, 2010

(87) PCT Pub. No.: WO2008/146924

PCT Pub. Date: Apr. 12, 2008

(65) Prior Publication Data

US 2010/0283949 A1    Nov. 11, 2010

(30) Foreign Application Priority Data

Jun. 1, 2007  (JP) ................................. 2007-147056
Jun. 8, 2007  (JP) ................................. 2007-153235

(51) Int. Cl.
G02F 1/1335 (2006.01)
(52) U.S. Cl. ........................................................ 349/117
(58) Field of Classification Search .................... None
See application file for complete search history.

(56) References Cited

U.S. PATENT DOCUMENTS

| | | | |
|---|---|---|---|
| 5,196,953 A | 3/1993 | Yeh et al. | |
| 5,245,456 A | 9/1993 | Yoshimi et al. | |
| 5,472,538 A | 12/1995 | Minakuchi et al. | |
| 5,751,388 A | 5/1998 | Larson | |
| 6,236,439 B1 | 5/2001 | Saiki et al. | |
| 7,057,689 B2* | 6/2006 | Terashita et al. | 349/117 |
| 7,336,857 B2* | 2/2008 | Kawahara et al. | 385/11 |
| 7,736,708 B2* | 6/2010 | Matsunaga et al. | 428/1.3 |
| 2005/0200792 A1* | 9/2005 | Jeon et al. | 349/141 |
| 2006/0192913 A1 | 8/2006 | Shutou et al. | |
| 2007/0134442 A1* | 6/2007 | Matsunaga et al. | 428/1.3 |
| 2007/0182885 A1* | 8/2007 | Egi et al. | 349/96 |

FOREIGN PATENT DOCUMENTS

| | | |
|---|---|---|
| CN | 1383495 A | 12/2002 |
| CN | 1748159 A | 3/2006 |
| JP | 02-160204 A | 6/1990 |

(Continued)

Primary Examiner — Tina Wong
(74) Attorney, Agent, or Firm — Sughrue Mion, PLLC

(57) ABSTRACT

The present invention provides a retardation film which can remarkably improve the controllability of retardation, and can also sufficiently control the wavelength dependency of retardation. The retardation film of the present invention can achieve a widening of the viewing angle at a high degree, when it is applied to a liquid crystal display device. Further, the present invention provides a laminated polarizing which comprises the retardation film and enables widening the viewing angle. Furthermore, the present invention provides a liquid crystal display device having high performance, especially a widened viewing angle. The retardation film of the present invention comprises a structural body which simultaneously has form birefringence and molecular-orientation birefringence. Specifically, the retardation film comprises a periodic structure (13) having a unit of at least two layers (11, 12) having different average refractive indices from each other, and at least one of the at least two layers is a layer having optical anisotropy due to molecular-orientation birefringence.

27 Claims, 6 Drawing Sheets

FOREIGN PATENT DOCUMENTS

| | | |
|---|---|---|
| JP | 03-024502 A | 2/1991 |
| JP | 04-127103 A | 4/1992 |
| JP | 05-157911 A | 6/1993 |
| JP | 07-230007 A | 8/1995 |
| JP | 11-502036 A | 2/1999 |
| JP | 11-305039 A | 11/1999 |
| JP | 2003-294948 A | 10/2003 |
| JP | 2007-108436 A | 4/2007 |
| WO | 96/31794 A1 | 10/1996 |

* cited by examiner

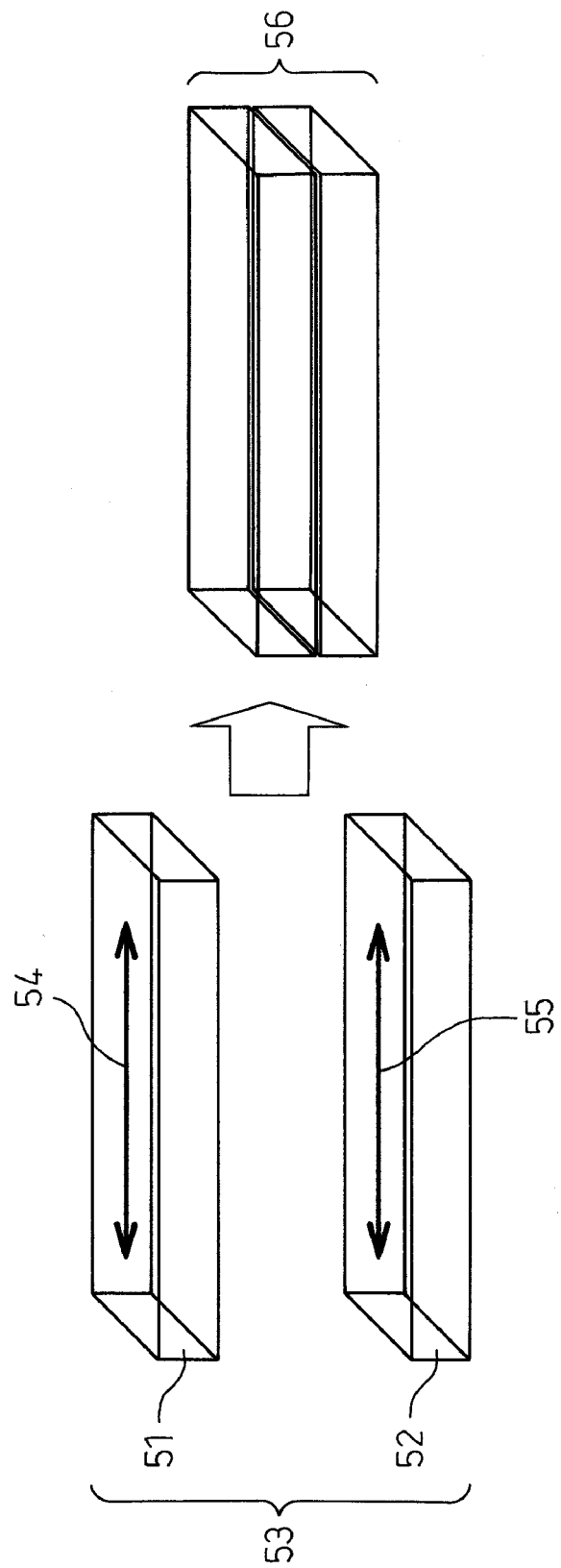

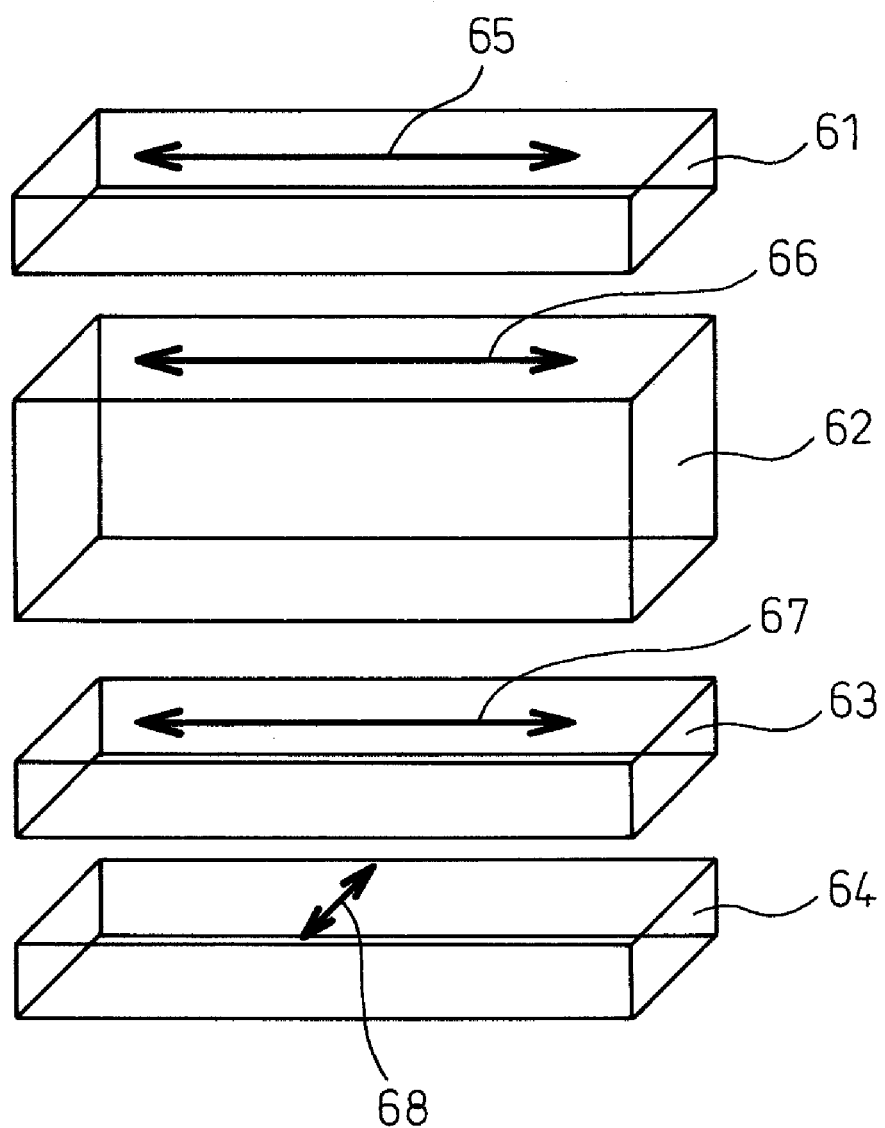

RETARDATION FILM, LAMINATED POLARIZING FILM, AND LIQUID CRYSTAL DISPLAY DEVICE

CROSS REFERENCE TO RELATED APPLICATION

This application is a National Stage of International Application No. PCT/JP2008/060072 filed May 30, 2008, the contents of which are incorporated herein by reference in their entirety.

TECHNICAL FIELD

The present invention relates to various kinds of optical devices, especially a retardation film preferably used for a liquid crystal display device, a laminated polarizing film utilizing the retardation film, and a liquid crystal display device.

BACKGROUND ART

Conventionally, a film having optical anisotropy is widely used as a retardation film, an optical compensation film, or a viewing angle widening film, etc., and has remarkably contributed to the improvement of the optical property of a liquid crystal display device. In this specification, all films, which can be used for various kinds of optical devices and have optical anisotropy, such as a retardation film, an optical compensation film, or a viewing angle widening film, are defined as "a retardation film".

Regarding a retardation film, a variety of proposals have already been made in order to improve various kinds of required properties. Particularly, a technique for improving the viewing angle of a liquid crystal display device is important for a retardation film, and many proposals have been made for this purpose.

Patent documents 1 to 4, for example, describe the controlling of principal refractive indices in the three directions perpendicular to each other, and parallel or perpendicular to a plane of a retardation film ($n_x$, $n_y$, and $n_z$, referred to as three-dimensional refractive indices hereinafter). Specifically, Patent documents 1 to 4 describe that the principal refractive index in the thickness direction ($n_z$) is larger than one of the two in-plane principal refractive indices ($n_x$, $n_y$) and is smaller than the other one. When the principal refractive indices in the three directions ($n_x$, $n_y$, $n_z$) are controlled as described above, the viewing angle dependency of retardation of a retardation film can be controlled, and as a result, the viewing angle of a liquid crystal display device can be widened.

However, the methods described in Patent documents 1 to 4 utilize birefringence due to the orientation of a polymer, which constitutes a retardation film (referred to as molecular-orientation birefringence hereinafter), thus the properties of the resulting retardation film are limited. Also, in order to make the principal refractive index in the thickness direction ($n_z$) have an intermediate value between the two in-plane principal refractive indices ($n_x$, $n_y$), a very complex stretching method has to be adopted. Also, because a very complex stretching method is applied in order to obtain a retardation film having such principal refractive indices, there are problems that the precise control of the retardation value is difficult and also the wavelength dependency of retardation cannot be sufficiently controlled.

As another method for achieving the wide viewing angle of a liquid crystal display device, a method of adhering plural retardation films with an adhesive, etc., to achieve the desired effect has been proposed. Patent document 5, for example, describes a technique for improving the viewing angle dependency of a retardation film by laminating a positive uniaxial optical film having an optical axis within a plane and a negative uniaxial optical film having an optical axis within a plane. According to the method of Patent document 5, the retardation can be controlled without adopting a complex stretching method.

However, the method described in Patent document 5 is a method of utilizing only molecular-orientation birefringence, thus the properties of the resulting retardation film are limited. Also, because the obtained optical properties are the result of a mixture of optical properties, the positive uniaxial optical film and the negative uniaxial optical film, it is difficult to freely control the optical properties, especially the wavelength dispersion of retardation.

Furthermore, as another method for achieving the wide viewing angle of a liquid crystal display device, Patent document 6 describes a method for exhibiting birefringence due to retardation between the in-plane direction and the thickness direction (referred to as form birefringence, hereinafter), wherein the method includes alternately laminating two groups of isotropic layers, which are made of inorganic materials having different reflective indices and do not express retardation as a single layer, to form a periodic structure. The laminated retardation film in Patent document 6 is intended to apply a negative C plate to a liquid crystal display device by utilizing form birefringence (the negative C plate is a plate having the same two in-plane principal refractive indices ($n_x$, $n_y$) and the refractive index in the normal direction to the surface ($n_z$) smaller than the two in-plane principal refractive indices ($n_x$, $n_y$)). Patent document 6 describes an example wherein the viewing angle of a liquid crystal display device is improved by applying the film to a twist nematic (TN) liquid crystal display device.

However, the method described in Patent document 6 is a method utilizing only form birefringence, thus the properties of the resulting retardation film are limited. Also, in the method described in Patent document 6, only a multilayer structure having negative uniaxial anisotropy can be obtained.

As for a retardation film used in the field of optics, further improvement of the properties and more advanced controllability of retardation are strongly required, which continues to this day.

[Patent document 1] Japanese Unexamined Patent Publication No. 02-160204
[Patent document 2] Japanese Unexamined Patent Publication No. 04-127103
[Patent document 3] Japanese Unexamined Patent Publication No. 05-157911
[Patent document 4] Japanese Unexamined Patent Publication No. 07-230007
[Patent document 5] Japanese Unexamined Patent Publication No. 03-024502
[Patent document 6] U.S. Pat. No. 5,196,953

DISCLOSURE OF INVENTION

Technical Problem

The present invention is made in view of the above prior art. One object of the present invention is to provide a retardation film which can control the retardation with advanced controllability and can also sufficiently control the wavelength dependency of retardation, and thereby can fulfill an advanced level of wide viewing angle when applied to a liquid crystal display device.

Another objective of the present invention is to provide a laminated polarizing film which can achieve a wide viewing angle, and a liquid crystal display device whose viewing angle is considerably widened.

Solution to Problem

As a result of extensive research to achieve the above object, the inventors of the present invention have made the present invention as described below.

The retardation film of the present invention comprises a periodic structure which has a unit of at least two layers having different average refractive indices from each other, the periodic structure exhibits form birefringence (also known as structure birefringence), and at least one layer of the at least two layers is a layer (A) having optical anisotropy due to molecular-orientation birefringence.

The laminated polarizing film of the present invention comprises a laminate of the retardation film of the present invention and a polarizing film.

The liquid crystal display device of the present invention is provided with the retardation film of the present invention.

Advantageous Effects of Invention

The retardation film of the present invention utilizes both molecular-orientation birefringence and form birefringence simultaneously and thus has extremely improved controllability of retardation. In other words, the retardation film of the present invention has a novel structure enabling retardation property which could not be achieved or was difficult to be achieved in the past, and also a wide range of requirements desired for a retardation film.

Therefore, according to the retardation film of the present invention, for example, the principal refractive index in the thickness direction ($n_z$) can be an intermediate value between the two in-plane principal refractive indices ($n_x$, $n_y$) without conducting a complex orientation process.

Also, according to the retardation film of the present invention, for example, the wavelength dependency of retardation can be sufficiently controlled by simultaneously utilizing both molecular-orientation birefringence and form birefringence. In other words, according to the retardation film of the present invention, the in-plane retardation value (R ($\lambda$) value) and the retardation value in the thickness direction (Rth ($\lambda$) value) can be controlled independently.

Also, according to the retardation film of the present invention, when at least one layer having negative optical anisotropy and at least one other layer having approximate optical isotropy are used as layers constituting a periodic structure to exhibit form birefringence, optical anisotropy difficult to be achieved in the past is easily achieved and the controllability of retardation is improved, because the number of design parameters is decreased.

Also, according to the retardation film of the present invention, when at least two layers having negative optical anisotropies of different average refractive indices from each other are used as layers constituting a periodic structure to exhibit form birefringence, a larger in-plane optical anisotropy is easily achieved by the molecular-orientation birefringence, and the three-dimensional refractive indices of the periodic structure can be more freely controlled.

In other words, for example, according to the retardation film of the present invention, when two layers having negative optical anisotropies exist as a unit, and the slow axes of both are set approximately parallel, the in-plane optical anisotropies can be accumulated. As a result, a larger in-plane optical anisotropy due to molecular-orientation birefringence can be achieved, and the three-dimensional refractive indices of the periodic structure can be more freely controlled.

The retardation film of the present invention can provide various optical properties. Therefore, when the retardation film of the present invention is laminated with a polarizing film, the obtained laminated polarizing film can have a high degree of the viewing angle widening effect.

Also, when the retardation film of the present invention is combined with a liquid crystal cell, the obtained liquid crystal display device can have remarkably improved display properties, especially remarkably improved viewing angle property.

BRIEF DESCRIPTION OF DRAWINGS

FIG. 5 is a schematic view of a laminated polarizing film of the present invention.

FIG. 6 is a schematic view of a liquid crystal display device of the present invention.

BEST MODE FOR CARRYING OUT THE INVENTION

Retardation Film

Figure 1:
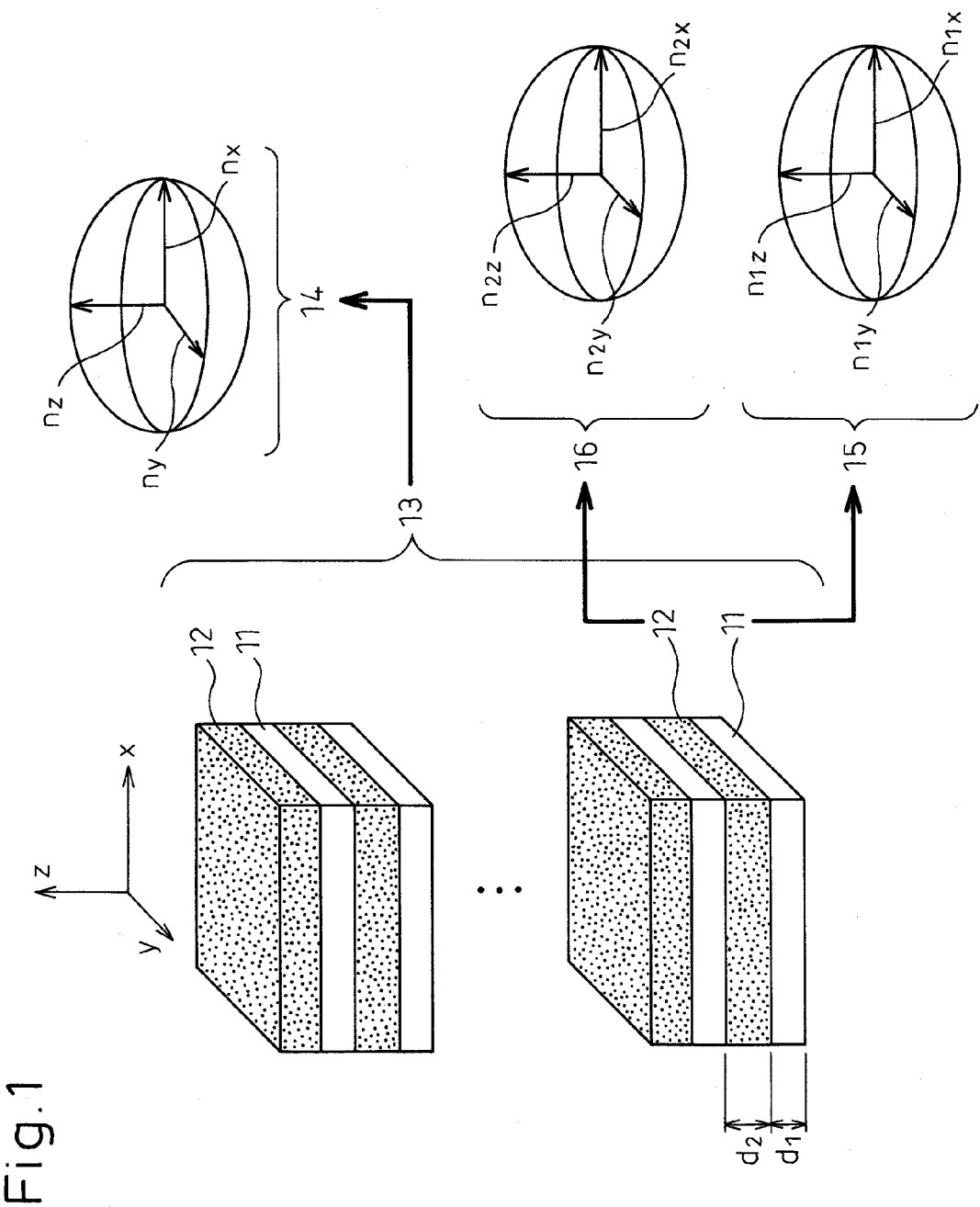
FIG. 1 is a schematic view of a periodic structure and an index ellipsoid of the retardation film of the present invention.

The retardation film of the present invention simultaneously utilizes both form birefringence and molecular-orientation birefringence. Specifically, the retardation film of the present invention comprises a periodic structure which has a unit of at least two layers having different average refractive indices from each other, the periodic structure exhibits form birefringence, and at least one layer of the at least two layers is a layer (A) having optical anisotropy due to molecular-orientation birefringence.

Particularly, the retardation film of the present invention comprises a periodic structure which has a unit of at least two layers having different average refractive indices from each other, the periodic structure exhibits form birefringence, at least one layer of the at least two layers is a layer (a) having negative optical anisotropy due to molecular-orientation birefringence, and at least one layer of the at least two layers is a layer (i) having approximate optical isotropy.

Also, particularly, the retardation film of the present invention comprises a periodic structure which has a unit of at least two layers having different average refractive indices from each other, the periodic structure exhibits form birefringence, at least one layer of the at least two layers is a layer (a) having negative optical anisotropy due to molecular-orientation birefringence, and at least one layer of the at least two layers is a layer (b) having negative optical anisotropy due to molecular-orientation birefringence.

In order to exhibit form birefringence effectively, the film thickness of each layer has to be sufficiently smaller than the wavelength of light, and as a result, in the retardation film of the present invention, the internal reflection caused by the periodic structure does not substantially exist in the visible light range.

In the present invention, all of the films which can be used for various kinds of optical devices and have optical anisotropy, such as a retardation film, an optical compensation film, and a viewing angle widening film are defined as "a retardation film".

[Comparison with Conventional Retardation Film]

The thickness of each layer, which constitutes a unit in the periodic structure of the retardation film of the present invention, has to be sufficiently smaller than the wavelength of visible light in order to exhibit form birefringence, and also not to substantially cause the internal reflection by the multilayer structure in the visible light range. The thickness of each layer, which constitutes a unit in the periodic structure of the retardation film of the present invention, is very thin, thus the retardation film of the present invention can exert its function as a retardation film only by having a periodic structure of the layers.

Although a plurality of retardation films are laminated in some conventional retardation films, the conventional retardation films do not control the optical anisotropy at a high degree by utilizing both form birefringence and molecular-orientation birefringence simultaneously. Therefore, the design concept is completely different between the retardation film of the present invention and the conventional retardation films in which several retardation films are merely laminated.

[Molecular-Orientation Birefringence and Form Birefringence]

The "molecular-orientation birefringence" in the present invention is the difference in the refractive indices by the direction of the propagation of light, which is exhibited by the orientation or alignment of molecules or atoms, i.e. birefringence which is optical anisotropy exhibited by the orientation of a polymer, a liquid crystal, etc. or by the orientation of a crystalline material, etc.

When a medium is represented by an index ellipsoid and the three-dimensional refractive indices $n_x$, $n_y$ and $n_z$, optical anisotropy due to molecular-orientation birefringence means that at least one refractive index of the three refractive indices differ from the other two refractive indices. In a retardation film, when the values of $n_x$ and $n_y$ (in-plane refractive indices of the three refractive indices) differ from each other, this means that molecular-orientation birefringence exists within a plane.

On the other hand, the "form birefringence" differs from the above molecular-orientation birefringence, and means optical anisotropy exhibited by a repeated structure made of media having different refractive indices from each other and sufficiently smaller thickness than the wavelength of light regardless an orientation at the molecular or atomic level.

In the present invention, in order to exhibit form birefringence, it is required to form a periodic structure comprising at least two layers having different average refractive indices from each other. Furthermore, in the periodic structure, it is preferable that the interfaces between the layers having different refractive indices are approximately parallel to the film surface.

[Principle of Exhibition of Optical Anisotropy of Retardation Film]

The principle of the expression of the optical anisotropy of the retardation film of the present invention is described as follows.

In the present invention, in the case of a uniaxial retardation film, the direction of the extraordinary refractive index in an index ellipsoidal approximation is defined as an "optical axis" direction. On the other hand, in the biaxial case, an "optical axis" is not defined in the present invention. In any case, the direction of the maximum refractive index within a plane of a medium is referred to as a "slow axis".

The retardation film of the present invention uses form birefringence and molecular-orientation birefringence in combination. For this reason, the structure of the retardation film of the present invention markedly differs from that of conventional retardation films. In the structure of the retardation film of conventional retardation films, even though the portion having form birefringence and the portion having molecular-orientation birefringence may exist simultaneously, these portions are optically independent and optically work as a mere combination of two optical anisotropic media. In the retardation film of the present invention, form birefringence and molecular-orientation birefringence are highly merged, and as a result, the obtained periodic structure is optically one optical anisotropic medium. This can be achieved for the first time by using the periodic structure of the present invention.

The retardation film of the present invention is one optical anisotropic medium, thus when the observation wavelength is determined, the optical anisotropy can be represented only by the three three-dimensional refractive indices ($n_x$, $n_y$, $n_z$), and these three-dimensional refractive indices can be freely controlled. Therefore, a retardation film having a property, which was difficult to obtain in the past or could not be obtained in the past, can be controllably obtained.

Figure 2:
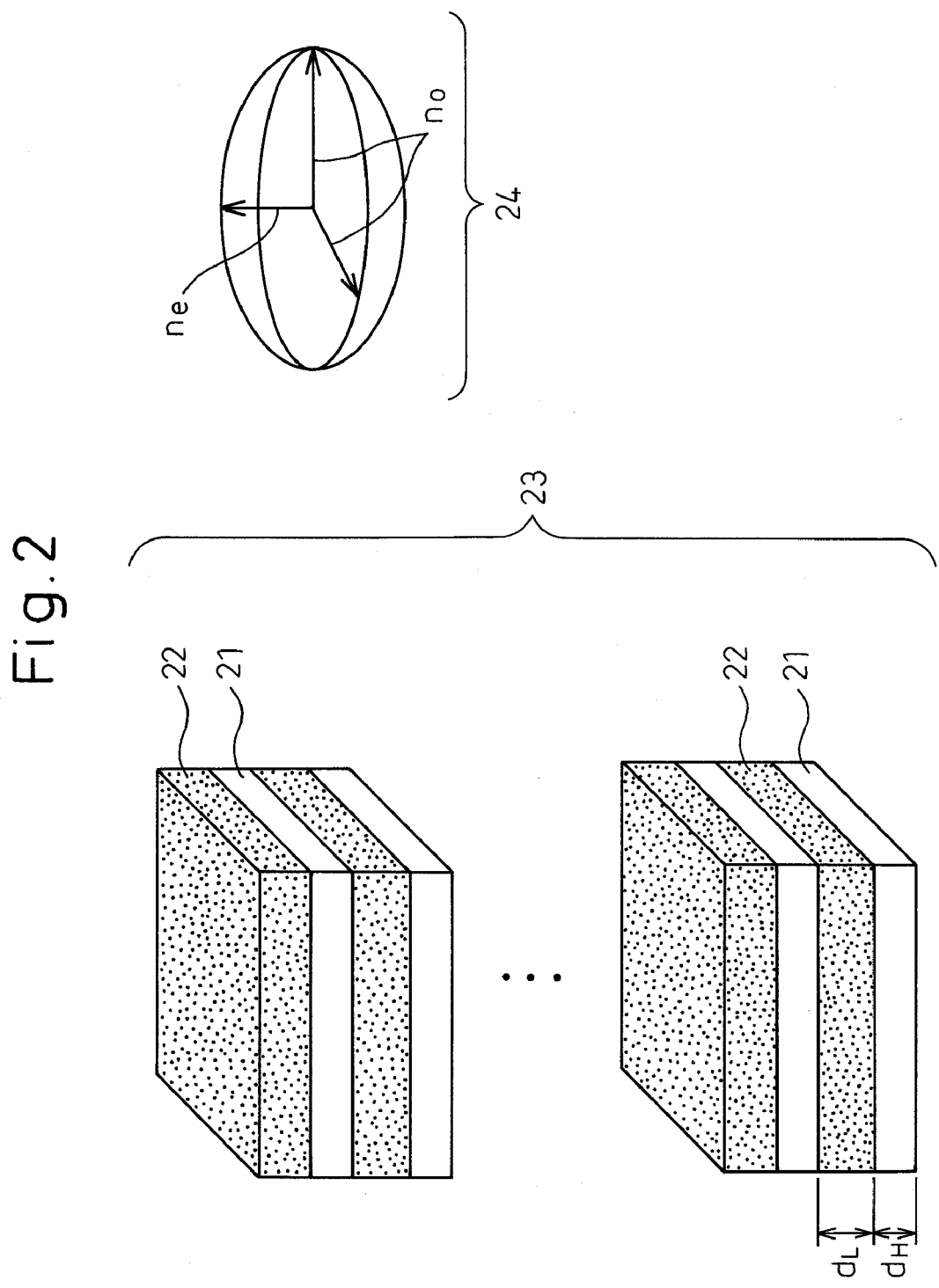
FIG. 2 is a schematic view of a periodic structure and an index ellipsoid of a conventional retardation film having only optically isotropic layers.

For a comparison with the present invention, the multilayer structure described in the above Patent document 6 is explained. FIG. 2 is a schematic view of the periodic structure described in Patent document 6. The multilayer structure in Patent document 6 has a structure in which each layer is optically isotropic. In FIG. 2, 21 is a layer H (an optically isotropic layer), 22 is a layer L (an optically isotropic layer), 23 is a periodic structure comprising only optically isotropic layers, and 24 is an index ellipsoid of the multilayer structure 23.

The refractive index anisotropy of the optical anisotropic medium having the constitution shown in FIG. 2 is represented by the following Formulae (7) and (8). The formulae are based on "effective medium approximation theory". This theory is that, in a structure comprising a repeated multilayer of layers having sufficiently smaller thickness than the wavelength of light, the refractive indices are averaged. When a periodic structure comprises two layers having different refractive indices, the film thickness of each layer is sufficiently smaller than the wavelength of light, and the interfaces between each layer are parallel to the surface of the medium, the following formulae (7) and (8) are known to be true.

$$n_o^2 = \frac{d_H}{d_H + d_L} n_H^2 + \frac{d_L}{d_H + d_L} n_L^2 \qquad (7)$$

$$\frac{1}{n_e^2} = \frac{d_H}{d_H + d_L} \frac{1}{n_H^2} + \frac{d_L}{d_H + d_L} \frac{1}{n_L^2} \qquad (8)$$

The $n_o$ and $n_e$ are the ordinary refractive index and the extraordinary refractive index, respectively, of the medium 23 in FIG. 2.

24 of FIG. 2 represents an index ellipsoid of the medium 23, and the directions of $n_o$ and $n_e$ shown in the index ellipsoid 24 correspond to the directions of $n_o$ and $n_e$ of the medium 23. The $d_H$, $d_L$, $n_H$, and $n_L$ represent the film thickness 21 of the layer H, the film thickness 22 of the layer L, the refractive index of the layer H, and the refractive index of the layer L, respectively. It is mathematically obvious from formulae (7) and (8) that the following formula (9) is true under the condition that the refractive indices of the two layers differ from each other.

$$n_o > n_e \quad (9)$$

Formula (9) represents that the medium 23 in FIG. 2 exhibits negative uniaxial anisotropy.

Next, FIG. 1 shows a schematic view of a periodic structure of the retardation film of the present invention. In FIG. 1, 11 is a first layer, 12 is a second layer, 13 is a periodic structure of the retardation film of the present invention, two layers 11 and 12 having different average refractive indices from each other are alternately laminated, 14 is an index ellipsoid of the periodic structure 13, 15 is an index ellipsoid of the first layer, and 16 is an index ellipsoid of the second layer.

In the periodic structure of the present invention as shown in FIG. 1, the optical anisotropies of any media constituting the layers can be approximated by index ellipsoids, and when the effective medium approximation can be applied, the three-dimensional refractive indices of the periodic structure can be calculated from the following formulae (10) to (12), which are extensions from Formulae (7) and (8).

$$n_x^2 = \frac{d_1}{d_1 + d_2} n_{1x}^2 + \frac{d_2}{d_1 + d_2} n_{2x}^2 \quad (10)$$

$$n_y^2 = \frac{d_1}{d_1 + d_2} n_{1y}^2 + \frac{d_2}{d_1 + d_2} n_{2y}^2 \quad (11)$$

$$\frac{1}{n_z^2} = \frac{d_1}{d_1 + d_2} \frac{1}{n_{1z}^2} + \frac{d_2}{d_1 + d_2} \frac{1}{n_{2z}^2} \quad (12)$$

wherein, $n_x$, $n_y$, $n_z$: the three-dimensional refractive indices of the periodic structure 13 in FIG. 1, and the three-dimensional refractive indices in the directions of the x axis, y axis, and z axis, respectively, of the orthogonal coordinate of the index ellipsoid 14;

x axis direction: the in-plane slow axis direction when the optical anisotropy exists within a plane of the periodic structure 13;

y axis direction: the direction perpendicular to the x axis direction within a plane of the periodic structure 13 (the flat plane constituted by the x axis and y axis is parallel to the surface of the periodic structure 13);

z axis direction: the normal direction of a plane of the periodic structure 13;

$n_{1x}$, $n_{1y}$, $n_{1z}$: the three-dimensional refractive indices of the layer 11 having negative optical anisotropy shown in the index ellipsoid 15 in FIG. 1, in the directions of the x axis, y axis and z axis, respectively, of the orthogonal coordinate (when the optical anisotropy exists within a plane of the layer 11, the slow axis, which is an axis of the direction of the maximum refractive index, is defined to be parallel to either the x axis or y axis);

$n_{2x}$, $n_{2y}$, $n_{2z}$: the three-dimensional refractive indices of the layer 12 having negative optical anisotropy or approximate optical isotropy shown in the index ellipsoid 16 in FIG. 1, in the directions of the x axis, y axis and z axis, respectively, of the orthogonal coordinate (when the optical anisotropy exists within a plane of the layer 12, the slow axis, which is an axis of the direction of the maximum refractive index, is defined to be parallel to either the x axis or y axis);

$d_1$, $d_2$: the film thicknesses (nm) of the layers 11 and 12, respectively.

In the present invention, unless not otherwise specified, the definition of the three-dimensional refractive indices of one periodic structure is as described above.

In other words, as indicated in Formulae (10) to (12), in the retardation film of the present invention, the optical anisotropy of the periodic structure is decided by both the layered structure and molecular-orientation birefringence of each layer. Therefore, according to the present invention, by utilizing both properties, a specific optical anisotropy difficult to be achieved in the past, can be achieved.

Furthermore, Formulae (10) to (12) are dependent on the wavelength. Form birefringence due to the layered structure and molecular-orientation birefringence of each layer generally have different wavelength dispersion properties from each other, thus, by controlling both, a wavelength dispersion property which could not be accomplished in the past can be achieved.

On the other hand, as described above, in the periodic structure described in Patent document 6, wherein all of the layers are optically isotropic, only an anisotropy represented by Formula (9) can be obtained. For this reason, it can be recognized that the periodic structure described in Patent document 6 lacks controllability of anisotropy, compared to the periodic structure of the present invention.

More specific examples of the optical anisotropy of the present invention are explained in detail in the design examples and examples described below.

<Periodic Structure>

The retardation film of the present invention comprises a periodic structure which has a unit of at least two layers having different average refractive indices from each other. In the present invention, form birefringence is exhibited by the periodic structure.

[Number of Groups of Layers Constituting Periodic Structure]

The periodic structure of the retardation film of the present invention may have a unit of at least two layers having different average refractive indices from each other, and may have a unit of three or more groups of layers having different refractive indices to each other. However, from the perspective of controllability of the optical anisotropy, especially the ease of preparation, it is preferable that two layers having different average refractive indices from each other are in one periodic structure.

The above FIG. 2 and Formulae (10) to (12) relate to the periodic structure which has a unit of two layers having different average refractive indices from each other. When the periodic structure comprises only two groups of layers having different refractive indices (layer A and layer B), the alignments of layer A and layer B may be consistently same order of layer A and layer B such as (AB) (AB) (AB) . . . (AB), or the regularly or randomly different order of layer A and layer B such as (AB) (BA) (AB) . . . (BA). In order to achieve the optical property of the present invention, either alignment can be adopted. Incidentally, inside of the parentheses indicates a minimum repeating unit, and from the perspective of the controllability of retardation, the order of layer A and layer B in the minimum repeating unit is preferably constant in one periodic structure.

Figure 3:
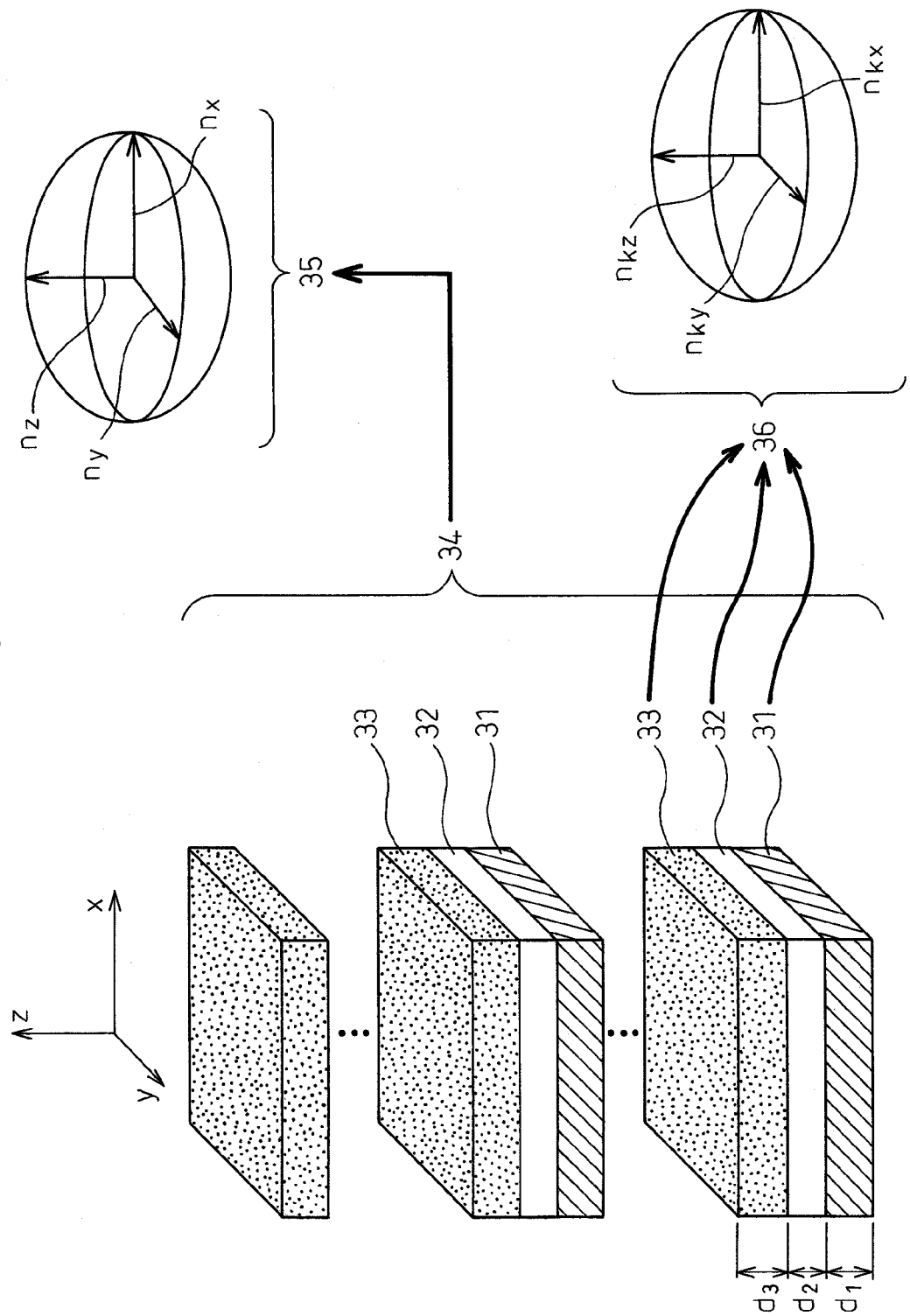
FIG. 3 is a schematic view of a periodic structure and an index ellipsoid of the retardation film of the present invention having a unit of three layers.

FIG. 3 shows a periodic structure which has a unit of three groups of layers. In FIG. 3, 31 is a first layer, 32 is a second layer, 33 is a third layer, 34 is a periodic structure in the retardation film of the present invention, 35 is an index ellipsoid of the periodic structure 34, and 36 is an index ellipsoid of the k layer (k=first to third).

The constituent of the periodic structure comprises three or more groups of layers having different refractive indices (layer A, layer B and layer C) may be as follows:

(A/B/C)/(A/B/C)/(A/B/C)/ ... (A/B/C),
(A/B/C)/(B/C/A)/(A/B/C)/ ... (C/B/A), etc.

The inside of the parentheses indicates a minimum repeating unit as described above. The order of layer A, layer B, and layer C in the minimum repeating unit is not restrictive. However, from the perspective of the ease of manufacture or the controllability of retardation, all of the orders of the minimum repeating units are preferably the same in one periodic structure.

When the above formulae (10) to (12), which are Formulae regarding the periodic structure comprising two layers having different average refractive indices from each other, is extended to the periodic structure comprising n groups of layers having different average refractive indices from each other, the following formulae (13) to (15) are obtained.

$$n_x^2 = \sum_{k=1}^{n} d_k n_{kx}^2 \bigg/ \sum_{k=1}^{n} d_k \quad (13)$$

$$n_y^2 = \sum_{k=1}^{n} d_k n_{ky}^2 \bigg/ \sum_{k=1}^{n} d_k \quad (14)$$

$$n_z^{-2} = \sum_{k=1}^{n} d_k n_{kz}^{-2} \bigg/ \sum_{k=1}^{n} d_k \quad (15)$$

wherein, $n_x$, $n_y$, $n_z$: the three-dimensional refractive indices shown in the index ellipsoid 35 of the periodic structure 34 in FIG. 3, in the directions of the x axis, y axis and z axis, respectively, of the orthogonal coordinate;

x axis direction: the in-plane slow axis direction when optical anisotropy exists within a plane of the periodic structure 34;

y axis direction: the direction perpendicular to the x axis direction within a plane of the periodic structure (the flat plane constituted by the x axis and y axis is parallel to the surface of the periodic structure 34);

z axis direction: the normal direction of a plane of the periodic structure 34;

$n_{kx}$, $n_{ky}$, $n_{kz}$: the three-dimensional refractive indices of the k layer (for example, 31, 32, or 33 in FIG. 3) shown in the index ellipsoid 36 in FIG. 3, in the directions of the x axis, y axis and z axis, respectively, of the orthogonal coordinate (when optical anisotropy exists within a plane of the k layer, the slow axis is defined to be parallel to either the x axis or y axis);

$d_k$: the film thickness (nm) of the k layer.

[Blend Region Between Layers]

A blend region comprising a blend of materials constituting layers may exist between each layer of the periodic structure. Especially, when the periodic structure is prepared by multilayer melt extrusion, such region may exist depending on the extrusion condition or materials to be used, etc. The thickness of the blend region has to be sufficiently smaller than the wavelength of light. When the thickness is not sufficiently smaller than the wavelength of light, an internal reflection or haze may occur.

The thickness of the blend region can be determined by observing the cross-section of the periodic structure with an electron microscope such as a scanning electron microscope or a transmission electron microscope. For example, the thickness of each layer and the thickness of the blend region can be determined by line profiling in the thickness direction of the transmission electron number by a transmission electron microscope.

In the blend region, the blend ratio of the two materials can be considered to change almost linearly in the direction of thickness. Therefore, the optical anisotropy of the blend region can be represented by the linearly changing constitutional ratio, thus, Formulae (7) and (8) can be represented by the following formulae (7') and (8') when the blend region exists.

$$n_o^2 = H n_H^2 + B \int_{n_L}^{n_H} n^2 \frac{dn}{n_H - n_L} + L n_L^2 \quad (7')$$

$$= H n_H^2 + \frac{B}{3}(n_H^2 + n_H n_L + n_L^2) + L n_L^2$$

$$\frac{1}{n_e^2} = \frac{H}{n_H^2} + B \int_{n_L}^{n_H} \frac{1}{n^2} \frac{dn}{n_H - n_L} + L n_L^2 = \frac{H}{n_H^2} + \frac{B}{n_H n_L} + \frac{L}{n_L^2} \quad (8')$$

$$H = \frac{d_H}{d_H + d_B + d_L}$$

$$B = \frac{d_B}{d_H + d_B + d_L}$$

$$L = \frac{d_L}{d_H + d_B + d_L}$$

wherein, $d_B$: the film thickness of a blend region.

Also, when the blend region is taken into account, Formulae (10) to (12) can be rewritten as the following formulae (10') to (12').

$$n_x^2 = H n_{1x}^2 + \frac{B}{3}(n_{1x}^2 + n_{1x} n_{2x} + n_{2x}^2) + L n_{2x}^2 \quad (10')$$

$$n_y^2 = H n_{1y}^2 + \frac{B}{3}(n_{1y}^2 + n_{1y} n_{2y} + n_{2y}^2) + L n_{2y}^2 \quad (11')$$

$$\frac{1}{n_z^2} = \frac{H}{n_{1z}^2} + \frac{B}{n_{1z} n_{2z}} + \frac{L}{n_{2z}^2} \quad (12')$$

$$H = \frac{d_1}{d_1 + d_B + d_2}$$

$$B = \frac{d_B}{d_1 + d_B + d_2}$$

$$L = \frac{d_2}{d_1 + d_B + d_2}$$

wherein, $d_B$: the film thickness of a blend region.

This idea can be further applied to the periodic structure comprising n groups of layers and a blend region therebetween. Thus, Formulae (13) to (15) can be rewritten as the following formulae (13') to (15'), respectively.

$$n_x^2 = \left[ \frac{d_1}{2} n_{1x}^2 + \sum_{k=2}^{n} \left\{ \frac{d_{k-1}}{2} n_{(k-1)x}^2 + \frac{b_k}{3}(n_{(k-1)x}^2 + n_{kx} n_{(k-1)x} + n_{(k-1)x}^2) + \frac{d_k}{2} n_{kx}^2 \right\} + \frac{d_n}{2} n_{nx}^2 \right] \bigg/ \sum_{k=1}^{n}(d_k + b_k) \quad (13')$$

-continued $$n_y^2 = \left[\frac{d_1}{2}n_{1y}^2 + \sum_{k=2}^{n}\left\{\frac{d_{k-1}}{2}n_{(k-1)y}^2 + \frac{b_k}{3}(n_{ky}^2 + n_{ky}n_{(k-1)y} + n_{(k-1)y}^2) + \frac{d_k}{2}n_{ky}^2\right\} + \frac{d_n}{2}n_{ny}^2\right] \bigg/ \sum_{k=1}^{n}(d_k + b_k) \quad (14')$$

$$n_z^{-2} = \left\{\frac{d_1}{2}n_{1z}^{-2} + \sum_{k=2}^{n}\left(\frac{d_{k-1}}{2}n_{(k-1)z}^{-2} + \frac{b_k}{n_{(k-1)z}n_{kz}} + \frac{d_k}{2}n_{kz}^{-2}\right) + \frac{d_n}{2}n_{nz}^{-2}\right\} \bigg/ \sum_{k=1}^{n}(d_k + b_k) \quad (15')$$

wherein, $d_K$: the film thickness (nm) of the k layer;

$b_K$: the film thickness (nm) of the blend region existing between the k layer and the k−1 layer.

When a periodic structure is prepared, for example, by a multilayer melt extrusion method, the film thickness of the blend region can be controlled by the retention time from the multilayer lamination to the extrusion from a die, the condition of laminar flow, etc. Also, the film thickness of the blend region can be controlled by the compatibility, etc., of the materials constituting each layer.

The blend region exerts effects of improving adhesiveness, reducing the fluctuation of the optical property of the entire retardation film caused by the fluctuation of the film thickness of each layer, etc.

However, as it is obvious from Formulae (10') to (12') and Formulae (13') to (15'), form birefringence decreases as the blend region increases. Therefore, it is preferable to control the thickness of the blend region in a range of the refractive index of the material constituting each layer and the intended optical properties.

The periodic structure may consist only of blend regions without having a layer of a single material, and may be a continuum of the refractive index gradient, as a result of an increased blend region. In this case, Formulae (7') and (8') can be treated in the same way, by representing the refractive index of the portion having the highest blend ratio of a high refractive index material in the blend region as $n_H$, and the refractive index of the portion having the highest blend ratio of a low refractive index material in the blend region as $n_L$. The same is true for formulae (10') to (12') and formulae (13') to (15').

[Thickness of Layer of Unit in Periodic Structure]

In one periodic structure of the retardation film of the present invention, the thickness of layers of the same group in a unit is preferably substantially the same as each other, regardless the number of groups of layers in the unit, from the perspective of the controllability of retardation.

Also, the layers of the same group preferably have a deviation of ±50% or less from the average film thickness of the layers of the same group. The deviation from the average value is more preferably ±40% or less, still more preferably ±30% or less, and most preferably ±10% or less.

The thickness of each layer can be determined by observing a cross-section of the periodic structure with an electron microscope such as a scanning electron microscope or a transmission electron microscope. Also, as is obvious from Formulae (10) to (12) and Formulae (13) to (15), the ratio of the thicknesses of layers of different groups in the periodic structure is important to the three-dimensional refractive indices of the entire periodic structure.

[Optical Anisotropy of Layer of Unit in Periodic Structure]

In a periodic structure of the retardation film of the present invention, the optical anisotropy of layers of the same group is preferably the same as each other, from the perspective of the controllability of retardation. The optical anisotropy of each layer is generally hard to observe directly, because the thickness of each film is substantially smaller than the wavelength of light. However, as described above, an average film thickness of each layer can be determined by an electron microscope, etc. Therefore, the average optical anisotropy of each layer can be determined by using Formulae (10) to (12) or Formulae (13) to (15), or Formulae (10') to (12') or Formulae (13') to (15') which consider blend layer, and applying refractive index wavelength dispersion and birefringence wavelength dispersion which are intrinsic properties of a material constituting each layer, a film thickness of each layer, a number of layer, and wavelength dispersion data of an in-plane retardation value (R (nm)) and a thickness-direction retardation value (Rth (nm)) of the periodic structure.

The in-plane retardation value (R (nm)) is defined by the following formula (42'):

$$R = (n_x - n_y)d \quad (42')$$

The thickness-direction retardation value (Rth (nm)) is defined by the following formula (42).

$$Rth = \left(\frac{n_x + n_y}{2} - n_z\right)d \quad (42)$$

Also, according to the logic of the above "effective medium approximation theory", in one periodic structure, the optical anisotropy can be represented by one set of three-dimensional refractive indices when the wavelength is specified, as represented by Formulae (10) to (12) or Formulae (13) to (15), or Formulae (10') to (12') or Formulae (13') to (15'). Therefore, in the present invention, the parameters shown by utilizing the three-dimensional refractive indices, such as the in-plane retardation value (R value), the thickness-direction retardation value (Rth value), and the orientation index in the thickness direction (Nz value) of the periodic structure are values of one periodic structure, unless otherwise specified.

[Thickness of Periodic Structure]

The film thickness of one periodic structure is preferably 1 to 300 μm, more preferably 5 to 200 μm, still more preferably 10 to 150 μm, and most preferably 20 to 100 μm. When the film thickness of the periodic structure is too thin, a sufficient optical anisotropy may not be obtained. On the other hand, when the film thickness is too thick, there may be a problem that the periodic structure cannot be rolled as a film.

[Number of Periodic Structures]

The number of periodic structures in the retardation film of the present invention may be only one. Alternately, the film may comprise a laminate of plural periodic structures having different materials or different thickness ratios of each layer from each other. When the film comprises plural periodic structures, the film is preferably a laminate of plural periodic structures which comprise two layers made of the same material as each other structure and differ only in the thickness ratio from each other structure, or a laminate of plural periodic structure which comprise two layers made of the same material as each other structure and differ in the thickness ratio and the number of layers of the repeated structure from each other structure.

Figure 4:
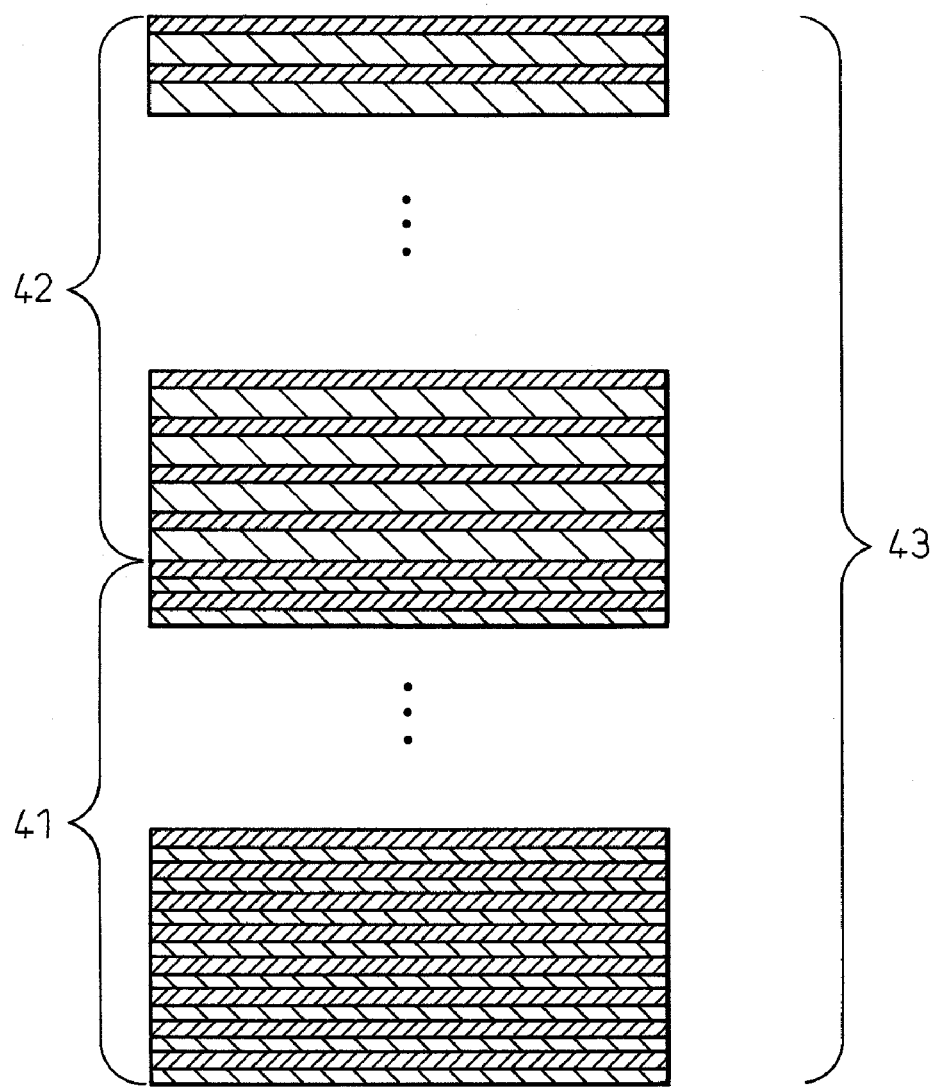
FIG. 4 is a schematic view of a periodic structure of the present invention having units of two layers, the units having different thickness ratios from each other.

FIG. 4 shows a retardation film 43 comprising a laminate of a periodic structure 41 having a thickness ratio of α and a periodic structure 42 having a thickness ratio of β, wherein the film 43 uses only two materials A and B as materials of the layers.

In FIG. 4, two periodic structures are used in a retardation film, but in the present invention, two or more periodic structures may be used, and a retardation film may be optimized depending on its application. However, the thickness of retardation film increases when the number of multilayer structures increases, thus the number of the periodic structures is preferably 5 or less, more preferably 3 or less, and most preferably 2 or less.

Even a retardation film comprising plural periodic structures can be formed at once, for example by adjusting a multilayer melt extrusion method and a known feed block to control the film thickness.

[Internal Reflection Caused by Periodic Structure]

The reflection of the retardation film of the present invention is broadly classified into "external reflection" and "internal reflection". The "external reflection" means a reflection exhibited at the interfaces of the retardation film and other medium having different refractive indices on the both surface thereof, and is a phenomenon exhibited also by a general retardation film. On the other hand, the "internal reflection" means a reflection other than the external reflection, i.e. a reflection exhibited from portions other than the film surface. Therefore, in the retardation film of the present invention, comprising a periodic structure, the "internal reflection" means reflections or interferences exhibited at a number of interfaces.

In the retardation film of the present invention, it is required that the internal reflection caused by the periodic structure does not substantially exist in the range of visible light. Specifically, the internal reflectance is preferably 2% or less, more preferably 1% or less, still more preferably 0.5% or less, and most preferably 0.1% or less.

The "internal reflectance" in the present invention is the value at the observation wavelength of 550 nm, and can be obtained, for example by deducing the external reflection caused by the surfaces from the observation results determined from reflectivity and transmissivity which are obtainable by a spectrophotometer.

Also, in the retardation film of the present invention, it is preferable that the absorption in the range of visible light does not occur. The absorption of the film depends on the wavelength dependency of the absorption coefficient of a material used, thus it is preferable to select a material having no absorption in the range of visible light.

Furthermore, the retardation film of the present invention preferably does not generate scattering in the range of visible light. Scattering degrades the polarization property of a retardation film, and is caused by a structure having a size near the wavelength of light. In the present invention, when the interfaces of the periodic structure are not parallel to the surface of the retardation film, i.e. when the interfaces of the periodic structure are not smooth, scattering may occur. Therefore, in the present invention, it is preferable that the each interface of the periodic structure is aligned parallel to the surface of the retardation film. As a method to observe the scattering, haze measurement can be used. The haze value is preferably 2% or less, more preferably 1.5% or less, still more preferably 1% or less, and most preferably 0.8% or less.

[Optical Thickness of Layer of Unit in Periodic Structure (nd (nm))]

In order to prevent the internal reflectance in the retardation film of the present invention, the thickness of each layer of a unit in the periodic structure has to be sufficiently smaller than the wavelength of light, and at the same time, it is preferable that the thickness of the above minimum repeating unit also is sufficiently smaller than the wavelength of light.

The interference effect depends on nd (optical thickness), multiplication of a refractive index n and a thickness d of a layer, thus the optical thickness nd (nm) of each layer of a unit in the periodic structure is preferably $\lambda/5$ or less, more preferably $\lambda/15$ or less, still more preferably $\lambda/20$ or less, specifically preferably $\lambda/25$ or less, and most preferably $\lambda/30$ or less. $\lambda$ is 400 to 800 nm which is the range of visible light. 550 nm, which exhibits a maximum luminous efficiency, is preferably considered for a design.

[Optical Property of Layer (A) Having Optical Anisotropy Due to Molecular-Orientation Birefringence]

In the periodic structure of the retardation film of the present invention, at least one layer of at least two layers constituting the multilayer structure has to be the layer (A) having optical anisotropy due to molecular-orientation birefringence. Furthermore, in order to obtain a more complex optical anisotropy, it is preferable that the layer (A) having optical anisotropy due to molecular-orientation birefringence has optical anisotropy within a plane due to molecular-orientation birefringence.

When each layer of a unit in the periodic structure is isotropic within a plane as in the case of the multilayer structure described in Patent document 6, only negative uniaxial structure having an optical axis in the normal direction of the resulting multilayer structure can be prepared, as it is obvious from Formulae (10) to (12) or Formulae (13) to (15).

[Optical Properties of Layers (a) and (b) Having Negative Optical Anisotropies Due to Molecular-Orientation Birefringence]

The layer (A) having optical anisotropy due to molecular-orientation birefringence, which is comprised in a unit in the periodic structure, is preferably the layer (a) having negative optical anisotropy. Also, in the retardation film of the present invention, the layer (b) having negative optical anisotropy due to molecular-orientation birefringence can be used in combination with the layer (a) having negative optical anisotropy due to molecular-orientation birefringence.

"Having negative optical anisotropy" in the present invention is defined as having three-dimensional refractive indices satisfying the following formula (16) or (17).

$$n_z > n_x = n_y \qquad (16)$$

$$n_z \geq n_x > n_y \qquad (17)$$

In Formulae (16) and (17), it is defined that $n_x$ and $n_y$ are refractive indices which are parallel to a plane of a layer and in the directions perpendicular to each other, and $n_x$ is a maximum refractive index (a refractive index in the direction of slow axis) within a plane. Also, $n_z$ is defined as a refractive index in the normal direction of a plane of a layer. In the present invention, it is more preferable that formula (17), representing a state having optical anisotropy within a plane of a layer, is satisfied in order to achieve a more complex optical anisotropy.

As indicated by Formula (9), in the structural body having a periodic structure which has a unit of only optical isotropic layers, the refractive index in the normal direction of a plane is smaller than the refractive index in the in-plane direction of the structural body. In other words, the refractive index in the normal direction cannot exceed the refractive index in the in-plane direction, only by form birefringence due to the periodic structure.

Compared to this, in the present invention, the refractive index difference between the normal direction and the in-plane direction can be freely controlled by using layer (a) and/or layer (b) having negative optical anisotropy represented by Formula (16) or (17), preferably Formula (17), as a unit of the periodic structure.

Furthermore, when the three-dimensional refractive indices of the layer (a) and/or layer (b) having negative optical anisotropy satisfy Formula (17), it is preferable that the relationship between $n_{nx}$ and $n_{ny}$ of the layer (a) and/or layer (b) having negative optical anisotropy satisfies the following formula (1). When $|n_{nx}-n_{ny}|$ is 0.0001 or less, sufficient in-plane anisotropy cannot be obtained in the periodic structure, and when $|n_{nx}-n_{ny}|$ is 0.1 or more, the retardation controllability may be deteriorated.

$$0.0001 < |n_{nx}-n_{ny}| < 0.1 \quad (1)$$

(wherein, $n_{nx}$: the three-dimensional refractive index in the x-axis direction of the layer (a) and/or layer (b) having negative optical anisotropy;

$n_{ny}$: the three-dimensional refractive index in the y-axis direction of the layer (a) and/or layer (b) having negative optical anisotropy;

x axis: the slow axis of the periodic structure within a plane of the periodic structure;

y axis: the axis perpendicular to the x axis within a plane of the periodic structure).

The value of $|n_{nx}-n_{ny}|$ is more preferably within the range of the following formula (24), still more preferably within the range of the following formula (25), and most preferably within the range of the following formula (26):

$$0.0003 < |n_{nx}-n_{ny}| < 0.05 \quad (24)$$

$$0.0005 < |n_{nx}-n_{ny}| < 0.01 \quad (25)$$

$$0.0007 < |n_{nx}-n_{ny}| < 0.007 \quad (26)$$

[Thickness-Direction Orientation Index ($N_Z$ Value) of Periodic Structure]

As described above, when a polymer having negative molecular polarizability anisotropy is stretched by a general method, a film satisfying Formula (16) or (17) can be obtained. Compared to this, when a polymer having positive molecular polarizability anisotropy is stretched by a general method, a film satisfying the following formula (18) or (19) can be obtained.

$$n_x > n_y \geq n_z \quad (18)$$

$$n_x = n_y > n_z \quad (19)$$

In the present invention, satisfying Formula (18) or (19) is defined as "having positive optical anisotropy". The definition of the three-dimensional refractive indices of Formulae (18) and (19) is the same as that of Formulae (16) and (17).

As described above, in this technical field, for widening the viewing angle of a liquid crystal display device, the main refractive index ($n_z$) in the thickness direction of a retardation film is made larger than one of the two main refractive indices ($n_x$, $n_y$) within a plane of the retardation film, and smaller than the other one, as indicated by the following formula (5').

$$n_x > n_z > n_y \quad (5')$$

The relationship indicated by Formula (5') can be represented by Formula (5) by using the orientation index in the thickness direction (Nz value) defined in the following formula (20).

$$N_z = \frac{n_x - n_z}{n_x - n_y} \quad (20)$$

wherein, $n_x$: the three-dimensional refractive index in the x-axis direction of the periodic structure;

$n_y$: the three-dimensional refractive index in the y-axis direction of the periodic structure;

$n_z$: the three-dimensional refractive index in the z-axis direction of the periodic structure;

x axis: the slow axis within a plane of the periodic structure;

y axis: the axis perpendicular to the x axis within a plane of the periodic structure;

z axis: the axis in the normal direction of a plane of the periodic structure.

$$1 > N_Z > 0 \quad (5)$$

The following formula (21) is obtained by rewriting Formulae (16) and (17) indicating that a film "has negative optical anisotropy" with use of the orientation index in the thickness direction ($N_Z$ value).

$$N_Z \leq 0 \quad (21)$$

Also, the following formula (22) is obtained by rewriting Formulae (18) and (19) indicating that a film "has positive optical anisotropy" with use of the orientation index in the thickness direction ($N_Z$ value).

$$N_Z \geq 1 \quad (22)$$

Therefore, the orientation index in the thickness direction ($N_Z$ value) in the range specified by Formula (5) cannot be achieved by a general stretching of a polymer film. Thus, currently, in order to obtain a retardation film whose orientation index in the thickness direction ($N_Z$ value) satisfies Formula (5), a special stretching method of the addition of stress to the normal direction of the film plane has to be conducted. For this reason, a retardation film satisfying the formula (5), currently, cannot be obtained by stretching, and is also difficult to have controlled retardation, and as a result, is remarkably inferior in productivity and is difficult to have a controlled wavelength dispersion of retardations.

However, the retardation film satisfying Formula (5) is known to have an enormous effect regarding the viewing angle widening in various types of liquid crystal display devices. Thus, a means to control retardation easily has been required in the industry.

In the present invention, when the layer (a) and/or layer (b) having negative optical anisotropy satisfying Formula (16) or (17), preferably the layer (a) and/or layer (b) having negative optical anisotropy satisfying Formula (17) is used as the layer (A) having optical anisotropy due to molecular-orientation birefringence of a unit in the periodic structure, a retardation film excellent in controlling retardation and having optical anisotropy satisfying Formula (5) can be obtained.

When the periodic structure of the retardation film of the present invention comprises the layer (a) having negative optical anisotropy and the layer (b) having negative optical anisotropy, it is preferable that the slow axis within each plane of layers (a) and (b) having negative optical anisotropies are arranged to be approximately parallel to each other, from the perspective of the controllability of retardation and the magnitude of retardation. Also, when a unit in the periodic structure comprises several groups of layers having negative optical anisotropies, and optical anisotropies exist within a plane, it is preferable that the slow axes of the layer are arranged to be approximately parallel to each other.

The angle between the slow axes within each plane of layers (a) and (b) having negative optical anisotropies is preferably in the range of 0±3°, more preferably in the range of 0±2°, still more preferably in the range of 0±1°, and most preferably in the range of 0±0.5°.

[When Layer (i) Having Approximate Optical Isotropy is Further Comprised]

In the periodic structure of the retardation film of the present invention, the layer (i) having approximate optical isotropy may be used in a unit, in addition to the layer (A) having optical anisotropy due to molecular-orientation birefringence.

Furthermore, it is preferable that the layer (A) having optical anisotropy due to molecular-orientation birefringence is the layer (a) having negative optical anisotropy, and at the same time, the layer (i) having approximate optical isotropy is used in the retardation film of the present invention.

Preferably, the periodic structure comprises only two groups of layers, and one of them is the layer (a) having negative optical anisotropy due to molecular-orientation birefringence, and the other is the layer (i) having approximate optical isotropy. It is preferable to combine the layer (a) having negative optical anisotropy and the layer (i) having approximate optical isotropy, because, in this case, the optical anisotropy satisfying Formula (5) is easily accomplished, and also the parameters to be considered are few from the perspective of the retardation controllability.

From the perspective of the retardation controllability that the in-plane optical anisotropy of the layer (a) having negative optical anisotropy can be used almost as it is as an in-plane optical anisotropy of the periodic structure, it is preferable that the in-plane refractive index anisotropy of the layer (i) having approximate optical isotropy satisfies the following formula (27). More preferably, the in-plane refractive index anisotropy of the layer (i) having approximate optical isotropy satisfies Formula (27) and the following formula (28) at the same time.

$$|n_{ix} - n_{iy}| \leq 0.0003 \tag{27}$$

$$\left|\frac{n_{ix} + n_{iy}}{2} - n_{iz}\right| \leq 0.0003 \tag{28}$$

The value of $|n_{ix}-n_{iy}|$ more preferably satisfies the following formula (40), and most preferably satisfies the following formula (41):

$$|n_{ix}-n_{iy}| \leq 0.0002 \tag{40}$$

$$n_{ix}-n_{iy} \leq 0.0001 \tag{41}$$

As indicated by Formulae (27) and (28), the layer (i) having approximate optical isotropy may have some optical anisotropy due to molecular-orientation birefringence. When the layer (i) having optical anisotropy at a degree indicated by Formula (27) is represented as layer (i'), it is preferable that the slow axes of the layer (A) having optical anisotropy and the layer (i') having optical anisotropy are arranged approximately perpendicular or approximately parallel to each other, from the perspective of the controllability of retardation or the magnitude of retardation.

In the case of approximately perpendicular, the angle between the slow axes of the layer (A) having optical anisotropy and the layer (i') having optical anisotropy is preferably in the range of 90±3°, more preferably in the range of 90±2°, still more preferably in the range of 90±1°, and most preferably in the range of 90±0.5°.

In the case of approximately parallel, the angle between the slow axes of the layer (A) having optical anisotropy and the layer (i') having optical anisotropy is preferably in the range of 0±3°, more preferably in the range of 0±2°, still more preferably in the range of 0±1°, and most preferably in the range of 0±0.5°.

[Number of Layers in Periodic Structure]

The number of layers in one periodic structure is preferably 100 or more and 30000 or less. When the number of layers is less than 100, a sufficient form birefringence may not be achieved unless the difference in refractive indices of the layers is quite large. On the other hand, in order to achieve an intended object, the number of layers exceeding 30000 is not necessary. The number of layers is more preferably 500 or more and 20000 or less, still more preferably 1000 or more and 15000 or less, and most preferably 2000 or more and 10000 or less.

The retardation film of the present invention may comprise plural periodic structures. The entire number of layers in this case is, for the same reason, preferably 200 or more and 100000 or less, more preferably 1000 or more and 50000 or less, still more preferably 3000 or more and 30000 or less, and most preferably 4000 or more and 20000 or less.

[Difference in Average Refractive Indices of Layers in One Periodic Structure]

It is preferable that the difference in average refractive indices of layers in one periodic structure (i.e., the difference in the average refractive index of the layer (a) having negative optical anisotropy and the average refractive index of the layer (i) having approximate optical isotropy or the layer (b) having negative optical anisotropy) satisfies the following formula (2). This is especially preferable when the periodic structure comprises a unit of two groups of layers, i.e. a layer (a) having negative optical anisotropy and a layer (i) having approximate optical isotropy or a layer (b) having negative optical anisotropy.

$$0.001 < |\delta n| < 0.5 \tag{2}$$

When difference in the average refractive indices is 0.001 or less, the number of layers may have to exceed beyond the above preferable range in order to obtain the sufficient form birefringence. On the other hand, it is difficult to make the difference in average refractive indices 0.5 or more, especially in the case of combination of polymer materials. Therefore, a combination of an inorganic material and an organic material, etc. is required, and thus is not realistic. Furthermore, the magnitude of form birefringence depends mainly on the film thickness ratio and the difference in refractive indices. When the difference in average refractive indices is 0.5 or more, the influence of form birefringence is excessively large compared to the influence of molecular-orientation birefringence, thus the three-dimensional refractive indices of the periodic structure are difficult to be controlled. All the layers in a unit of the periodic structure may have optical anisotropy, thus the difference in three-dimensional refractive indices means the difference in average refractive indices. The relationship between the average refractive index n and the three-dimensional refractive indices is represented by the following formula (29):

$$n = \frac{n_x + n_y + n_z}{3} \quad (29)$$

The value $|\delta n|$ is more preferably in the range of the following formula (30), more preferably in the range of the following formula (31), more preferably in the range of the following formula (31'), more preferably in the range of the following formula (32), more preferably in the range of the following formula (32'), and most preferably in the range of the following formula (32").

$$0.01 < |\delta n| < 0.3 \quad (30)$$

$$0.02 < |\delta n| < 0.2 \quad (31)$$

$$0.03 < |\delta n| < 0.15 \quad (31')$$

$$0.03 < |\delta n| < 0.1 \quad (32)$$

$$0.05 < |\delta n| < 0.12 \quad (32')$$

$$0.07 < |\delta n| < 0.1 \quad (32'')$$

The average refractive index can be measured about an optically isotropic film made of the material constituting each layer, by an Abbe Refractometer or an ellipsometer. In the case the film has optical anisotropy, the three-dimensional refractive indices can be similarly measured to calculate the average refractive index from Formula (29).

[Preferable Parameter of Periodic Structure in Order to Satisfy Formula (5)]

In investigating the optical anisotropy of one periodic structure of the retardation film of the present invention, it is found that the periodic structure satisfies the following formulae (3) and (4) in order to satisfy Formula (5), when the layer (A) having optical anisotropy due to molecular-orientation birefringence is the layer (a) having negative optical anisotropy, and two layers of the layer (a) having negative optical anisotropy and the layer (i) having approximate optical isotropy are used in the periodic structure. Also, it is found that the periodic structure satisfies the following formulae (3), (4), and (4') in order to satisfy Formula (5), when the layer (A) having optical anisotropy due to molecular-orientation birefringence is the layer (a) having negative optical anisotropy, and two layers of the layer (a) having negative optical anisotropy and the layer (b) having negative optical anisotropy are used in the periodic structure. Formula (3) is obtained by combining Formula (5) with Formulae (10) to (12) regarding form birefringence. The observation wavelength is 550 nm which has a wavelength of maximum luminous efficiency to a human.

$$\sqrt{d_1 n_{1x}^2 d_2 n_{2x}^2} > \frac{d_1 + d_2}{\sqrt{d_1 n_{1z}^{-2} + d_2 n_{2z}^{-2}}} > \sqrt{d_1 n_{1y}^2 + d_2 n_{2y}^2} \quad (3)$$

$$n_{1x} \le n_{1z} \quad (4)$$

$$n_{2x} \le n_{2z} \quad (4')$$

wherein, $d_1$: the film thickness (nm) of the layer (a) having negative optical anisotropy;

$d_2$: the film thickness (nm) of the layer (i) having approximate optical isotropy or the layer (b) having negative optical anisotropy;

$n_{1x}$: the three-dimensional refractive index in the x-axis direction of the layer (a) having negative optical anisotropy;

$n_{1y}$: the three-dimensional refractive index in the y-axis direction of the layer (a) having negative optical anisotropy;

$n_{1z}$: the three-dimensional refractive index in the z-axis direction of the layer (a) having negative optical anisotropy;

$n_{2x}$: the three-dimensional refractive index in the x-axis direction of the layer (i) having approximate optical isotropy or the layer (b) having negative optical anisotropy;

$n_{2y}$: the three-dimensional refractive index in the y-axis direction of the layer (i) having approximate optical isotropy or the layer (b) having negative optical anisotropy;

$n_{2z}$: the three-dimensional refractive index in the z-axis direction of the layer (i) having approximate optical isotropy or the layer (b) having negative optical anisotropy;

x axis: the slow axis of the periodic structure within a plane of the periodic structure;

y axis: the axis perpendicular to the x axis within a plane of the periodic structure;

z axis: the axis in the normal direction of a plane of the periodic structure.

In a retardation film of the present invention, when the layer (A) having optical anisotropy due to molecular-orientation birefringence is the layer (a) having negative optical anisotropy, and two layers of the layer (a) having negative optical anisotropy and the layer (i) having approximate optical isotropy are used in the periodic structure, it is preferable that, as well as satisfying Formulae (3) and (4), $n_{1x}$ is a refractive index of the slow axis within a plane of the layer (a) having negative optical anisotropy, and the angle between the x axis of the periodic structure and the slow axis of the layer (a) having negative optical anisotropy is in the range of 0±3°, more preferably in the range of 0±2°, still more preferably in the range of 0±1°, and most preferably in the range of 0±0.5°.

In a retardation film of the present invention, when the layer (A) having optical anisotropy due to molecular-orientation birefringence is the layer (a) having negative optical anisotropy, and two layers of the layer (a) having negative optical anisotropy and the layer (b) having negative optical anisotropy are used in the periodic structure, it is preferable that, as well as satisfying Formulae (3), (4), and (4'), $n_{1x}$ and $n_{2x}$ are refractive indices of the slow axes within the planes, and the angle between the x axis of the periodic structure and these slow axes are in the range of 0±3°, more preferably in the range of 0±2°, still more preferably in the range of 0±1°, and most preferably in the range of 0±0.5°.

As described above, in one periodic structure, every layer used in a unit may have optical anisotropy, thus parameters of each layer may fluctuate to some extent. For this reason, it is sufficient that Formulae (3), (4), and (4') be satisfied by an average film thickness and optical anisotropy of each layer. The average film thickness can be determined, for example, by observing the cross-section of a periodic structure with a transmission electron microscope, measuring 100 points for each layer, and calculating the average value. Also, as described above, the average optical anisotropy of each layer can be obtained and applying the obtained data such as the average film thickness to Formulae (10) to (12).

Furthermore, it is preferable that the layer (i) having approximate optical isotropy is completely isotropic. However, as indicated by Formula (27), some optical anisotropy is permissible.

[In-Plane Retardation Value (R (nm)) of Periodic Structure]

The in-plane retardation value (R (nm)) of the periodic structure of the retardation film of the present invention preferably satisfies the following formula (6), when an application of the retardation film to a liquid crystal display device is considered.

$$10 \text{ nm} < R < 1000 \text{ nm} \qquad (6)$$

More preferably the R value satisfies the following formula (33), still more preferably satisfies the following formula (34), and most preferably satisfies the following formula (35).

$$20 \text{ nm} < R < 800 \text{ nm} \qquad (33)$$

$$30 \text{ nm} < R < 600 \text{ nm} \qquad (34)$$

$$40 \text{ nm} < R < 400 \text{ nm} \qquad (35)$$

[Wavelength Dispersibility Regarding Retardation in Thickness Direction]

In the present invention, the following formula can indicate that the retardation film has inverse wavelength dispersibility regarding retardation in the thickness direction.

$$Rth(\lambda)/Rth(\lambda') < 1$$

{$\lambda$, $\lambda'$: observation wavelength (400 nm$\leq\lambda\leq\lambda'$ 700 nm, preferably $\lambda$=450 nm and $\lambda'$=550 nm)}.

[Wavelength Dispersibility Regarding Retardation in in-Plane Direction and Thickness Direction]

As described above, according to the retardation film of the present invention, the in-plane retardation value (R($\lambda$) value) and the thickness-direction retardation value (Rth($\lambda$) value) can be controlled independently.

[Wavelength Dispersibility Regarding Retardation in in-Plane Direction and Thickness Direction—Independent Control 1]

In this regard, for example, according to the retardation film of the present invention, the difference between the wavelength dispersibility of the in-plane retardation value R($\lambda$) {R($\lambda$)/R($\lambda'$)}, and the wavelength dispersibility of the thickness-direction retardation value Rth($\lambda$) {Rth($\lambda$)/Rth($\lambda'$)} can satisfy the following formula:

$$|\{Rth(\lambda)/Rth(\lambda')\} - \{R(\lambda)/R(\lambda')\}| \geq 0.1$$

{$\lambda$, $\lambda'$: observation wavelength (400 nm$\leq\lambda<\lambda'\leq$700 nm, preferably $\lambda$=450 nm and $\lambda'$=550 nm)}.

Also, according the retardation film of the present invention, the difference between the wavelength dispersibility of the in-plane retardation value {R($\lambda$)/R($\lambda'$)}, and the wavelength dispersibility of the thickness-direction retardation value {Rth($\lambda$)/Rth($\lambda'$)} can be 0.15 or more, 0.2 or more, or 0.25 or more.

In this regard, in investigating the optical anisotropy of one periodic structure of the retardation film of the present invention, it is found that observation wavelengths $\lambda$ (nm) and $\lambda'$ (nm) (400 nm$\leq\lambda<\lambda'\leq$700 nm) satisfying the following formula (200) preferably exists, when the periodic structure comprises a unit of a layer (a) having negative optical anisotropy, and a layer (i) having approximate optical isotropy or a layer (b) having negative optical anisotropy. Formula (200) is obtained by combining the above formula with Formulae (10) to (12) which relates to form birefringence. Also, the value of the right side of Formula (200) is, for example, 0.15 or more, 0.2 or more, or 0.25 or more.

$$\left| \frac{\sqrt{d_1 n_{1x}^2(\lambda) + d_2 n_{2x}^2(\lambda)} + \sqrt{d_1 n_{1y}^2(\lambda) + d_2 n_{2y}^2(\lambda)} - \frac{2(d_1 + d_2)}{\sqrt{d_1 n_{1z}^{-2}(\lambda) + d_2 n_{2z}^{-2}(\lambda)}}}{\sqrt{d_1 n_{1x}^2(\lambda') + d_2 n_{2x}^2(\lambda')} + \sqrt{d_1 n_{1y}^2(\lambda') + d_2 n_{2y}^2(\lambda')} - \frac{2(d_1 + d_2)}{\sqrt{d_1 n_{1z}^{-2}(\lambda') + d_2 n_{2z}^{-2}(\lambda')}}} - \frac{\sqrt{d_1 n_{1x}^2(\lambda) + d_2 n_{2x}^2(\lambda)} - \sqrt{d_1 n_{1y}^2(\lambda) + d_2 n_{2y}^2(\lambda)}}{\sqrt{d_1 n_{1x}^2(\lambda') + d_2 n_{2x}^2(\lambda')} - \sqrt{d_1 n_{1y}^2(\lambda') + d_2 n_{2y}^2(\lambda')}} \right| \geq 0.1 \qquad (200)$$

(wherein, $d_1$: the film thickness (nm) of the layer (a) having negative optical anisotropy;

$d_2$: the film thickness (nm) of the layer (i) having approximate optical isotropy or the layer (b) having negative optical anisotropy;

$n_{1x}$: the three-dimensional refractive index in the x-axis direction of the layer (a) having negative optical anisotropy;

$n_{1y}$: the three-dimensional refractive index in the y-axis direction of the layer (a) having negative optical anisotropy;

$n_{1z}$: the three-dimensional refractive index in the z-axis direction of the layer (a) having negative optical anisotropy;

$n_{2x}$: the three-dimensional refractive index in the x-axis direction of the layer (i) having approximate optical isotropy or the layer (b) having negative optical anisotropy;

$n_{2y}$: the three-dimensional refractive index in the y-axis direction of the layer (i) having approximate optical isotropy or the layer (b) having negative optical anisotropy;

$n_{2z}$: the three-dimensional refractive index in the z-axis direction of the layer (i) having approximate optical isotropy or the layer (b) having negative optical anisotropy;

x axis: the slow axis of the periodic structure within a plane of the periodic structure;

y axis: the axis perpendicular to the x axis within a plane of the periodic structure;

z axis: the axis in the normal direction of a plane of the periodic structure).

[Wavelength Dispersibility Regarding Retardation in in-Plane Direction and Thickness Direction—Independent Control 2]

Furthermore, for example, according to the retardation film of the present invention, either R($\lambda$)/R($\lambda'$) or {Rth($\lambda$)/Rth($\lambda'$)} can be larger than 1, and the other can be smaller than 1. In other words, either the retardation in the in-plane direction or the retardation in the thickness direction can express ordinary wavelength dispersibility, and the other can express inverse wavelength dispersibility. The observation wavelength $\lambda$, $\lambda'$ is 400 nm$\leq\lambda<\lambda'\leq$700 nm, preferably $\lambda$=450 nm and $\lambda'$=550 nm.

In this regard, in investigating the optical anisotropy of one periodic structure of the retardation film of the present invention, it is found that, the observation wavelengths $\lambda$ (nm) and $\lambda'$ (nm) (400 nm$\leq\lambda<\lambda'\leq$700 nm) at which one of the following formulae (100) and (100') is less than one and the other is more than one preferably exist, when the periodic structure comprises a unit of the layer (a) having negative optical anisotropy and the layer (i) having approximate optical isotropy or the layer (b) having negative optical anisotropy. Formulae (100) and (100') can be obtained by combining the above formulae with Formulae (10) to (12) which relates to form birefringence:

$$\frac{\sqrt{d_1 n_{1x}^2(\lambda) + d_2 n_{2x}^2(\lambda)} - \sqrt{d_1 n_{1y}^2(\lambda) + d_2 n_{2y}^2(\lambda)}}{\sqrt{d_1 n_{1x}^2(\lambda') + d_2 n_{2x}^2(\lambda')} - \sqrt{d_1 n_{1y}^2(\lambda') + d_2 n_{2y}^2(\lambda')}} \quad (100)$$

$$\frac{\sqrt{d_1 n_{1x}^2(\lambda) + d_2 n_{2x}^2(\lambda)} + \sqrt{d_1 n_{1y}^2(\lambda) + d_2 n_{2y}^2(\lambda)} - \frac{2(d_1 + d_2)}{\sqrt{d_1 n_{1z}^{-2}(\lambda) + d_2 n_{2z}^{-2}(\lambda)}}}{\sqrt{d_1 n_{1x}^2(\lambda') + d_2 n_{2x}^2(\lambda')} + \sqrt{d_1 n_{1y}^2(\lambda') + d_2 n_{2y}^2(\lambda')} - \frac{2(d_1 + d_2)}{\sqrt{d_1 n_{1z}^{-2}(\lambda') + d_2 n_{2z}^{-2}(\lambda')}}} \quad (100')$$

(wherein, $d_1$: the film thickness (nm) of the layer (a) having negative optical anisotropy;

$d_2$: the film thickness (nm) of the layer (i) having approximate optical isotropy or the layer (b) having negative optical anisotropy;

$n_{1x}$: the three-dimensional refractive index in the x-axis direction of the layer (a) having negative optical anisotropy;

$n_{1y}$: the three-dimensional refractive index in the y-axis direction of the layer (a) having negative optical anisotropy;

$n_{1z}$: the three-dimensional refractive index in the z-axis direction of the layer (a) having negative optical anisotropy;

$n_{2x}$: the three-dimensional refractive index in the x-axis direction of the layer (i) having approximate optical isotropy or the layer (b) having negative optical anisotropy;

$n_{2y}$: the three-dimensional refractive index in the y-axis direction of the layer (i) having approximate optical isotropy or the layer (b) having negative optical anisotropy;

$n_{2z}$: the three-dimensional refractive index in the z-axis direction of the layer (i) having approximate optical isotropy or the layer (b) having negative optical anisotropy;

x axis: the slow axis of the periodic structure within a plane of the periodic structure;

y axis: the axis perpendicular to the x axis within a plane of the periodic structure;

z axis: the axis in the normal direction of a plane of the periodic structure).

<Material of Retardation Film>

Materials of the retardation film of the present invention are not specifically limited, as long as at least one layer in a unit of the periodic structure becomes the layer (A) having optical anisotropy due to molecular-orientation birefringence.

Also, in the retardation film of the present invention, additives including a known antioxidant such as Irganox 1010, 1076 (manufactured by Ciba-Geigy Corporation), a lubricant, a plasticizer such as phosphates, a surfactant, an ultraviolet absorbing agent such as phenyl salicylate, 2-hydroxybenzophenone and triphenyl phosphate, an antistatic agent, and a blueing agent may be added to the materials of the layer, as long as they do not impair the effect of the material. Also, additives having excellent compatibility may be added in order to adjust the glass-transition temperature and birefringence.

[Material Constituting Layer (A) Having Optical Anisotropy Due to Molecular-Orientation Birefringence]

From the perspective of formability, it is preferable to mainly use a polymer as a material constituting layer (A) having optical anisotropy due to the molecular-orientation birefringence, in a unit of the periodic structure of the retardation film of the present invention. As the polymer, any one of crystalline polymer, liquid crystalline polymer, and noncrystalline polymer is acceptable, but from the perspective of the controllability of retardation, a noncrystalline polymer is preferable. Furthermore, a thermoplastic polymer is preferable from the perspective of formability.

In the at least one layer (A) having molecular-orientation birefringence, from the perspective of improving the productive efficiency of the retardation film, it is preferable that molecular-orientation birefringence is exhibited by the molecular-orientation of the polymer.

The glass-transition temperature of a polymer constituting the layer (A) having optical anisotropy due to the molecular-orientation birefringence is, from the perspective of the long-term retention ability of the orientation, preferably 120° C. or more, more preferably 125° C. or more, still more preferably 130° C. or more, and most preferably 135° C. or more. Also, from the perspective formability, the glass-transition temperature is preferably 180° C. or less, more preferably 170° C. or less, still more preferably 160° C. or less, and most preferably 150° C. or less. The glass-transition temperature here means an apparent glass-transition temperature of the polymer containing the additives, etc. The glass-transition temperature can be measured by a differential scanning calorimeter (DSC).

[Materials Constituting Layers (a) and (b) Having Negative Optical Anisotropies]

In a unit of the periodic structure of the retardation film of the present invention, the layer (A) having optical anisotropy due to the molecular-orientation birefringence comprised is preferably the layer (a) having negative optical anisotropy. As described above, when the layer (a) having negative optical anisotropy exists in a unit of the periodic structure, it is possible to freely control the refractive index difference between the normal direction and the in-plane direction. In the retardation film of the present invention, the layer (A) having optical anisotropy due to the molecular-orientation birefringence is the layer (a) having negative optical anisotropy, and additionally the layer (b) having negative optical anisotropy can be used.

From the perspective of the retardation controllability, it is preferable that the layers (a) and (b) having negative optical anisotropies mainly comprise polymers having negative molecular polarizability anisotropies.

The "polymer having negative molecular polarizability anisotropy" is defined as a polymer having the maximum refractive index direction within the film plane that is approximately perpendicular to the stretching direction when a longitudinal uniaxial stretching is conducted at a temperature of Tg±10° C. (the glass-transition temperature of the polymer is shown as Tg (° C.)). Similarly, the "polymer having positive molecular polarizability anisotropy" is defined as a polymer having a property that the maximum refractive index direction within the film plane is approximately parallel to the stretching direction when it is obtained by the same condition as above.

From the perspective of formability, it is preferable to mainly use polymers as materials constituting layer (a) and layer (b) having negative optical anisotropies. As the polymer, any one of crystalline polymer, liquid crystalline polymer, and noncrystalline polymer is acceptable, but from the perspective of the controllability of retardation, a noncrystalline polymer is preferable. Furthermore, a thermoplastic polymer is preferable from the perspective of formability.

From the perspective of improving the productive efficiency of the retardation film, it is preferable that each of molecular-orientation birefringence of layer (a) and layer (b) having negative optical anisotropies is exhibited by the molecular orientation of the polymers constituting the layers (a) and (b).

The glass-transition temperatures of polymers constituting the layers (a) and (b) having negative optical anisotropies are, from the perspective of the long-term orientation retention ability, preferably 120° C. or more, more preferably 125° C. or more, still more preferably 130° C. or more, and most preferably 135° C. or more. Also, from the perspective formability, the glass-transition temperatures are preferably 180° C. or less, more preferably 170° C. or less, still more preferably 160° C. or less, and most preferably 150° C. or less. The glass-transition temperatures here mean apparent glass-transition temperatures of the polymers containing the additives, etc. The glass-transition temperatures can be measured by a differential scanning calorimeter (DSC).

Also, when the materials constituting the layers (a) and (b) having negative optical anisotropies differ from each other, it is preferable that the glass-transition temperatures thereof are substantially the same as each other. The difference between the glass-transition temperatures of the polymers constituting layer (a) and layer (b) having negative optical anisotropies is preferably 20° C. or less, more preferably 15° C. or less, still more preferably 10° C. or less, and most preferably 5° C. or less.

The examples of the polymer having negative molecular polarizability anisotropy include a polymer such as polymethylmethacrylate, poly(acryloyl morpholine), acrylate, polyester, polycarbonate, polystyrene, syndiotactic polystyrene, hydrogenated polystyrene, organic acid-substituted cellulose, copolymerized olefin-maleimide having a phenyl group, polycarbonate having a fluorene skeleton, and styrene-maleic anhydride copolymer, a blend of polyphenylene oxide and polystyrene, and a blend thereof.

The polymer having negative molecular polarizability anisotropy is a copolymer of styrene and maleic anhydride having a styrene/maleic anhydride copolymerization molar ratio of 70/30 to 86/14, especially having a photoelastic coefficient of $8 \times 10^{-12}$ $Pa^{-1}$ or less. Such a copolymer has improved heat stability of retardation, small photoelastic coefficient, and negative optical anisotropy. For example, when the copolymerization molar ratio of styrene/maleic anhydride is 85/15, the glass-transition temperature can be 133° C. and the photoelastic coefficient can be $5.4 \times 10^{-12}$ $Pa^{-1}$. When the ratio is 78/22, the glass-transition temperature can be 150° C. and the photoelastic coefficient can be $4.3 \times 10^{-12}$ $Pa^{-1}$. When the ratio is 74/26, the glass-transition temperature can be 150° C. and the photoelastic coefficient can be $2.8 \times 10^{-12}$ $Pa^{-1}$.

[Material Constituting Layer (i) Having Approximate Optical Isotropy]

In the periodic structure of the retardation film of the present invention, it is preferable that the layer (A) having optical anisotropy due to molecular-orientation birefringence is the layer (a) having negative optical anisotropy, and therefore the layer (i) having approximate optical isotropy is used as another layer. When the periodic structure is constituted of the layer (a) having negative optical anisotropy and the layer (i) having approximate optical isotropy, the optical anisotropy satisfying Formula (5) is easily achieved. Further, this combination is also preferable from the perspective of the retardation controllability, because the number of parameters to be considered in the design decreases.

It is preferable, from the perspective of formability, that the layer (i) having approximate optical isotropy is mainly made of a polymer. Specific polymers include polymers such as polyvinyl alcohol, modified polyvinyl alcohol, organic silanol, acrylate, silicone, polyester, polyurethane, polyether, rubber, polycarbonate, polystyrene, syndiotactic polystyrene, amorphous polyolefin, a polymer having norbornene skeleton, cyclic olefin polymer having norbornene skeleton, organic acid-substituted cellulose, polyether sulfone, polyarylate, olefin maleimide, copolymerized olefin-maleimide having a phenyl group, polyimide, polyamide, polyetherketone, polyaryletherketone, polyamideimide, polyesterimide, polycarbonate having fluorene skeleton, copolymerized styrene-maleic anhydride, polyphenylene oxide, and a blend thereof, but are not limited thereto.

The glass-transition temperature of a polymer constituting the layer (i) having approximate optical isotropy is preferably the same as or less than the glass-transition temperature of a polymer constituting the layer (A) having optical anisotropy due to molecular-orientation birefringence. Regarding the layer (i) having approximate optical isotropy, the orientation does not need to be retained if the shape is retained, thus a polymeric elastomer and the like, having a glass-transition temperature near room temperature can be used.

[Other Layers]

The retardation film of the present invention may comprise a layer other than layer (a) and layer (b) having negative optical anisotropies due to molecular-orientation birefringence and the layer (i) having approximate optical isotropy. In other words, the film may comprise other layers than the periodic structure, or the periodic structure may comprise other layers than the layers (a) and (b) having negative optical anisotropies and the layer (i) having approximate optical isotropy.

The material of such other layer is not specifically limited as long as the effect of the present invention is not impaired, and can be selected from known materials.

For example, in order to improve the mechanical strength of the retardation film itself, a protective film (X) can be laminated on both sides of the periodic structure. The protective film (X) may be made of a thermoplastic resin composition (P) having a rupture strength of 10 to 50 MPa, a rupture elongation of 300 to 1500%, a surface impact fracture energy of $5 \times 10^{-4}$ J/μm or more, and a dynamic storage elastic modulus and a dynamic loss elastic modulus of $1 \times 10^5$ to $2 \times 10^8$ Pa at −40° C. and a frequency of 1 Hz, and may be approximately optically isotropic.

In this regard, values of the protective film are determined as described below.

(1) Rupture Strength

The rupture strength can be determined from the stress at which a sample film having a width of 10 mm is ruptured in a tension test conducted at 23° C. in a condition that the test length is 100 mm and the stretch rate is 200 mm/min, according to a method of JIS 02151-1990.

(2) Rupture Elongation

The rupture elongation can be determined from the strain (stretching rate) at which a sample film having a width of 10 mm is ruptured in a tension test conducted at 23° C. in a condition that the test length is 100 mm and the stretch rate is 200 mm/min, according to a method of JIS C2151-1990.

(3) Surface Impact Fracture Energy (50% Impact Fracture Energy)

The surface impact fracture energy can be determined by setting a pin (size Φ 4.0 mm) at the center of a sample which is fixed at the circumference thereof, dropping a weight thereon {weight of 0.5 kg (in the case of a protective film) or weight of 0.02 kg (in the case of a retardation film)}, and calculating the fracture energy per film thickness according to the data processing method of JIS K7211-1 (staircase method).

(4) Dynamic Storage Elastic Modulus and Dynamic Loss Elastic Modulus

The values are measured by using RSA-II, manufactured by Rheometric Co., in a tension mode at the temperature of −40° C. and a frequency of 1 Hz.

As recognized by the values of the rupture strength, the rupture elongation, the surface impact fracture energy, the dynamic storage elastic modulus, and the dynamic loss elastic modulus, the thermoplastic resin composition (P) for the protective film (X) has a relatively large mechanical strength and elasticity. By using such a protective film, the cracking resistance of the retardation film of the present invention can be improved during handling or a heat shock test, etc.

The rupture strength of the thermoplastic resin composition (P) is 10 MPa or more, and preferably 20 MPa or more. When the rupture strength falls below 10 MPa, at the stretching of a laminated retardation film having a protective film made of the thermoplastic resin composition (P), the laminated film may be ruptured, and the protective film made of the thermoplastic resin composition (P) may not function sufficiently as a protective film for protecting the retardation film.

The rupture elongation of the thermoplastic resin composition (P) is 300% or more, and preferably 500% or more. When the rupture elongation falls below 300%, at the stretching of a laminated retardation film having a protective film made of the thermoplastic resin composition (P), the laminated film may be ruptured, and the protective film, made of the thermoplastic resin composition (P) may not function sufficiently as a protective film for protecting the retardation film.

The surface impact fracture energy of the thermoplastic resin composition (P) is $5 \times 10^{-4}$ J/μm or more, and preferably $8 \times 10^{-4}$ J/μm or more. When the surface impact fracture energy is small, the protective film made of the thermoplastic resin composition (P) may not function sufficiently as a protective film for protecting the retardation film.

Both the dynamic storage elastic modulus and the dynamic loss elastic modulus of the thermoplastic resin composition (P) are $1 \times 10^5$ to $2 \times 10^8$ Pa, and preferably $5 \times 10^5$ to $5 \times 10^7$ Pa at −40° C. and a frequency of 1 Hz. When these values fall below $1 \times 10^5$ Pa, sticking may increase when the film is reeled up. The protective film made of the thermoplastic resin composition (P) may exist on both sides of the laminated retardation film of the present invention, thus it is important to limit the sticking of the protective film for protecting the retardation film. Also, when these values exceed $2 \times 10^8$ Pa, the laminated retardation film having the protective film made of the thermoplastic resin composition (P) may cause cracking during a heat cycle test.

The photoelastic coefficient of the thermoplastic resin composition (P) is preferably $-10 \times 10^{-12}$ Pa$^{-1}$ to $+10 \times 10^{-12}$ Pa$^{-1}$, more preferably $-7 \times 10^{-12}$ Pa$^{-1}$ to $+7 \times 10^{-12}$ Pa$^{-1}$, and particularly preferably $-5 \times 10^{-12}$ Pa$^{-1}$ to $+5 \times 10^{-12}$ Pa$^{-1}$ in an unstretched state. When the photoelastic coefficient is within this range in an unstretched state, the thermoplastic resin composition (P) can be used preferably for optical purposes such as a protective film for protecting a polarization plate or a retardation film.

The thermoplastic resin composition (P) may be any thermoplastic resin compositions satisfying the above conditions. The preferable examples include an ethylene copolymer resin (P-1), copolymer having a polymer block of styrene and a polymer block of butadiene or isoprene, or hydrogenated polymer of the copolymer (P-2).

The protective film (X) is approximately optically isotropic, and for example, satisfies the following formula:

$$|R(X)| \leq 20 \text{ nm, preferably 10 nm, and more preferably 5 nm}$$

(wherein,

R(X): an in-plane retardation of the protective film (X), measured by light having a wavelength of 400 to 700 nm (when plural protective films exist, the sum of all the in-plane retardations of the protective films)).

<Preparation Method of Retardation Film>

In order to exhibit the optical anisotropy due to molecular-orientation birefringence in the retardation film of the present invention, it is preferable to adopt a stretching process from the perspective of the controllability of the optical anisotropy.

The stretching process may be either uniaxial stretching or biaxial stretching, and the biaxial stretching may be either sequential biaxial stretching or simultaneous biaxial stretching. Also, the stretching method is not specifically limited, and for example, known methods such as longitudinal uniaxial stretching conducted between rolls, transverse uniaxial stretching using a tenter, or simultaneous biaxial stretching or sequential biaxial stretching combining these stretching methods can be used.

The stretching temperature is preferably in the range of the glass-transition temperature of the polymer to be used, and for example, in the case of a thermoplastic polymer, the stretching temperature is preferably in the range of (Tg−20° C.) to (Tg+30° C.), more preferably in the range of (Tg−10° C.) to (Tg+20° C.), based on the glass-transition temperature (Tg) thereof. Also, the retardation film of the present invention comprises a periodic structure comprising several groups of units, thus it is preferable to adjust the stretching temperature according to the layer having the highest Tg.

Also, the method for forming the multilayer structure before stretching is not specifically limited as long as it can form a multilayer structure, and the examples include the multilayer spin coating method, the multilayer solution casting method, the multilayer melt extrusion method, and the like.

A preferable method for forming the retardation film of the present invention is a method of forming a multilayer film by the multilayer melt extrusion of a polymer material, and then stretching the multilayer film. According to the method, even a complex multilayer structure can be handled as if it was one film after the melt extrusion, and as a result, a complex optical anisotropy can be easily obtained.

The multilayer melt extrusion method is not specifically limited, and for example, known methods such as the method described in Japanese Patent No. 3264958 can be adopted. The examples of the multilayer melt extrusion method include the multi-manifold method, the feed block method, and the like. Adopting the feed block method is preferable in the present invention.

Regarding the multilayer melt extrusion, it is preferable that the melt viscosities of the polymers to be used are almost the same. When the melt viscosities of the polymers remarkably differ from each other, it may be difficult to form the multilayer structure. In the present invention, the melt viscosity measured at 250° C. and the shear rate of 180 sec$^{-1}$ is preferably in the range of 100 to 6000 Pa·s, more preferably 200 to 4000 Pa·s, still more preferably 300 to 2000 Pa·s, and most preferably 400 to 1800 Pa·s. When the melt viscosity is out of the range, the film forming of the periodic structure may be unstable.

Also, in the process of the multilayer melt extrusion, when the difference in melt viscosities among the materials to form the multilayer structure is large, forming the layer structure may be difficult to form. The difference in melt viscosities is preferably small, and for example, the difference in melt viscosities measured at 250° C. and the shear rate of 180 sec$^{-1}$ is preferably 5000 Pa·s or less, more preferable 3000 Pa·s or less, still more preferably 2000 Pa·s or less, and most preferably 1000 Pa·s or less. When the melt viscosity is out of the range, the film forming of the periodic structure may be unstable. However, even if the materials having difference in viscosities are used, a stable film forming of the periodic structure may become possible by changing the shape of the flow passage in order to change the shear rate.

For the multilayer melt extrusion method, it is preferable to use a method of extruding a resin through a T die, and then sending the extruded resin to a cooling roll. The resin temperature at the time of the extrusion can be set according to the flowability, the thermal stability, etc. of the resin. Also, in order to prevent flaking at the interfaces of the periodic structure, it is preferable that the polymer used for the multilayer melt extrusion have excellent adhesiveness.

<Design Examples of Retardation Film>

Design examples are described below and further details of the best mode for conducting the present invention are explained. In each design example, the design was conducted by using an actual polymer as a material and parameters thereof.

[Design Example 1]

In Design example 1, the retardation film comprising the periodic structure having a unit of the layer (a) having negative optical anisotropy and the layer (i) having approximate optical isotropy is designed. In this example, the layer (a) having negative optical anisotropy is represented as layer A, and the layer (i) having approximate optical isotropy is represented as layer B.

(Layer A) Material: Polystyrene

Polystyrene has negative molecular polarizability anisotropy, thus it exhibits negative optical anisotropy by stretching. The three-dimensional refractive indices of the material at three wavelengths (450 nm, 550 nm, 650 nm) used in the calculation are shown in Table 1.

TABLE 1

| λ (nm) | $n_{nx}$ | $n_{ny}$ | $n_{nz}$ |
|---|---|---|---|
| 450 | 1.5962 | 1.5930 | 1.5967 |
| 550 | 1.5883 | 1.5853 | 1.5888 |
| 650 | 1.5798 | 1.5769 | 1.5803 |

(Layer B) Material: Ethylene-Norbornene Copolymer

The ethylene-norbornene copolymer is optically isotropic and the layer obtained is optically isotropic. The three-dimensional refractive indices of the material at three wavelengths (450 nm, 550 nm, 650 nm) used in the calculation are shown in Table 2.

TABLE 2

| λ (nm) | $n_{ix}$ | $n_{iy}$ | $n_{iz}$ |
|---|---|---|---|
| 450 | 1.5215 | 1.5215 | 1.5215 |
| 550 | 1.5175 | 1.5175 | 1.5175 |
| 650 | 1.5116 | 1.5116 | 1.5116 |

(Multilayer Body)

According to the condition shown in Table 3, the following values of a multilayer film of the alternately laminated layers A and B (A/B/A/B/ . . . A/B) was calculated based on the effective medium approximation theory. The calculation results are shown in Tables 3 and 4. In this example, a and b in Table 4 are the film thicknesses of layer A and layer B, respectively. The in-plane slow axis directions of layer A and the periodic structure were set the same as each other.

TABLE 3

| Total film thickness (nm) | Total number of layer A | Total number of layer B | Film thickness of layer A (nm) | Film thickness of layer B (nm) |
|---|---|---|---|---|
| 100000 | 4000 | 4000 | 15 | 10 |

| λ (nm) | R(nm) | Rth(nm) | $n_x$ | $n_y$ | $n_z$ | Nz |
|---|---|---|---|---|---|---|
| 450 | 196 | 44 | 1.5667 | 1.5648 | 1.5653 | 0.73 |
| 550 | 183 | 36 | 1.5604 | 1.5586 | 1.5591 | 0.70 |
| 650 | 176 | 30 | 1.5529 | 1.5511 | 1.5517 | 0.67 |

| R(450)/R(550) | R(650)/R(550) | Rth(450)/Rth(550) | Rth(650)/Rth(550) |
|---|---|---|---|
| 1.07 | 0.96 | 1.23 | 0.83 |

TABLE 4

| λ (nm) | $\sqrt{an_{nx}^2 + bn_{ix}^2}$ | $\frac{a+b}{\sqrt{an_{nz}^{-2} + bn_{iz}^{-2}}}$ | $\sqrt{an_{ny}^2 + bn_{iy}^2}$ |
|---|---|---|---|
| 450 | 7.8337 | 7.8266 | 7.8239 |
| 550 | 7.8019 | 7.7956 | 7.7928 |
| 650 | 7.7644 | 7.7585 | 7.7556 |

(Result)

As it is evident from the calculation results in Tables 3 and 4, the $N_Z$ values at all the calculation wavelengths satisfy Formula (5), and Formulae (3) and (4) are also satisfied.

Also, regarding R(450)/R(550), R(650)/R(550), Rth(450)/Rth(550), and Rth(650)/Rth(550) representing the wavelength dispersions of retardation, the values of R(450)/R(550) and Rth(450)/Rth(550) differ from each other, and the values of R(650)/R(550) and Rth(650)/Rth(550) differ from each other. The $N_Z$ values at the three wavelengths also differ from each other.

In a retardation film of a single layer, especially a retardation film produced by a stretching method of a polymer widely used in a liquid crystal display device, the values of R(450)/R(550) and Rth(450)/Rth(550) are generally the same as each other, and the values of R(650)/R(550) and Rth(650)/Rth(550) are generally the same as each other. Also, in this case, the $N_Z$ value does not depend on the wavelength, and is generally constant.

The R value is the information of optical anisotropy of a film in the case of a normal incident light, and on the other hand, the Rth value and $N_Z$ value are the information of optical anisotropy of a film in the case of an oblique incident light. Therefore, it is indicated that the retardation film of Design example 1 has different wavelength dispersions of optical anisotropies between the case of a normal incident light and the case of an oblique incident light. Therefore, the wavelength dispersions of optical anisotropies can be independently controlled for a normal incident light and an oblique incident light, while it cannot be achieved by a conventional retardation film. This is one of the specific features which is not conventionally achieved but is achieved by the retardation film of the present invention, because the retardation film of the present invention concomitantly uses both form birefringence and molecular-orientation birefringence. By applying these properties, for example, the wide viewing angle property can be improved in a liquid crystal display device using a vertically aligned liquid crystal, etc.

Furthermore, in order to confirm the applicability of the effective medium approximation theory to this design example, a 4×4 Jones matrix calculation was conducted to the same multilayer body as mentioned above. For the purpose of comparison, the index ellipsoid based on the effective medium approximation of the multilayer structure shown in Table 3 was compared to an outgoing polarized light obtained by radiating various kinds of polarized light to the multilayer structure comprising a lamination of total 8000 layers (4000 layers for layers A and B each). As a result, it was confirmed that the results were almost the same as each other, and therefore the effective medium approximation was effective in this design example.

[Design Example 2]

In Design example 2, the retardation film comprising the periodic structure having a unit of the layer (a) having negative optical anisotropy and the layer (i) having approximate optical isotropy is designed. In this example, the layer (a) having negative optical anisotropy is represented as layer A, and the layer (i) having approximate optical isotropy is represented as layer B.

(Layer A) Material: Polystyrene, which is the Same Material as that of Design Example 1

The three-dimensional refractive indices of the material at three wavelengths (450 nm, 550 nm, 650 nm) used in the calculation are shown in Table 5.

TABLE 5

| λ (nm) | $n_{ax}$ | $n_{ay}$ | $n_{az}$ |
|---|---|---|---|
| 450 | 1.5965 | 1.5928 | 1.5965 |
| 550 | 1.5887 | 1.5852 | 1.5887 |
| 650 | 1.5801 | 1.5768 | 1.5801 |

(Layer B) Material: Ethylene-Norbornene Copolymer, which is the Same Material as that of Design Example 1

The three-dimensional refractive indices of the material at three wavelengths (450 nm, 550 nm, 650 nm) used in the calculation are shown in Table 6.

TABLE 6

| λ (nm) | $n_{ix}$ | $n_{iy}$ | $n_{iz}$ |
|---|---|---|---|
| 450 | 1.5215 | 1.5215 | 1.5215 |
| 550 | 1.5175 | 1.5175 | 1.5175 |
| 650 | 1.5116 | 1.5116 | 1.5116 |

(Multilayer Body)

According to the condition shown in Table 7, the following values of a multilayer film of the alternately laminated layers A and B (A/B/A/B/ . . . A/B) was calculated based on the effective medium approximation theory. The calculation results are shown in Tables 7 and 8. In this example, a and b in Table 8 are film thicknesses of layer A and layer B, respectively. The in-plane slow axis directions of layer A and the periodic structure were set the same as each other.

TABLE 7

| Total film thickness (nm) | Total number of layer A | Total number of layer B | Film thickness of layer A (nm) | Film thickness of layer B (nm) |
|---|---|---|---|---|
| 90000 | 3000 | 3000 | 26 | 4 |

| λ (nm) | R(nm) | Rth(nm) | $n_x$ | $n_y$ | $n_z$ | Nz |
|---|---|---|---|---|---|---|
| 450 | 294 | 70 | 1.5867 | 1.5835 | 1.5859 | 0.26 |
| 550 | 275 | 68 | 1.5794 | 1.5763 | 1.5786 | 0.25 |
| 650 | 264 | 68 | 1.5712 | 1.5682 | 1.5704 | 0.24 |

| R(450)/R(550) | R(650)/R(550) | Rth(450)/Rth(550) | Rth(650)/Rth(550) |
|---|---|---|---|
| 1.07 | 0.96 | 1.03 | 0.99 |

TABLE 8

| λ (nm) | $\sqrt{an_{nx}^2 + bn_{ix}^2}$ | $\dfrac{a+b}{\sqrt{an_{nz}^{-2} + bn_{iz}^{-2}}}$ | $\sqrt{an_{ny}^2 + bn_{iy}^2}$ |
|---|---|---|---|
| 450 | 8.6910 | 8.6863 | 8.6731 |
| 550 | 8.6505 | 8.6463 | 8.6338 |
| 650 | 8.6056 | 8.6017 | 8.5895 |

As it is evident from the calculation results in Tables 7 and 8, the $N_Z$ values at all the calculation wavelengths satisfy Formula (5), and Formulae (3) and (4) are also satisfied.

Also, regarding R(450)/R(550), R(650)/R(550), Rth(450)/Rth(550), and Rth(650)/Rth(550) representing the wavelength dispersions of retardation, the values of R(450)/R(550) and Rth(450)/Rth(550) differ from each other, and the values of R(650)/R(550) and Rth(650)/Rth(550) differ from each other. The $N_Z$ values at the three wavelengths also differ from each other.

[Design Example 3]

In Design example 3, the retardation film comprising the periodic structure having a unit of the layer (a) having negative optical anisotropy and the layer (i) having approximate optical isotropy is designed. In this example, the layer (a) having negative optical anisotropy is represented as layer A, and the layer (i) having approximate optical isotropy is represented as layer B.

(Layer A) Material: Polystyrene, which is the Same Material as that of Design Example 1

The three-dimensional refractive indices of the material at three wavelengths (450 nm, 550 nm, 650 nm) used in the calculation are shown in Table 9.

TABLE 9

| λ (nm) | $n_{nx}$ | $n_{ny}$ | $n_{nz}$ |
|---|---|---|---|
| 450 | 1.5967 | 1.5924 | 1.5967 |
| 550 | 1.5888 | 1.5848 | 1.5888 |
| 650 | 1.5803 | 1.5764 | 1.5803 |

(Layer B) Material: Ethylene-Norbornene Copolymer, which is the Same Material as that of Design Example 1

The three-dimensional refractive indices of the material at three wavelengths (450 nm, 550 nm, 650 nm) used in the calculation are shown in Table 10.

TABLE 10

| λ (nm) | $n_{ix}$ | $n_{iy}$ | $n_{iz}$ |
|---|---|---|---|
| 450 | 1.5215 | 1.5215 | 1.5215 |
| 550 | 1.5175 | 1.5175 | 1.5175 |
| 650 | 1.5116 | 1.5116 | 1.5116 |

(Multilayer Body)

According to the condition shown in Table 11, the following values of a multilayer film of the alternately laminated layers A and B (A/B/A/B/ . . . A/B) was calculated based on the effective medium approximation theory. The calculation results are shown in Tables 11 and 12. In this example, a and b in Table 12 are film thicknesses of layer A and layer B, respectively. The in-plane slow axis directions of layer A and the periodic structure were set the same as each other.

TABLE 11

| Total film thickness (nm) | Total number of layer A | Total number of layer B | Film thickness of layer A (nm) | Film thickness of layer B (nm) |
|---|---|---|---|---|
| 100000 | 2500 | 2500 | 29 | 11 |

| λ (nm) | R(nm) | Rth(nm) | $n_x$ | $n_y$ | $n_z$ | Nz |
|---|---|---|---|---|---|---|
| 450 | 314 | −11 | 1.5764 | 1.5733 | 1.5749 | 0.47 |
| 550 | 293 | −15 | 1.5695 | 1.5666 | 1.5682 | 0.45 |
| 650 | 282 | −18 | 1.5617 | 1.5589 | 1.5605 | 0.44 |

| R(450)/R(550) | R(650)/R(550) | Rth(450)/Rth(550) | Rth(650)/Rth(550) |
|---|---|---|---|
| 1.07 | 0.96 | 0.73 | 1.22 |

TABLE 12

| λ (nm) | $\sqrt{an_{nx}^2 + bn_{ix}^2}$ | $\sqrt{\dfrac{a+b}{an_{nz}^{-2} + bn_{iz}^{-2}}}$ | $\sqrt{an_{ny}^2 + bn_{iy}^2}$ |
|---|---|---|---|
| 450 | 9.9700 | 9.9608 | 9.9501 |
| 550 | 9.9266 | 9.9183 | 9.9081 |
| 650 | 9.8770 | 9.8692 | 9.8592 |

As it is evident from the calculation results in Tables 11 and 12, the $N_Z$ values at all the calculation wavelengths satisfy Formula (5), and Formulae (3) and (4) are also satisfied.

Also, regarding R(450)/R(550), R(650)/R(550), Rth(450)/Rth(550), and Rth(650)/Rth(550) representing the wavelength dispersions of retardation, the values of R(450)/R(550) and Rth(450)/Rth(550) differ from each other, and the values of R(650)/R(550) and Rth(650)/Rth(550) differ from each other. The $N_Z$ values at the three wavelengths also differ from each other.

Furthermore, comparing R(450)/R(550) and Rth(450)/Rth(550) in detail, the former is greater than 1 and indicates the so-called ordinal retardation dispersion, while the latter is smaller than 1 and indicates the so-called inverse retardation dispersion wherein Rth becomes small as the wavelength increases. This means the wavelength dispersions of optical anisotropies for a normal incident light and an oblique incident light can be controlled independently from each other.

[Design Example 4]

In Design example 4, the retardation film comprising the periodic structure having a unit of the layer (a) having negative optical anisotropy and the layer (i) having approximate optical isotropy is designed. In this example, the layer (a) having negative optical anisotropy is represented as layer A, and the layer (i) having approximate optical isotropy is represented as layer B.

(Layer A) Material: Polystyrene, which is the Same Material as that of Design Example 1

The three-dimensional refractive indices of the material at three wavelengths (450 nm, 550 nm, 650 nm) used in the calculation are shown in Table 13.

TABLE 13

| λ (nm) | $n_{nx}$ | $n_{ny}$ | $n_{nz}$ |
|---|---|---|---|
| 450 | 1.5965 | 1.5928 | 1.5965 |
| 550 | 1.5887 | 1.5852 | 1.5887 |
| 650 | 1.5801 | 1.5768 | 1.5801 |

(Layer B) Material: Ethylene-Norbornene Copolymer, which is the Same Material as that of Design Example 1

The three-dimensional refractive indices of the material at three wavelengths (450 nm, 550 nm, 650 nm) used in the calculation are shown in Table 14.

TABLE 14

| λ (nm) | $n_{ix}$ | $n_{iy}$ | $n_{iz}$ |
|---|---|---|---|
| 450 | 1.5215 | 1.5215 | 1.5215 |
| 550 | 1.5175 | 1.5175 | 1.5175 |
| 650 | 1.5116 | 1.5116 | 1.5116 |

(Multilayer Body)

According to the condition shown in Table 15, the following values of a multilayer film of the alternately laminated layers A and B (A/B/A/B/ . . . A/B) was calculated based on the effective medium approximation theory. The calculation results are shown in Tables 15 and 16. In this example, a and b in Table 16 are film thicknesses of layer A and layer B, respectively. The in-plane slow axis directions of layer A and the periodic structure were set the same as each other.

TABLE 15

| Total film thickness (nm) | Total number of layer A | Total number of layer B | Film thickness of layer A (nm) | Film thickness of layer B (nm) |
|---|---|---|---|---|
| 80000 | 3200 | 3200 | 10 | 15 |

| λ (nm) | R(nm) | Rth(nm) | $n_x$ | $n_y$ | $n_z$ | Nz |
|---|---|---|---|---|---|---|
| 450 | 123 | 76 | 1.5520 | 1.5504 | 1.5502 | 1.12 |
| 550 | 115 | 67 | 1.5464 | 1.5449 | 1.5448 | 1.08 |
| 650 | 110 | 61 | 1.5394 | 1.5380 | 1.5379 | 1.05 |

| R(450)/R(550) | R(650)/R(550) | Rth(450)/Rth(550) | Rth(650)/Rth(550) |
|---|---|---|---|
| 1.07 | 0.96 | 1.14 | 0.91 |

TABLE 16

| λ (nm) | $\sqrt{an_{nx}^2 + bn_{ix}^2}$ | $\sqrt{\dfrac{a+b}{an_{nz}^{-2} + bn_{iz}^{-2}}}$ | $\sqrt{an_{ny}^2 + bn_{iy}^2}$ |
|---|---|---|---|
| 450 | 7.7598 | 7.7511 | 7.7521 |
| 550 | 7.7318 | 7.7240 | 7.7246 |
| 650 | 7.6969 | 7.6896 | 7.6900 |

As it is evident from the calculation results in Tables 15 and 16, the $N_z$ values at all the calculation wavelengths do not satisfy Formula (5).

Also, regarding R(450)/R(550), R(650)/R(550), Rth(450)/Rth(550), and Rth(650)/Rth(550) representing the wavelength dispersions of retardation, the values of R(450)/R(550) and Rth(450)/Rth(550) differ from each other, and the values of R(650)/R(550) and Rth(650)/Rth(550) differ from each other. The $N_z$ values at the three wavelengths also differ from each other.

[Design Example 5]

In Design example 5, the retardation film comprising the periodic structure having a unit of the layer (a) having negative optical anisotropy and the layer (b) having negative optical anisotropy is designed. In this example, the layer (a) having negative optical anisotropy is represented as layer A, and the layer (b) having negative optical anisotropy is represented as layer B.

(Layer A) Material: Copolymerized Polycarbonate having Fluorene Skeleton

Copolymerized polycarbonate having fluorene skeleton has negative molecular polarizability anisotropy, thus it exhibits negative optical anisotropy by stretching. The three-dimensional refractive indices of the material at three wavelengths (450 nm, 550 nm, 650 nm) used in the calculation are shown in Table 17.

TABLE 17

| λ (nm) | $n_{ax}$ | $n_{ay}$ | $n_{az}$ |
|---|---|---|---|
| 450 | 1.6381 | 1.6348 | 1.6390 |
| 550 | 1.6171 | 1.6144 | 1.6178 |
| 650 | 1.6069 | 1.6044 | 1.6076 |

(Layer B) Material: Poly(Acryloyl Morpholine)

Poly(acryloyl morpholine) has negative molecular polarizability anisotropy, thus it exhibits negative optical anisotropy by stretching. The three-dimensional refractive indices of the material at three wavelengths (450 nm, 550 nm, 650 nm) used in the calculation are shown in Table 18.

TABLE 18

| λ (nm) | $n_{bx}$ | $n_{by}$ | $n_{bz}$ |
|---|---|---|---|
| 450 | 1.5130 | 1.5102 | 1.5137 |
| 550 | 1.4949 | 1.4922 | 1.4956 |
| 650 | 1.4802 | 1.4776 | 1.4810 |

(Multilayer Body)

According to the condition shown in Table 19, the following values of a multilayer film of the alternately laminated layers A and B(A/B/A/B/...A/B) was calculated based on the effective medium approximation theory. The calculation results are shown in Tables 19 and 20. In this example, a and b in Table 20 are film thicknesses of layer A and layer B, respectively. The in-plane slow axis directions of each layer and the periodic structure were set the same as each other.

TABLE 19

| Total film thickness (nm) | Total number of layer A | Total number of layer B | Film thickness of layer A (nm) | Film thickness of layer B (nm) |
|---|---|---|---|---|
| 90000 | 3600 | 3600 | 5 | 20 |

TABLE 19-continued

| λ (nm) | R(nm) | Rth(nm) | $n_x$ | $n_y$ | $n_z$ | Nz |
|---|---|---|---|---|---|---|
| 450 | 256 | 81 | 1.5388 | 1.5360 | 1.5365 | 0.82 |
| 550 | 243 | 81 | 1.5201 | 1.5174 | 1.5178 | 0.83 |
| 650 | 238 | 107 | 1.5064 | 1.5038 | 1.5039 | 0.95 |

| R(450)/R(550) | R(650)/R(550) | Rth(450)/Rth(550) | Rth(650)/Rth(550) |
|---|---|---|---|
| 1.05 | 0.98 | 1.00 | 1.32 |

TABLE 20

| λ (nm) | $\sqrt{an_{ax}^2 + bn_{bx}^2}$ | $\dfrac{a+b}{\sqrt{an_{az}^{-2} + bn_{bz}^{-2}}}$ | $\sqrt{an_{ay}^2 + bn_{by}^2}$ |
|---|---|---|---|
| 450 | 7.6940 | 7.6824 | 7.6798 |
| 550 | 7.6004 | 7.5891 | 7.5869 |
| 650 | 7.5321 | 7.5196 | 7.5189 |

As it is evident from the calculation results in Tables 19 and 20, the $N_z$ values at all the calculation wavelengths satisfy Formula (5), and Formulae (3),(4) and (4') are also satisfied. Also, regarding R(450)/R(550), R(650)/R(550), Rth(450)/Rth(550), and Rth(650)/Rth(550) representing the wavelength dispersions of retardation, the values of R(450)/R(550) and Rth(450)/Rth(550) differ from each other, and the values of R(650)/R(550) and Rth(650)/Rth(550) differ from each other. The $N_z$ values at the three wavelengths also differ from each other.

In a retardation film of a single layer, especially a retardation film produced by a stretching method of a polymer widely used in a liquid crystal display device, the values of R(450)/R(550) and Rth(450)/Rth(550) are generally the same as each other, and the values of R(650)/R(550) and Rth(650)/Rth(550) are generally the same as each other. Also, in this case, the $N_Z$ value does not depend on the wavelength, and is generally constant.

The R value is the information of optical anisotropy of a film in the case of a normal incident light, and on the other hand, the Rth value and $N_z$ value are the information of optical anisotropy of a film in the case of an oblique incident light. Therefore, the data indicate that the retardation film of Design example 5 has different wavelength dispersions of optical anisotropies between the case of a normal incident light and the case of an oblique incident light. Therefore, the wavelength dispersions of optical anisotropies can be independently controlled for a normal incident light and an oblique incident light, while it cannot be achieved by a conventional retardation film. This is one of the specific features which is not conventionally achieved, but is achieved by the retardation film of the present invention, because the retardation film of the present invention concomitantly uses both form birefringence and molecular- orientation birefringence. By applying these properties, for example, the wide viewing angle property can be improved in a liquid crystal display device using a vertically aligned liquid crystal, etc.

Furthermore, in order to confirm the applicability of the effective medium approximation theory to this design example, a 4×4 Jones matrix calculation was conducted to the same multilayer body as above mentioned. For the purpose of comparison, the index ellipsoid based on the effective medium approximation of the multilayer structure shown in Table 19 was compared to an outgoing polarized light obtained by radiating various kinds of polarized light to the multilayer structure comprising a lamination of total 7200 layers (3600 layers for layers A and B each). As a result, it was confirmed that the results are almost the same as each other, and therefore the effective medium approximation was effective in this design example.

[Design Example 6]

In Design example 6, the retardation film comprising the periodic structure having a unit of the layer (a) having negative optical anisotropy and the layer (b) having negative optical anisotropy is designed. In this example, the layer (a) having negative optical anisotropy is represented as layer A, and the layer (b) having negative optical anisotropy is represented as layer B.

(Layer A) Material: Styrene-Maleic Anhydride Copolymer

Styrene-maleic anhydride copolymer has negative molecular polarizability anisotropy, thus it exhibits negative optical anisotropy by stretching. The three-dimensional refractive indices of the material at three wavelengths (450 nm, 550 nm, 650 nm) used in the calculation are shown in Table 21.

TABLE 21

| λ (nm) | $n_{ax}$ | $n_{ay}$ | $n_{az}$ |
|---|---|---|---|
| 450 | 1.5735 | 1.5698 | 1.5735 |
| 550 | 1.5604 | 1.5569 | 1.5604 |
| 650 | 1.5526 | 1.5493 | 1.5526 |

(Layer B) material: poly(acryloyl morpholine), which is the same material as that of Design example 5

The three-dimensional refractive indices of the material at three wavelengths (450 nm, 550 nm, 650 nm) used in the calculation are shown in Table 22.

TABLE 22

| λ (nm) | $n_{bx}$ | $n_{by}$ | $n_{bz}$ |
|---|---|---|---|
| 450 | 1.5135 | 1.5099 | 1.5135 |
| 550 | 1.4954 | 1.4919 | 1.4954 |
| 650 | 1.4808 | 1.4773 | 1.4808 |

(Multilayer Body)

According to the condition shown in Table 23, the following values of a multilayer film of the alternately laminated layers A and B (A/B/A/B/ . . . A/B) was calculated based on the effective medium approximation theory. The calculation results are shown in Tables 23 and 24. In this example, a and b in Table 24 are film thicknesses of layer A and layer B, respectively. The in-plane slow axis directions of each layer and the periodic structure were set the same as each other.

TABLE 23

| Total film thickness (nm) | Total number of layer A | Total number of layer B | Film thickness of layer A (nm) | Film thickness of layer B (nm) |
|---|---|---|---|---|
| 90000 | 3000 | 3000 | 15 | 15 |

| λ (nm) | R(nm) | Rth(nm) | $n_x$ | $n_y$ | $n_z$ | Nz |
|---|---|---|---|---|---|---|
| 450 | 328 | −59 | 1.5438 | 1.5402 | 1.5426 | 0.32 |
| 550 | 315 | −33 | 1.5282 | 1.5247 | 1.5268 | 0.40 |
| 650 | 307 | 0 | 1.5171 | 1.5137 | 1.5154 | 0.50 |

| R(450)/R(550) | R(650)/R(550) | Rth(450)/Rth(550) | Rth(650)/Rth(550) |
|---|---|---|---|
| 1.04 | 0.97 | 1.78 | 0.01 |

TABLE 24

| λ (nm) | $\sqrt{an_{ax}^2 + bn_{bx}^2}$ | $\dfrac{a+b}{\sqrt{an_{az}^{-2} + bn_{bz}^{-2}}}$ | $\sqrt{an_{ay}^2 + bn_{by}^2}$ |
|---|---|---|---|
| 450 | 8.4558 | 8.4494 | 8.4358 |
| 550 | 8.3704 | 8.3628 | 8.3512 |
| 650 | 8.3096 | 8.3002 | 8.2909 |

As it is evident from the calculation results in Tables 23 and 24, the $N_Z$ values at all the calculation wavelengths satisfy Formula (5), and Formulae (3), (4) and (4') are also satisfied.

Also, regarding R(450)/R(550), R(650)/R(550), Rth(450)/Rth(550), and Rth(650)/Rth(550) representing the wavelength dispersions of retardation, the values of R(450)/R(550) and Rth(450)/Rth(550) differ from each other, and the values of R(650)/R(550) and Rth(650)/Rth(550) differ from each other. The $N_Z$ values at the three wavelengths also differ from each other.

[Design Example 7]

In Design example 7, the retardation film comprising the periodic structure having a unit of the layer (a) having negative optical anisotropy and the layer (b) having negative optical anisotropy is designed. In this example, the layer (a) having negative optical anisotropy is represented as layer A, and the layer (b) having negative optical anisotropy is represented as layer B.

(Layer A) material: styrene-maleic anhydride copolymer of the same material as that of Design example 6

The three-dimensional refractive indices of the material at three wavelengths (450 nm, 550 nm, 650 nm) used in the calculation are shown in Table 25.

TABLE 25

| λ (nm) | $n_{ax}$ | $n_{ay}$ | $n_{az}$ |
|---|---|---|---|
| 450 | 1.5734 | 1.5702 | 1.5734 |
| 550 | 1.5602 | 1.5572 | 1.5602 |
| 650 | 1.5525 | 1.5496 | 1.5525 |

(Layer B) material: poly(acryloyl morpholine), which is the same material as that of Design example 5

The three-dimensional refractive indices of the material at three wavelengths (450 nm, 550 nm, 650 nm) used in the calculation are shown in Table 26.

TABLE 26

| λ (nm) | $n_{bx}$ | $n_{by}$ | $n_{bz}$ |
|---|---|---|---|
| 450 | 1.5128 | 1.5113 | 1.5128 |
| 550 | 1.4947 | 1.4932 | 1.4947 |
| 650 | 1.4801 | 1.4786 | 1.4801 |

(Multilayer Body)

According to the condition shown in Table 27, the following values of a multilayer film of the alternately laminated layers A and B (A/B/A/B/ . . . A/B) was calculated based on the effective medium approximation theory. The calculation results are shown in Tables 27 and 28. In this example, a and b in Table 28 are film thicknesses of layer A and layer B, respectively. The in-plane slow axis directions of each layer and the periodic structure were set the same as each other.

TABLE 27

| Total film thickness (nm) | Total number of layer A | Total number of layer B | Film thickness of layer A (nm) | Film thickness of layer B (nm) |
|---|---|---|---|---|
| 100000 | 2500 | 2500 | 15 | 25 |

| λ (nm) | R(nm) | Rth(nm) | $n_x$ | $n_y$ | $n_z$ | Nz |
|---|---|---|---|---|---|---|
| 450 | 217 | 3 | 1.5358 | 1.5336 | 1.5347 | 0.51 |
| 550 | 208 | 27 | 1.5196 | 1.5175 | 1.5183 | 0.63 |
| 650 | 202 | 60 | 1.5076 | 1.5056 | 1.5060 | 0.80 |

| R(450)/R(550) | R(650)/R(550) | Rth(450)/Rth(550) | Rth(650)/Rth(550) |
|---|---|---|---|
| 1.04 | 0.97 | 0.10 | 2.21 |

TABLE 28

| λ (nm) | $\sqrt{an_{ax}^{-2}+bn_{bx}^{-2}}$ | $\dfrac{a+b}{\sqrt{an_{az}^{-2}+bn_{bz}^{-2}}}$ | $\sqrt{an_{ay}^{-2}+bn_{by}^{-2}}$ |
|---|---|---|---|
| 450 | 9.7132 | 9.7062 | 9.6995 |
| 550 | 9.6108 | 9.6025 | 9.5976 |
| 650 | 9.5351 | 9.5250 | 9.5224 |

As it is evident from the calculation results in Tables 27 and 28, the $N_Z$ values at all the calculation wavelengths satisfy Formula (5), and Formulae (3), (4) and (4') are also satisfied.

Also, regarding R(450)/R(550), R(650)/R(550), Rth(450)/Rth(550), and Rth(650)/Rth(550) representing the wavelength dispersions of retardation, the values of R(450)/R(550) and Rth(450)/Rth(550) differ from each other, and the values of R(650)/R(550) and Rth(650)/Rth(550) differ from each other. The $N_Z$ values at the three wavelengths also differ from each other.

Furthermore, comparing R(450)/R(550) and Rth(450)/Rth(550) in detail, the former is greater than 1 and indicates the so-called ordinal retardation dispersion, while the latter is smaller than 1 and indicates the so-called inverse retardation dispersion wherein Rth becomes small as the wavelength increases. This means the wavelength dispersions of optical anisotropies for a normal incident light and an oblique incident light can be controlled independently.

[Design Example 8]

In Design example 8, the retardation film comprising the periodic structure having a unit of the layer (a) having negative optical anisotropy and the layer (b) having negative optical anisotropy is designed. In this example, the layer (a) having negative optical anisotropy is represented as layer A, and the layer (b) having negative optical anisotropy is represented as layer B.

(Layer A) material: copolymerized polycarbonate having fluorene skeleton, which is the same material as that of Design example 5

The three-dimensional refractive indices of the material at three wavelengths (450 nm, 550 nm, 650 nm) used in the calculation are shown in Table 29.

TABLE 29

| λ (nm) | $n_{ax}$ | $n_{ay}$ | $n_{az}$ |
|---|---|---|---|
| 450 | 1.6389 | 1.6341 | 1.6389 |
| 550 | 1.6177 | 1.6137 | 1.6177 |
| 650 | 1.6076 | 1.6038 | 1.6076 |

(Layer B) material: poly(acryloyl morpholine), which is the same material as that of Design example 5

The three-dimensional refractive indices of the material at three wavelengths (450 nm, 550 nm, 650 nm) used in the calculation are shown in Table 30.

TABLE 30

| λ (nm) | $n_{bx}$ | $n_{by}$ | $n_{bz}$ |
|---|---|---|---|
| 450 | 1.5136 | 1.5096 | 1.5136 |
| 550 | 1.4955 | 1.4915 | 1.4955 |
| 650 | 1.4809 | 1.4770 | 1.4809 |

(Multilayer Body)

According to the condition shown in Table 31, the following values of a multilayer film of the alternately laminated layers A and B (A/B/A/B/ ... A/B) was calculated based on the effective medium approximation theory. The calculation results are shown in Tables 31 and 32. In this example, a and b in Table 32 are film thicknesses of layer A and layer B, respectively. The in-plane slow axis directions of each layer and the periodic structure were set the same as each other.

TABLE 31

| Total film thickness (nm) | Total number of layer A | Total number of layer B | Film thickness of layer A (nm) | Film thickness of layer B (nm) |
|---|---|---|---|---|
| 90000 | 3000 | 3000 | 15 | 15 |

| λ (nm) | R(nm) | Rth(nm) | $n_x$ | $n_y$ | $n_z$ | Nz |
|---|---|---|---|---|---|---|
| 450 | 401 | 247 | 1.5775 | 1.5731 | 1.5726 | 1.12 |
| 550 | 360 | 251 | 1.5578 | 1.5538 | 1.5530 | 1.20 |
| 650 | 347 | 294 | 1.5455 | 1.5417 | 1.5403 | 1.35 |

| R(450)/R(550) | R(650)/R(550) | Rth(450)/Rth(550) | Rth(650)/Rth(550) |
|---|---|---|---|
| 1.11 | 0.96 | 0.98 | 1.17 |

TABLE 32

| λ (nm) | $\sqrt{an_{ax}^{-2}+bn_{bx}^{-2}}$ | $\dfrac{a+b}{\sqrt{an_{az}^{-2}+bn_{bz}^{-2}}}$ | $\sqrt{an_{ay}^{-2}+bn_{by}^{-2}}$ |
|---|---|---|---|
| 450 | 8.6405 | 8.6132 | 8.6161 |
| 550 | 8.5326 | 8.5063 | 8.5107 |
| 650 | 8.4652 | 8.4368 | 8.4441 |

As it is evident from the calculation results in Tables 31 and 32, the $N_Z$ values at all the calculation wavelengths do not satisfy Formula (3).

Also, regarding R(450)/R(550), R(650)/R(550), Rth(450)/Rth(550), and Rth(650)/Rth(550) representing the wavelength dispersions of retardation, the values of R(450)/R(550) and Rth(450)/Rth(550) differ from each other, and the values of R(650)/R(550) and Rth(650)/Rth(550) differ from each other. The $N_Z$ values at the three wavelengths also differ from each other.

<Application of Retardation Film>

[Laminated Retardation Film]

The retardation film of the present invention functions sufficiently as a retardation film by itself, and also may be used in combination with other retardation films if necessary.

[Laminated Polarizing Film]

The retardation film of the present invention may be laminated with a polarizing film to form a laminated polarizing film. FIG. 5 shows an example of the laminated polarizing film. In FIG. 5, 51 is a polarizing film, 52 is a retardation film of the present invention, 53 is an optical arrangement of the laminated polarizing film of the present invention, 54 is an absorption axis, 55 is a within-plane slow axis of the retardation film, and 56 is a laminated polarizing film of the present invention.

When the laminated polarizing film is used for the purpose of widening the viewing angle of a liquid crystal display device, the polarizing axis of the polarizing film and the within-plane slow axis of the retardation film of the present invention are preferably arranged in parallel or perpendicular to each other.

When the polarizing axis of the polarizing film and the within-plane slow axis of the retardation film of the present invention are arranged in parallel, the variation of angles between them is preferably in the range of 0±2°, more preferably in the range of 0±1°, still more preferably in the range of 0±0.5°, and most preferably in the range of 0±0.3°.

When the polarizing axis of the polarizing film and the within-plane slow axis of the retardation film of the present invention are arranged perpendicularly, the variation of angles between them is preferably in the range of 90±2°, more preferably in the range of 90±1°, still more preferably in the range of 90±0.5°, and most preferably in the range of 90±0.3°.

In order to highly widen the viewing angle of a liquid crystal display device, it is preferable that the polarizing axis of a polarization plate and the slow axis of the retardation film of the present invention are arranged in parallel or perpendicular to each other, and the following formula (36) and the above formula (5) are satisfied. Furthermore, the retardation film herein preferably comprises only one periodic structure.

$$100 \text{ nm} < R < 350 \text{ nm} \quad (36)$$

When the viewing angle is highly widened, it is preferable that the polarizing axis of a polarization plate and the slow axis of the retardation film of the present invention are arranged in parallel or perpendicular to each other, and the following formulae (37) and (38) are satisfied.

$$150 \text{ nm} < R < 300 \text{ nm} \quad (37)$$

$$0.2 < N_Z < 0.8 \quad (38)$$

The polarizing film is not specifically limited. An appropriate polarizing film may be used as long as light in a predetermined polarization state can be obtained. Especially, a film which can achieve a linearly-polarized transmitted light is preferable.

When a protective film for protecting the polarizing film exists on the polarizing film, the optical anisotropy of the protective film is preferably as small as possible, specifically in-plane retardation thereof is 10 nm or less, more preferably 7 nm or less, and most preferably 5 nm or less. Also, Rth($\lambda$) of the protecting film is preferably 70 nm or less, more preferably 50 nm or less, still more preferably 30 nm or less, and most preferably 20 nm or less.

Furthermore, the slow axis within the film plane of the protective film is preferably arranged perpendicularly or in parallel to the absorption axis of the polarizing film, and is more preferably arranged in parallel from the perspective of the continuous production of the polarizing film.

The protective film for protecting the polarizing film is not specifically limited, and is selected accordingly from known films which have been conventionally used. Among them, cellulose acetate is preferably used.

In the laminated polarizing film of the present invention, the retardation film of the present invention itself can also function as a protective film for protecting the polarizing film. Accordingly, the use of the protective film for protecting the polarizing film can be omitted, and the influence of variability due to the optical anisotropy of the protective film can be eliminated, and thus the optical quality can be further improved.

When the polarizing film and the retardation film are laminated, they can be fixed with an adhesive, etc., if necessary. From the perspective of preventing the misalignment of axes, etc., the polarizing film and the retardation film are preferably fixed by an adhesive. For an adhesive, a transparent adhesive can be used, and the kind thereof is not specifically limited. From the perspective of preventing a change in the optical property, etc., an adhesive which does not require a high temperature process in curing or drying is preferable, and an adhesive which does not require a long term curing process or drying process is preferable. Also, an adhesive which does not cause flaking under a heated or humidified condition is preferable.

Each layer such as the above polarizing film, retardation film, protective film for protecting the polarizing film, and adhesive layer can have an ultraviolet absorbing function by treating the layer with an ultraviolet absorbing agent, such as a salicylate ester compound, a benzophenol compound, a benzotriazole compound, a cyanoacrylate compound, and a nickel complex compound.

[Liquid Crystal Display Device]

Also, when the laminated polarizing film and the retardation film of the present invention are applied to a liquid crystal display device, a liquid crystal display device having a remarkably improved viewing angle property, etc. can be obtained. A liquid crystal display device for this application is not specifically limited, and various systems such as IPS, VA, TN, and OCB modes can be applied.

As an example of the liquid crystal display device of the present invention, FIG. 6 shows an arrangement of a preferable optical film to an IPS mode liquid crystal display device. A retardation film of the present invention comprising one periodic structure having an R value of $\lambda/2$ (nm) and an $N_Z$ value of 0.5, is used. In FIG. 6, 61 is a polarizing film, 62 is an IPS liquid crystal cell, 63 is a retardation film of the present invention, 64 is a polarizing film, 65 is an absorption axis, 66 is a slow axis of the liquid crystal layer, 67 is a slow axis of the retardation film of the present invention, and 68 is an absorption axis.

[Photoelastic Coefficient of Retardation Film]

The photoelastic coefficient of the retardation film of the present invention is measured by using a known ellipsometer, etc. If the absolute value of the photoelastic coefficient is large, when the retardation film is implemented in a liquid crystal display device, the retardation values may fluctuate, and thus the contrast may be lowered, or light may leak sparsely onto the display at a dark state of the liquid crystal display device which results in the generation of an optical mottle. At a measuring light wavelength of 550 nm, the absolute value of the photoelastic coefficient is preferably $15 \times 10^{-12}$ Pa$^{-1}$ or less, more preferably $10 \times 10^{-12}$ Pa$^{-1}$ or less, and still more preferably $5 \times 10^{-12}$ Pa$^{-1}$ or less. It is more preferable that the signs of the photoelastic coefficients of the materials constituting the layers in the periodic structure differ from each other, for example the signs of the photoelastic coefficients of the material constituting the layer (a) having negative optical anisotropy and the material constituting the layer (i) having approximate optical isotropy differ from each other, or the signs of the photoelastic coefficients of the material constituting the layer (a) having negative optical anisotropy and the material constituting the layer (b) having negative optical anisotropy differ from each other. This is because the photoelastic coefficients of each layer are offset since the signs of the photoelastic coefficients of the materials constituting these layers differ from each other, and thereby the absolute value of the photoelastic coefficient can be reduced.

EXAMPLES

The present invention is described below in more detail by referring to the examples, but the present invention is not limited to the examples.

<Measuring and Evaluating Method>

In the examples, the following items were measured and evaluated by the following methods.

(1) In-Plane Retardation Value (R(λ) (nm)), Thickness-Direction Retardation Value (Rth(λ) (nm)), and Thickness-Direction Orientation Index ($N_Z$(λ) Value)

The in-plane retardation value (R(λ) (nm)), the thickness-direction retardation value (Rth(λ) (nm)), and the orientation index in the thickness direction ($N_Z$(λ) value) were determined by using a spectroscopic ellipsometer (manufactured by JASCO corporation, trade name: M150). The R value was measured at a state wherein the incoming light was perpendicular to the film surface. In order to determine the Rth value and $N_Z$ value, the angle of the incoming light to the film surface was changed, and the retardation value was measured at each angle, and then a numerical value of three-dimensional refractive indices ($n_x$, $n_y$, and $n_z$) was determined by curve fitting using a known index ellipsoid formula. In this numerical operation, an average refractive index n is required as another parameter, and the value measured by Abbe Refractometer (manufactured by Atago Co., Ltd., trade name: Abbe Refractometer 2-T) or prism coupling method (manufactured by Prism Coupler Metricon Corp., trade name: Prism Coupler MODEL2010) was used. The Rth value and $N_Z$ value each was obtained by substituting the obtained three-dimensional refractive indices into the following formulae (20) and (42). The observation wavelength is 550 nm, unless not otherwise specified, in the present examples.

$$Nz = \frac{n_x - n_z}{n_x - n_y} \quad (20)$$

$$Rth = \left(\frac{n_x + n_y}{2} - n_z\right)d \quad (42)$$

(2) Glass-Transition Temperature (Tg)

The glass-transition temperature (Tg) was measured by a differential scanning calorimeter (manufactured by TA instruments, trade name: DSC Q10).

(3) Thickness of Film

The thickness of the film was measured by an electronic film thickness micrometer (manufactured by Anritsu Corp.)

(4) Total Light Transmittance and Haze Value of Film

The total light transmittance and the haze value of the film were measured by a turbidimeter (manufactured by Nippon Denshoku Industries Co., Ltd., type: NDH-2000).

(5) Measurement of Film Thickness of Each Layer

A thin film segment (thickness of about 60 nm) of a cross-section of a retardation film was prepared by a microtome (manufactured by Leica Microsystems K.K., trade name: ULTRACUT-S). Then, the segment was observed and photographed by a transmission electron microscope (manufactured by FEI, trade name: TECNAI-G2) at an acceleration voltage of 120 kV, and from the photograph, the thickness of each layer was determined. The thickness of a blend region was measured by line profiling of the number of transmission electrons in the direction of the film thickness.

(6) Validation Method of Formulae (1) and (3)

(6-i) Measurement of Property of Single Resin Constituting Each Layer of Periodic Structure By using a melt extrusion method or a solution casting method, the dispersions of average refractive indices (n(450), n(550), n(650): the inside of parentheses represents the observation wavelengths (nm)) of films made of single layer A or B were measured by Abbe Refractometer (manufactured by Atago Co., Ltd., trade name: Abbe Refractometer 2-T) or prism coupling method (manufactured by Prism Coupler Metricon Corp., trade name: Prism Coupler MODEL2010). Then, longitudinal uniaxial stretching was performed to these films at the temperature of each glass-transition temperature +10° C., and the dispersion values of birefringent indices (Δn(450)/Δn(550), Δn(650)/Δn(550): the inside of parentheses represent the observation wavelengths (nm)) were measured by a spectroscopic ellipsometer (manufactured by JASCO corporation, trade name: M150).

(6-ii) Measurements of Dispersions of R and Rth of Retardation Film Comprising Periodic Structure The dispersions of R and Rth of the retardation film comprising the periodic structure were measured by a spectroscopic ellipsometer (manufactured by JASCO corporation, trade name: M150). The observation wavelengths were 450 nm, 550 nm and 650 nm.

(6-iii) Measurement of Film Thickness of Each Layer in Periodic Structure

The average thicknesses of layer A, layer B, and the blend layer were determined by performing the measurement in the same way as that of the above (5).

(6-iv) Determination of Wavelength Dispersion of Three-Dimensional Refractive Indices of Each Layer in Periodic Structure When the blend layer is not deemed to exist in the periodic structure from the observation by an electron microscope, Formulae (10) to (12) or formulae (13) to (15) were used. On the other hand, when the blend layer exists, Formulae (10') to (12') or formulae (13') to (15') were used. These formulae and the data obtained in (6-i) to (6-iii) were used to obtain the wavelength dispersion of the three-dimensional refractive indices of each layer in the periodic structure.

(6-v) Validation of Formulae (1) and (3)

The formulae (1) and (3) were validated by using the data obtained in (6-i) to (6-iv) above.

(7) Measurement of Melt Viscosity

The melt viscosity was measured by Capirograph 1B (trade name) manufactured by Toyo Seiki Seisaku-Sho, Ltd. The test temperature was 250° C. and the shear rate was 180 sec$^{-1}$.

Example 1

Optical Design of Periodic Structure

In the same way as the above design examples, a periodic structure having a unit of the layer (a) having negative optical anisotropy and the layer (i) having approximate optical isotropy was designed as shown in Tables 33 to 36, and according to the design, a periodic structure was prepared as follows. In this example, a and b in Table 36 are film thicknesses of layer A and layer B, respectively. The in-plane slow axis direction of layer (a) having negative optical anisotropy and the in-plane slow axis direction of the periodic structure were set the same as each other.

(1) Preparation of Material Constituting Layer (a) (Layer A) Having Negative Optical Anisotropy To a monomer (manufactured by Kohjin Co., Ltd, trade name: ACMO) having the following chemical formula (1), an initiator (manufactured by Ciba Specialty Chemicals Corp., trade name: IRGACURE 184) was added at a mixing ratio of 0.1 mass % based on the monomer, and 100 g of the resulting mixture was put into an Erlenmeyer flask and the flask was sealed. Then, an ultraviolet light of a light intensity of 30 mW/cm$^2$ was irradiated to the mixture for two minutes by using a mercury lamp as light source in order to conduct polymerization and obtain a polymer. The glass-transition temperature of the obtained polymer was 140° C. Water was added to the obtained polymer to prepare a 1 mass % aqueous solution, and the solution was referred to as Spin coating solution N.

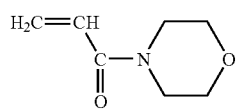
(I)

The monomer containing the initiator in the same mixing ratio as above was poured into a mold (which is designed to form a film) made of Teflon (registered trademark) resin, and under a nitrogen atmosphere, a film having a thickness of 200 μm was produced by the UV polymerization method as described above. The obtained film was uniaxially stretched under a condition of a width of 30 mm, a chuck-to-chuck distance of 50 mm, a stretching temperature of 140° C., and a draw ratio of 2 folds, by using a longitudinal uniaxial stretching machine, to obtain a stretched film. The stretched film thus obtained had a film thickness of 140 μm, an R value of 490 nm, an $N_Z$ value of 0, and negative optical anisotropy. In other words, the obtained polymer had negative molecular polarizability anisotropy. The wavelength dispersion date of the three-dimensional refractive indices of the stretched film thus obtained is shown in Table 33.

TABLE 33

| λ (nm) | $n_{nx}$ | $n_{ny}$ | $n_{nz}$ |
|---|---|---|---|
| 450 | 1.5135 | 1.5098 | 1.5135 |
| 550 | 1.4954 | 1.4919 | 1.4954 |
| 650 | 1.4807 | 1.4774 | 1.4807 |

(2) Preparation of Material Constituting Layer (i) (Layer B) Having Approximate Optical Isotropy As a material having approximate optical isotropy, copolymerized polycarbonate having fluorene skeleton was synthesized. A known interfacial polymerization method using phosgene was used for the polycarbonate polymerization. Specifically, into a vessel equipped with a stirrer, a thermometer and a reflux condenser, a sodium hydroxide aqueous solution and ion-exchanged water was poured, and then monomers having the following chemical formulae (II) and (III) were dissolved therein at a molar ratio of 72.3 to 27.7, respectively, and furthermore a small amount of hydrosulfite was added.

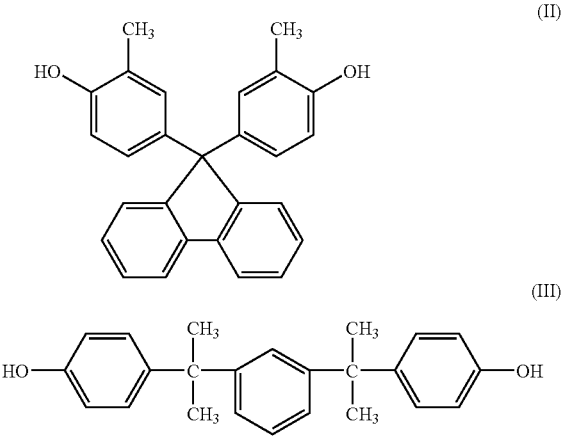

Next, methylene chloride was added to the mixture, and phosgene was blown into the mixture at 20° C. for about 60 minutes. Then, after emulsification by the addition of p-tert-butylphenol, triethylamine was added and stirred for about 3 hours at 30° C., and then the reaction was stopped. After the reaction was completed, the organic phase was isolated and methylene chloride was evaporated to obtain a polycarbonate copolymer. The composition ratio of the resulting copolymer was almost the same as that of the starting materials, and the glass-transition temperature of the copolymer was 204° C.

For the purpose of conforming the glass-transition temperatures of the polymers constituting a multilayer structure to one another, both a phosphate ester compound (manufactured by Daihachi Chemical Industry Co., Ltd., trade name: PX200) comprising a compound having the following chemical formula (IV) as a main component and the obtained polycarbonate copolymer were dissolved in methylene chloride at a ratio of 20 mass % and 80 mass % respectively to prepare a doped solution having a concentration of 20 mass %.

The obtained doped solution was film-formed on a glass by a solution casting method, and after putting into an isothermal dryer at 40° C. for 10 minutes, the film was removed from the glass. Then, the film was sandwiched between rectangular metallic frames, and further dried at 80° C. for 10 minutes and then 140° C. for 1 hour in an isothermal dryer. The glass-transition temperature of the obtained film was 135° C., and the film thickness was 100 μm.

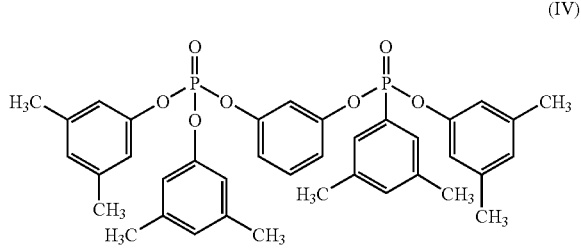

The obtained film was uniaxially stretched under a condition of a width of 30 mm, a chuck-to-chuck distance of 50 mm, a stretching temperature of 140° C., and a draw ratio of 2 folds, by using a longitudinal uniaxial stretching machine. The stretched film thus obtained had a film thickness of 75 μm, an R value of 10 nm, and an $N_Z$ value of 1, and it was found that the film was optically isotropic even after the stretching. The optical isotropy satisfied Formula (27). The wavelength dispersion data of the three-dimensional refractive indices of the stretched film thus obtained is shown in Table 34.

TABLE 34

| λ (nm) | $n_{ix}$ | $n_{iy}$ | $n_{iz}$ |
|---|---|---|---|
| 450 | 1.603 | 1.603 | 1.603 |
| 550 | 1.582 | 1.582 | 1.582 |
| 650 | 1.55 | 1.55 | 1.55 |

Next, the obtained polycarbonate copolymer and the phosphate ester compound (manufactured by Daihachi Chemical Industry Co., Ltd., trade name: PX200) were dissolved in toluene at a ratio of 80 mass % and 20 mass % respectively to prepare a toluene solution having a solid content concentration of 0.4 mass %, and this solution was referred to as Spin coating solution I.

(3) Preparation of Retardation Film Comprising One Periodic Structure

Under the condition shown in Table 35, an alternately laminated multilayer film having a unit of the layer (a) (layer A) having negative optical anisotropy and the layer (i) (layer B) having approximate optical isotropy was formed by a spin coating method. Specifically, Spin coating solutions N and I obtained above were alternately laminated by a spin coating method on a glass substrate (a diameter of 15 cm) whose surface was polished. Before coating each layer, UV-ozone treatment was conducted for 150 seconds as a surface treatment. For the UV-ozone treatment, AI UV-ozone cleaner OC-250615-D+A (trade name) and AI ozone decomposer OCA-150L-D (trade name) manufactured by AI Graphics Co., Ltd. were used. The amounts of coatings in the spin coating were 3 ml for Spin coating solution N and 8 ml for Spin coating solution I.

Regarding the rotation conditions, the rotation speed was 4000 round per minutes and the time was 20 seconds.

The obtained repeated multilayer was removed from the glass, and uniaxial stretching was performed to a width of 30 mm, a chuck-to-chuck distance of 50 mm, a stretching temperature of 140° C., and a draw ratio of 2 folds, by using a longitudinal uniaxial stretching machine, to obtain a retardation film.

TABLE 35

| Total film thickness (nm) | Total number of layer A | Total number of layer B | Film thickness of layer A (nm) | Film thickness of layer B (nm) |
|---|---|---|---|---|
| 99200 | 3200 | 3200 | 25 | 6 |

| λ (nm) | R(nm) | Rth(nm) | $n_x$ | $n_y$ | $n_z$ | Nz |
|---|---|---|---|---|---|---|
| 450 | 296 | 8 | 1.5313 | 1.5283 | 1.5297 | 0.53 |
| 550 | 277 | 10 | 1.5125 | 1.5097 | 1.5110 | 0.54 |
| 650 | 266 | −36 | 1.4944 | 1.4917 | 1.4934 | 0.36 |

| R(450)/R(550) | R(650)/R(550) | Rth(450)/Rth(550) | Rth(650)/Rth(550) |
|---|---|---|---|
| 1.07 | 0.96 | 0.82 | −3.60 |

TABLE 36

| λ (nm) | $\sqrt{an_{nx}^2 + bn_{ix}^2}$ | $\dfrac{a+b}{\sqrt{an_{nz}^{-2} + bn_{iz}^{-2}}}$ | $\sqrt{an_{ny}^2 + bn_{iy}^2}$ |
|---|---|---|---|
| 450 | 8.5257 | 8.5170 | 8.5091 |
| 550 | 8.4214 | 8.4130 | 8.4058 |
| 650 | 8.3204 | 8.3149 | 8.3054 |

(4) Evaluation of Retardation Film

The obtained retardation film was a biaxial retardation film having an R value of 270 nm, a film thickness of 100 μm, and an $N_Z$ value of 0.5. The total light transmittance was 91% and the haze value was 0.6%.

Also, when the transmittance and the reflectance were measured by using a spectrophotometer (manufactured by Hitachi Ltd., trade name: U4000), the internal reflection was almost 0% at the observation wavelength of 550 nm.

Also, the cross-section of the retardation film was observed with a transmission electron microscope, and it was confirmed that the thickness was almost the same as designed.

The layer made from Spin coating solutions N and I were referred to as layer N and layer I, respectively, and the average optical anisotropy of each layer was obtained by using Formulae (10) to (12). The optical anisotropy of each layer in the multilayer structure of the retardation film is difficult to be measured directly. However, as mentioned above, the average optical anisotropy of each layer can be determined by using Formulae (10) to (12) and applying refractive index wavelength dispersion and birefringence wavelength dispersion which are intrinsic properties of the material constituting layer N and layer I, a film thickness of each layer, a number of layer, and wavelength dispersion data of the R value and the Rth value of the periodic structure. As a result, the average optical anisotropy was almost in accordance with the design, and furthermore it was confirmed that Formulae (3) and (4) were satisfied.

Example 2

Optical Design of Periodic Structure

In the same way as the above Design examples 4 to 8, a periodic structure having a unit of the layer (a) having negative optical anisotropy and the layer (b) having negative optical anisotropy was designed as shown in Tables 37 to 40, and according to the design, a periodic structure was prepared. In this example, a and b in Table 40 are film thicknesses of layer A and layer B, respectively. The in-plane slow axis directions of each layer and the periodic structure were set the same as each other.

(1) Preparation of Material Constituting Layer (B) (Layer B) Having Negative Optical Anisotropy To a monomer (manufactured by Kohjin Co., Ltd, trade name: ACMO) having the following chemical formula (1), an initiator (manufactured by Ciba Specialty Chemicals Corp., trade name: IRGACURE 184) was added at a mixing ratio of 0.1 mass % based on the monomer, and 100 g of the resulting mixture was put into an Erlenmeyer flask and the flask was sealed. Then, an ultraviolet light of the light intensity of 30 mW/cm$^2$ was irradiated to the mixture for two minutes by using a mercury lamp as light source to conduct a polymerization and obtain a polymer. The glass-transition temperature of the obtained polymer was 140° C. Water was added to the obtained polymer to prepare a 1 mass % aqueous solution, and the solution was referred to as Spin coating solution B.

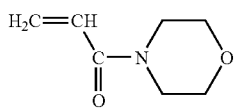
(I)

The monomer containing the initiator in the same mixing ratio as above was poured into a mold (which is designed to form a film) made of Teflon (registered trademark) resin, and under a nitrogen atmosphere, a film having a thickness of 200 μm was produced by the UV polymerization method as described above. The obtained film was uniaxially stretched under a condition of a width of 30 mm, a chuck-to-chuck distance of 50 mm, a stretching temperature of 142° C., and a draw ratio of 2 folds, by using a longitudinal uniaxial stretching machine, to obtain a stretched film. The stretched film thus obtained had a film thickness of 140 μm, an R value of 430 nm, an $N_Z$ value of 0, and negative optical anisotropy. In other words, the obtained polymer had negative molecular polarizability anisotropy. The wavelength dispersions data of the three-dimensional refractive indices of the stretched film thus obtained is shown in Table 37.

TABLE 37

| λ (nm) | $n_{bx}$ | $n_{by}$ | $n_{bz}$ |
|---|---|---|---|
| 450 | 1.5133 | 1.5102 | 1.5133 |
| 550 | 1.4952 | 1.4922 | 1.4952 |
| 650 | 1.4806 | 1.4776 | 1.4806 |

(2) Preparation of Material Constituting Layer (a) (Layer A) Having Negative Optical Anisotropy As a material of the layer (a) having negative optical anisotropy, copolymerized polycarbonate having fluorene skeleton was synthesized. A known interfacial polymerization method using phosgene was used for the polycarbonate polymerization. Specifically, into a vessel equipped with a stirrer, a thermometer and a reflux condenser, a sodium hydroxide aqueous solution and ion-exchanged water was poured, and then monomers having the following chemical formulae (II) and (III) were dissolved therein at a molar ratio of 85 to 15, respectively, and furthermore a small amount of hydrosulfite was added.

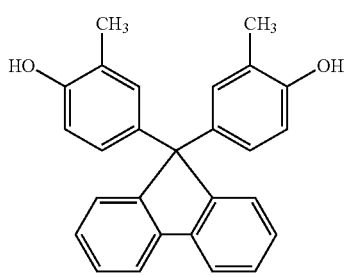
(II)

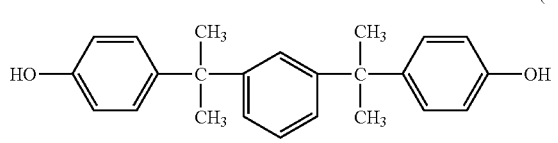
(III)

Next, methylene chloride was added to this mixture, and phosgene was blown into the mixture at 20° C. for about 60 minutes. Then, after emulsification by the addition of p-tert-butylphenol, triethylamine was added and stirred for about 3 hours at 30° C., and then the reaction was stopped. After the reaction was completed, the organic phase was isolated and methylene chloride was evaporated to obtain a polycarbonate copolymer. The composition ratio of the resulting copolymer was almost the same as that of the starting materials, and the glass-transition temperature of the copolymer was 225° C.

For the purpose of conforming the glass-transition temperatures of the polymers constituting a multilayer structure to one another, both a phosphate ester compound (manufactured by Daihachi Chemical Industry Co., Ltd., trade name: PX200) comprising a compound having the following chemical formula (IV) as a main component and the obtained polycarbonate copolymer were dissolved in methylene chloride at a ratio of 30 mass % and 70 mass % respectively to prepare a doped solution having a concentration of 20 mass %.

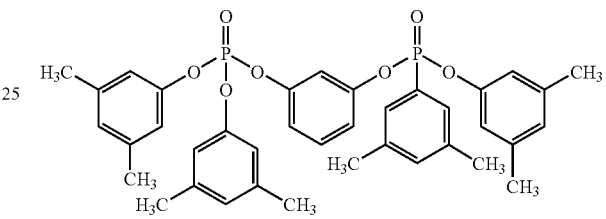
(IV)

The obtained doped solution was film-formed on a glass by a solution casting method, and after putting into an isothermal dryer at 40° C. for 10 minutes, the film was removed from the glass. Then, the film was sandwiched between rectangular metallic frames and further dried at 80° C. for 10 minutes and then 140° C. for 1 hour in an isothermal dryer. The glass-transition temperature of the obtained film was 134° C., and the film thickness was 100 μm.

The obtained film was uniaxially stretched under a condition of a width of 30 mm, a chuck-to-chuck distance of 50 mm, a stretching temperature of 142° C., and a draw ratio of 2 folds, by using a longitudinal uniaxial stretching machine. The stretched film thus obtained had a film thickness of 75 μm and an R value of 150 nm and an $N_Z$ value of 0. This satisfied Formula (40). The wavelength dispersion data of the three-dimensional refractive indices of the stretched film thus obtained is shown in Table 38.

TABLE 38

| λ (nm) | $n_{ax}$ | $n_{ay}$ | $n_{az}$ |
|---|---|---|---|
| 450 | 1.6381 | 1.6357 | 1.6381 |
| 550 | 1.6171 | 1.6151 | 1.6171 |
| 650 | 1.6069 | 1.6050 | 1.6069 |

Next, the obtained polycarbonate copolymer and the phosphate ester compound (manufactured by Daihachi Chemical Industry Co., Ltd., trade name: PX200) were dissolved in toluene at a ratio of 70 mass % and 30 mass % respectively to prepare a toluene solution having a solid content concentration of 0.4 mass %, and this solution was referred to as Spin coating solution A.

(3) Preparation of Retardation Film Comprising One Periodic Structure

Under the condition shown in Table 39, an alternately laminated multilayer film having a unit of the layer (a) (layer A) having negative optical anisotropy and the layer (b) (layer B) having negative optical anisotropy was formed by a spin coating method. Specifically, Spin coating solutions A and B obtained above were alternately laminated by a spin coating method on a glass substrate (a diameter of 15 cm) whose surface was polished. Before coating each layer, UV-ozone treatment was conducted for 150 seconds as a surface treatment. For the UV-ozone treatment, AI UV-ozone cleaner OC-250615-D+A (trade name) and AI ozone decomposer OCA-150L-D (trade name) manufactured by AI Graphics Co., Ltd. were used. The amounts of coatings in the spin coating were 3 ml for Spin coating solution A and 6 ml for Spin coating solution B. Regarding the rotation conditions, the rotation speed was 4000 round per minutes and the time was 20 seconds.

The obtained repeated multilayer was removed from the glass, and uniaxial stretching was performed under a condition of a width of 30 mm, a chuck-to-chuck distance of 50 mm, a stretching temperature of 142° C. and a draw ratio of 2 folds, by using a longitudinal uniaxial stretching machine, to obtain a retardation film.

TABLE 39

| Total film thickness (nm) | Total number of layer A | Total number of layer B | Film thickness of layer A (nm) | Film thickness of layer B (nm) |
|---|---|---|---|---|
| 80000 | 2000 | 2000 | 5 | 35 |

| λ (nm) | R(nm) | Rth(nm) | $n_x$ | $n_y$ | $n_z$ | Nz |
|---|---|---|---|---|---|---|
| 450 | 241 | 48 | 1.5295 | 1.5265 | 1.5274 | 0.70 |
| 550 | 234 | 45 | 1.5110 | 1.5081 | 1.5090 | 0.69 |
| 650 | 231 | 60 | 1.4970 | 1.4941 | 1.4948 | 0.76 |

| R(450)/R(550) | R(650)/R(550) | Rth(450)/Rth(550) | Rth(650)/Rth(550) |
|---|---|---|---|
| 1.03 | 0.99 | 1.05 | 1.33 |

TABLE 40

| λ (nm) | $\sqrt{an_{ax}^2 + bn_{bx}^2}$ | $\dfrac{a+b}{\sqrt{an_{az}^2 + bn_{bz}^2}}$ | $\sqrt{an_{ay}^2 + bn_{by}^2}$ |
|---|---|---|---|
| 450 | 9.6733 | 9.6600 | 9.6543 |
| 550 | 9.5563 | 9.5435 | 9.5378 |
| 650 | 9.4678 | 9.4539 | 9.4495 |

(4) Evaluation of Retardation Film

The obtained retardation film was a biaxial retardation film having an R value of 223 nm, a film thickness of 81 μm, and an $N_Z$ value of 0.7. The total light transmittance was 91% and the haze value was 0.6%.

Also, when the transmittance and the reflectance were measured by using a spectrophotometer (manufactured by Hitachi Ltd., trade name: U4000), the internal reflection was almost 0% at the observation wavelength of 550 nm.

Also, the cross-section of the retardation film was observed with a transmission electron microscope, and it was confirmed that the thickness was almost in accordance with the design.

The layer made from Spin coating solutions A and B were referred to as layer A and layer B, respectively, and the average optical anisotropy of each layer was obtained by using Formulae (10) to (12). The optical anisotropy of each layer in the multilayer structure of the retardation film is difficult to be measured directly. However, as mentioned above, the average optical anisotropy of each layer can be determined by using Formulae (10) to (12) and applying refractive index wavelength dispersion and birefringence wavelength dispersion which are intrinsic properties of the material constituting layer A and layer B, a film thickness of each layer, a number of layer, and wavelength dispersion data of the R value and the Rth value of the periodic structure. As a result, the average optical anisotropy was almost in accordance with the design, and furthermore it was confirmed that Formulae (3), (4) and (4') were satisfied.

Example 3

A periodic structure having a unit of the layer (a) having negative optical anisotropy and the layer (i) having approximate optical isotropy was designed, and the periodic structure was prepared according to the design.

(1) Preparation of Materials Constituting Layer (a) Having Negative Optical Anisotropy and Layer (i) Having Approximate Optical Isotropy Styrene-maleic anhydride copolymer (a3) (Dylark D332 (trade name) manufactured by NOVA Chemicals Corp.) was used as a polymer constituting the layer (a) having negative optical anisotropy On the other hand, polymethylmethacrylate (i3) (PARAPET G (trade name) manufactured by Kuraray Co., Ltd.) was used as a polymer constituting the layer (i) having approximate optical isotropy in the periodic structure.

After drying, each polymer material was provided to an extruder. The melt viscosities of polymer materials (a3) and (i3) were 500 Pa·s and 500 Pa·s, respectively.

(2) Preparation of Retardation Film Comprising One Periodic Structure

Each of the polymer materials (a3) and (i3) became molten at 260° C. in an extruder, and after going through a gear pump and a filter, the polymer materials (a3) and (i3) were combined at a feed block having 201 layers, and then were passed through 4 static mixers to provide a structure having 3201 layers, each of which has the same thickness. The structure was introduced to a die while maintaining the laminated state, and was cast onto a drum to form an unstretched multilayer film having 3201 layers in total which are alternately laminated polymer materials (a3) and (i3). In this example, the extrusion amounts of the polymer materials (a3) and (i3) were controlled to be 50:50. The resistance time (from the time when the materials were combined at the feed block to the time when the materials were extruded from the die) was about 50 seconds.

The unstretched multilayer film thus obtained was uniaxially stretched to 2.5 folds at 140° C. to obtain a retardation film comprising a periodic structure. The thickness of the retardation film was 90 μm, and the thickness of the layer (a) having negative optical anisotropy was 8 nm on average, and the thickness of the layer (i) having approximate optical isotropy was 8 nm on average, and the thickness of the blend region was 20 nm.

The properties of the obtained multilayer retardation film are shown in Table 41. It was found that the three-dimensional refractive indices were able to be controlled so as to give an $N_Z$ value of 0.5 at the observation wavelength of 550 nm.

TABLE 41

| Total film thickness (nm) | Average film thickness of layer (a) (nm) | Average film thickness of layer (i) (nm) |
|---|---|---|
| 90000 | 8 | 8 |

| λ (nm) | R (nm) | Rth (nm) | Nz |
|---|---|---|---|
| 450 | 298 | 17 | 0.6 |
| 550 | 279 | 1 | 0.5 |
| 650 | 269 | −7 | 0.5 |

| R (450)/ R (550) | R (650)/ R (550) | Rth (450)/ Rth (550) | Rth (650)/ Rth (550) |
|---|---|---|---|
| 1.07 | 0.96 | 19.61 | −7.91 |

The optical properties of a single resin constituting each layer of the periodic structure, which were measured by a method described in the above (6-i) are shown in Table 42. $|n_x-n_y|$ (average in-plane refractive index differences of the layer (a) having negative optical anisotropy and the layer (i) having approximate optical isotropy) are shown in Table 43. $|n_x-n_y|$ was calculated from the parameters of each layer of the periodic structure which were determined by the methods described in the above (6). The in-plane slow axes of the layer (a) having negative optical anisotropy and the layer (i) having approximate optical isotropy were approximately perpendicular to the stretching direction. Also, the in-plane slow axis direction of the entire retardation film was approximately perpendicular to the stretching direction.

TABLE 42

| | Optical property of resin constituting each layer | |
|---|---|---|
| | Material (a3) (negatively anisotropic) | Material (i3) (isotropic) |
| n(450) | 1.6014 | 1.4999 |
| n(550) | 1.5853 | 1.4924 |
| n(650) | 1.5764 | 1.4880 |
| n(450)/n(550) | 1.07 | 1.04 |
| n(650)/n(550) | 0.97 | 0.98 |

TABLE 43

| λ = 550 nm | Layer (a) | Layer (i) |
|---|---|---|
| $|n_x - n_y|$ | 0.006 | 0.0001 |

It was found that Formula (3) is satisfied at an observation wavelength of 550 nm.

Example 4

A periodic structure having a unit of the layer (a) having negative optical anisotropy and layer (b) having negative optical anisotropy was designed, and the periodic structure was prepared according to the design.

(1) Preparation of Materials Constituting Layer (a) Having Negative Optical Anisotropy Styrene-maleic anhydride copolymer (a4) (Dylark D332 (trade name) manufactured by NOVA Chemicals Corp.) was used as a polymer constituting the layer (a) having negative optical anisotropy.

(2) Preparation of Materials Constituting Layer (b) Having Negative Optical Anisotropy 950 parts by mass of a styrene polymer (Highmer ST-95 manufactured by Sanyo Chemical Industries, Ltd.) was dissolved in 3250 parts by mass of cyclohexane, and the polymer solution was put into a stainless autoclave, and then, 650 parts by mass of methyl t-butyl ether and 80 parts by mass of a nickel/silica-alumina catalyst (manufactured by Aldrich, Ni loading amount is 65 mass %) were added and a hydrogenation reaction was conducted for three hours at 180° C. under an hydrogen pressure of 9.81 MPa to obtain a hydrogenated polystyrene (b4) having a hydrogenated ratio of 99.9 mol % and Tg of 148° C., as a material constituting the layer (b) having negative optical anisotropy. The melt viscosity was 700 Pa·s.

(3) Preparation of Multilayer Structure

The styrene-maleic anhydride copolymer (a4) was used as a polymer constituting the layer (a) having negative optical anisotropy, while the hydrogenated polystyrene (b4) was used as a material constituting the layer (b) having negative optical anisotropy. Each polymer material was provided to an extruder after the material was dried.

Each of the polymer materials became molten at 280° C. in an extruder, and after going through a gear pump and a filter, the polymer materials were combined at a feed block having 201 layers, and then were passed through 4 static mixers to provide a structure having 3201 layers, each of which has the same thickness. The structure was introduced to a die while maintaining the laminated state, and was cast onto a drum to form an unstretched multilayer film having 3201 layers in total which are alternately laminated polymer materials (a4) and (b4) for the layers (a) and (b) having negative optical anisotropies. In this example, the extrusion amounts of polymer materials of (a4) and (b4) were controlled to be 41:59. The resistance time (from the time when the materials were combined at the feed block to the time when the materials were extruded from the die) was about 10 seconds.

The unstretched multilayer film thus obtained was uniaxially stretched to 2.8 folds at 150° C. to obtain a retardation film comprising a periodic structure. The thickness of the retardation film was 45 μm, and the thickness of the layer (a) having negative optical anisotropy was 11 nm on average, and the thickness of the layer (b) having negative optical anisotropy was 16 nm on average, and almost no blend region was observed. The properties of the obtained multilayer retardation film are shown in Table 44. It was found that the three-dimensional refractive indices were able to be controlled so as to give an $N_Z$ value of 0.5 at the observation wavelength of 550 nm.

TABLE 44

| Total film thickness (nm) | Average film thickness of layer (a) (nm) | Average film thickness of layer (i) (nm) |
|---|---|---|
| 45000 | 11 | 16 |

| λ (nm) | R (nm) | Rth (nm) | Nz |
|---|---|---|---|
| 450 | 142 | 26 | 0.7 |
| 550 | 141 | 4 | 0.5 |
| 650 | 140 | −6 | 0.5 |

| R (450)/ R (550) | R (650)/ R (550) | Rth (450)/ Rth (550) | Rth (650)/ Rth (550) |
|---|---|---|---|
| 1.01 | 1.00 | 6.08 | −1.47 |

The optical properties of a single resin constituting each layer, which are measured by a method described in the above (6-i), are shown in Table 45. $|n_x-n_y|$ (average in-plane refractive index differences of the layers (a) and (b) having negative optical anisotropies) are shown in Table 46. $|n_x-n_y|$ was calculated from the parameters of each layer determined by the methods described in the above (6). The in-plane slow axes of the layers (a) and (b) were approximately perpendicular to the stretching direction. Also, the in-plane slow axis direction of the entire retardation film was approximately perpendicular to the stretching direction.

TABLE 45

| | Optical property of resin constituting each layer | |
|---|---|---|
| | Material (a4) (negatively anisotropic) | Material (b4) (negatively anisotropic) |
| n(450) | 1.6014 | 1.5166 |
| n(550) | 1.5853 | 1.5113 |
| n(650) | 1.5764 | 1.5082 |
| n(450)/n(550) | 1.07 | 0.94 |
| n(650)/n(550) | 0.97 | 1.03 |

TABLE 46

| λ = 550 nm | Layer (a) | Layer (b) |
|---|---|---|
| $|n_x - n_y|$ | 0.004 | 0.0025 |

It was found that Formula (3) is satisfied at an observation wavelength of 550 nm.

Example 5

A periodic structure having a unit of the layer (a) having negative optical anisotropy and the layer (i) having approximate optical isotropy was designed, and the periodic structure was prepared according to the design.

(1) Preparation of Materials Constituting Layer (a) Having Negative Optical Anisotropy and Layer (i) Having Approximate Optical Isotropy Styrene-maleic anhydride copolymer (a5) (Dylark D332 (trade name) manufactured by NOVA Chemicals Corp.) was used as a polymer constituting the layer (a). On the other hand, polymethylmethacrylate (i5) (PARAPET G (trade name) manufactured by Kuraray Co., Ltd.) was used as a polymer constituting the layer (i). Each polymer material was provided to an extruder after drying the each material. The melt viscosities of polymer materials (a5) and (i5) were 500 Pa·s and 500 Pa·s, respectively.

(2) Preparation of Multilayer Structure

Each of the polymer materials (a5) and (i5) became molten at 260° C. in an extruder, and after going through a gear pump and a filter, the polymer materials (a5) and (i5) were combined by a feed block having 201 layers, and then were passed through quartering-doubling, wherein the combined materials were divided into quarters in the width direction and they were rearranged in a thickness direction, to provide a structure having 801 layers, each of the which has the same thickness. The structure was introduced to a die while maintaining the laminated state, and was cast onto a drum to form an unstretched multilayer film having 801 layers in total which are alternately laminated polymer materials (a5) and (i5). In this example, the extrusion amounts of the polymer materials (a5) and (i5) were controlled to be 71:29. The resistance time (from the time when the materials were combined at the feed block to the time when the materials were extruded from the die) was about 30 seconds.

The unstretched multilayer film thus obtained was uniaxially stretched to 2.2 folds at 140° C. to obtain a retardation film comprising a periodic structure. The thickness of the retardation film was 30 μm, the thickness of the layer (a) having negative optical anisotropy was 42 nm on average, the thickness of the layer (i) having approximate optical isotropy was 11 nm on average, and the thickness of the blend region was 11 nm on average. The properties of the obtained multilayer retardation film are shown in Table 47. It was found that the three-dimensional refractive indices were able to be controlled so as to give an $N_Z$ value of 0.3 at the observation wavelength of 550 nm.

TABLE 47

| Total film thickness (nm) | Average film thickness of layer (a) (nm) | Average film thickness of layer (i) (nm) |
|---|---|---|
| 30000 | 42 | 11 |

| λ (nm) | R (nm) | Rth (nm) | Nz |
|---|---|---|---|
| 450 | 93 | −9 | 0.4 |
| 550 | 87 | −14 | 0.3 |
| 650 | 84 | −17 | 0.3 |

| R (450)/ R (550) | R (650)/ R (550) | Rth (450)/ Rth (550) | Rth (650)/ Rth (550) |
|---|---|---|---|
| 1.07 | 0.96 | 0.63 | 1.17 |

The optical properties of a single resin constituting each layer, which are measured by a method described in the above (6-i), are shown in Table 48. $|n_x-n_y|$ (average in-plane refractive index differences of the layer (a) having negative optical anisotropy and the layer (i) having approximate optical isotropy) are shown in Table 49. $|n_x-n_y|$ was calculated from the parameters of each layer determined by the methods described in the above (6). The in-plane slow axes of the layer (a) having negative optical anisotropy and the layer (i) having approximate optical isotropy were approximately perpendicular to the stretching direction. Also, the in-plane slow axis direction of the entire retardation film was approximately perpendicular to the stretching direction.

TABLE 48

| | Optical property of resin constituting each layer | |
|---|---|---|
| | Material (a5) (negatively anisotropic) | Material (i5) (isotropic) |
| n(450) | 1.6014 | 1.4999 |
| n(550) | 1.5853 | 1.4924 |
| n(650) | 1.5764 | 1.4880 |
| n(450)/n(550) | 1.07 | 1.04 |
| n(650)/n(550) | 0.97 | 0.98 |

TABLE 49

| λ = 550 nm | Layer (a) | Layer (i) |
|---|---|---|
| $|n_x - n_y|$ | 0.004 | 0.0001 |

It was found that Formula (3) is satisfied at an observation wavelength of 550 nm.

Example 6

A periodic structure having a unit of the layer (a) having negative optical anisotropy and the layer (i) having approximate optical isotropy was designed, and the periodic structure was prepared according to the design.

(1) Preparation of Materials Constituting Layer (a) Having Negative Optical Anisotropy and Layer (i) Having Approximate Optical Isotropy Styrene-maleic anhydride copolymer (a6) (Dylark D332 (trade name) manufactured by NOVA Chemicals Corp.) was used as a polymer constituting the layer (a). On the other hand, polymethylmethacrylate (i6) (PARAPET G (trade name) manufactured by Kuraray Co., Ltd.) was used as a polymer constituting the layer (i). Each polymer material was provided to an extruder after drying the each material. The melt viscosities of polymer materials (a6) and (i6) were 500 Pa·s and 500 Pa·s, respectively.

(2) Preparation of Multilayer Structure

Each of the polymer materials (a6) and (i6) became molten at 260° C. in an extruder, and after going through a gear pump and a filter, the polymer materials (a6) and (i6) were combined at a feed block having 201 layers to provide a structure having 201 layers, each of which has the same thickness. The structure was introduced to a die while maintaining the laminated state, the thermoplastic resin (i6) was further combined on the both sides of the outermost layers of the laminated structure, the obtained laminate was cast onto a drum to form an unstretched multilayer film having 203 layers in total wherein the polymer materials (a6) and (i6) were alternately laminated. In this example, the extrusion amounts of the polymer materials (a6) and (i6) were controlled to be 50:50. The resistance time (from the time when the materials were combined at the feed block to the time when the materials were extruded from the die) was about 30 seconds.

The unstretched multilayer film thus obtained was uniaxially stretched to 2.6 folds at 140° C. to obtain a retardation film comprising a periodic structure. The thickness of the retardation film was 24 µm, the thickness of the layer (a) having negative optical anisotropy was 30 nm on average, the thickness of the layer (i) having approximate optical isotropy was 30 nm on average, and the thickness of the blend region was 30 nm on average. The properties of the obtained multilayer retardation film are shown in Table 50. It was found that the three-dimensional refractive indices were able to be controlled so as to give an $N_z$ value of 0.3 at the observation wavelength of 550 nm.

TABLE 50

| Total film thickness (nm) | Average film thickness of layer (a) (nm) | Average film thickness of layer (i) (nm) |
|---|---|---|
| 24000 | 30 | 30 |

| λ (nm) | R (nm) | Rth (nm) | Nz |
|---|---|---|---|
| 450 | 40 | −4 | 0.4 |
| 550 | 37 | −6 | 0.3 |
| 650 | 36 | −7 | 0.3 |

| R (450)/ R (550) | R (650)/ R (550) | Rth (450)/ Rth (550) | Rth (650)/ Rth (550) |
|---|---|---|---|
| 1.07 | 0.96 | 0.61 | 1.18 |

The optical properties of a single resin constituting each layer, which are measured by a method described in the above (6-i), are shown in Table 51. $|n_x-n_y|$ (average in-plane refractive index differences of the layer (a) having negative optical anisotropy and the layer (i) having approximate optical isotropy) are shown in Table 52. $|n_x-n_y|$ was calculated from the parameters of each layer determined by the methods described in the above (6). The in-plane slow axes of the layer (a) having negative optical anisotropy and the layer (i) having approximate optical isotropy were approximately perpendicular to the stretching direction. Also, the in-plane slow axis direction of the entire retardation film was approximately perpendicular to the stretching direction.

TABLE 51

| | Optical property of resin constituting each layer | |
|---|---|---|
| | Material (a6) (negatively anisotropic) | Material (i6) (isotropic) |
| n(450) | 1.6014 | 1.4999 |
| n(550) | 1.5853 | 1.4924 |
| n(650) | 1.5764 | 1.4880 |
| n(450)/n(550) | 1.07 | 1.04 |
| n(650)/n(550) | 0.97 | 0.98 |

TABLE 52

| λ = 550 nm | Layer (a) | Layer (i) |
|---|---|---|
| $|n_x - n_y|$ | 0.006 | 0.0001 |

It was found that Formula (3) is satisfied at an observation wavelength of 550 nm.

Example 7

A retardation film was prepared by the multilayer extrusion in the same way as that of Example 3, except for other resin layers provided on both sides of the periodic structure in order to change the mechanical properties. As a resin X7 constituting the other resin layers, an ethylene copolymer resin (manufactured by Sumitomo Chemical Co., Ltd., trade name: Acryft WH206) was used. The mechanical properties of the resin are shown in Table 53.

Two kinds of thermoplastic resins (a3) and (i3) constituting the periodic structure were molten at 260° C. in an extruder, and after going through a gear pump and a filter, the thermoplastic resins (a3) and (i3) were combined at a feed block having 201 layers, and then were passed through 4 static mixers to provide a structure having 3201 layers, each of which has the same thickness. The structure was introduced to a die while maintaining the laminated state, and after further combining the resin (X7) on the both sides of outermost layers of the laminated structure, the structure was cast onto a drum to form a film laminated with the resin (X7) on both sides of the periodic structure having 3201 layers in total. In this example, the extrusion amounts of the thermoplastic resins (a3) and (i3) were controlled to be 50:50. The resistance time (from the time when the materials were combined at the feed block to the time when the materials were extruded from the die) was about 50 seconds.

The unstretched multilayer film thus obtained was uniaxially stretched to 2.5 folds at 140° C. to obtain a multilayer retardation film. The thickness of the multilayer retardation film was 120 µm, and the thickness of each of both outermost layers comprising resin X7 was 15 µm. The optical properties and the average film thickness of each layer of the periodic structure were almost the same as those in Example 3.

The mechanical properties of the retardation film comprising the periodic structure prepared in this example are shown in Table 53.

TABLE 53

| Periodic structure | Rupture strength (MPa) | 84.9 |
|---|---|---|
| | Rupture elongation (%) | 6.0 |
| | Surface impact fracture energy (J/μm) | $9 \times 10^{-5}$ |
| Resin (X7) | Rupture strength (MPa) | 22.4 |
| | Rupture elongation (%) | 1120 |
| | Surface impact fracture energy (J/μm) | $1.6 \times 10^{-3}$ |
| | Dynamic storage elastic modulus (Pa) | $9.1 \times 10^7$ |
| | Dynamic loss elastic modulus (Pa) | $8.2 \times 10^5$ |

Industrial Applicability

The retardation film of the present invention uses both molecular-orientation birefringence and form birefringence, thus the optical anisotropy and the wavelength dispersion property difficult to be achieved in a conventional method can be achieved. Therefore, the retardation film of the present invention, when applied to a liquid crystal display device independently or in combination with a polarization plate or other retardation films, can greatly contribute to the high performance of the display device, especially the widening of the viewing angle.

The invention claimed is:

1. A retardation film, wherein the film comprises a periodic structure which has a unit of at least two layers having different average refractive indices from each other, wherein the periodic structure exhibits form birefringence, and wherein at least one layer of the at least two layers is a layer (A) having optical anisotropy due to molecular-orientation birefringence.

2. The retardation film according to claim 1, wherein the layer (A) having optical anisotropy due to molecular-orientation birefringence has optical anisotropy within a plane due to molecular-orientation birefringence.

3. The retardation film according to claim 1, wherein the layer (A) having optical anisotropy due to molecular-orientation birefringence is a layer (a) having negative optical anisotropy due to molecular-orientation birefringence.

4. The retardation film according to claim 1, wherein at least one other layer of the at least two layers is a layer (i) having approximate optical isotropy or a layer (b) having negative optical anisotropy due to molecular-orientation birefringence.

5. The retardation film according to claim 1, wherein the optical thickness (nd (nm)) of each layer of the unit in the periodic structure is λ/5 or less.

6. The retardation film according to claim 1, wherein the number of layers constituting the periodic structure is from 100 to 30000.

7. The retardation film according to claim 4, wherein the periodic structure satisfies the following formula (2):

$$0.001 < |\delta n| < 0.5 \tag{2}$$

(wherein, δn represents a difference between an average refractive index of the layer (a) having negative optical anisotropy and an average refractive index of the layer (i) having approximate optical isotropy or the layer (b) having negative optical anisotropy).

8. The retardation film according to claim 4, wherein the layer (a) having negative optical anisotropy and/or the layer (b) having negative optical anisotropy satisfies the following formula (1):

$$0.0001 < |n_{nx} - n_{ny}| < 0.1 \tag{1}$$

(wherein,
$n_{nx}$: the three-dimensional refractive index in the x-axis direction of the layer (a) having negative optical anisotropy or the layer (b) having negative optical anisotropy;
$n_y$: the three-dimensional refractive index in the y-axis direction of the layer (a) having negative optical anisotropy or the layer (b) having negative optical anisotropy;
x axis: the slow axis of the periodic structure within a plane of the periodic structure;
y axis: the axis perpendicular to the x axis within a plane of the periodic structure).

9. The retardation film according to claim 1, wherein an orientation index in a thickness direction ($N_z (\lambda)$) of the periodic structure satisfies the following formula (5):

$$0 < N_z < 1 \tag{5}$$

{wherein, $$Nz = \frac{n_x - n_z}{n_x - n_y} \tag{20}$$

(wherein,
$n_x$: the three-dimensional refractive index in the x-axis direction of the periodic structure;
$n_y$: the three-dimensional refractive index in the y-axis direction of the periodic structure;
$n_z$: the three-dimensional refractive index in the z-axis direction of the periodic structure;
x axis: the slow axis of the periodic structure within a plane of the periodic structure;
y axis: the axis perpendicular to the x axis within a plane of the periodic structure;
z axis: the axis in the normal direction of a plane of the periodic structure)}.

10. The retardation film according to claim 1, wherein molecular-orientation birefringence is exhibited by a molecular orientation of a polymer constituting the layer (A) having optical anisotropy.

11. The retardation film according to claim 3, wherein the layer (a) having negative optical anisotropy comprises a polymer having negative molecular polarizability anisotropy.

12. The retardation film according to claim 4, wherein the layer (i) having approximate optical isotropy is made of a polymer.

13. The retardation film according to claim 1, wherein an in-plane retardation value (R (nm)) of the periodic structure satisfies the following formula (6):

$$10 \text{ nm} < R < 1000 \text{ nm} \tag{6}$$

14. The retardation film according to claim 1, wherein molecular-orientation birefringence is exhibited by stretching.

15. The retardation film according to claim 1, wherein the retardation film is obtained by forming a multilayer film by multilayer melt extrusion of polymers and then stretching the multilayer film.

16. The retardation film according to claim 1, wherein an absolute value of a photoelastic coefficient is $15 \times 10^{-12} \text{ Pa}^{-1}$ or less.

17. The retardation film according to claim 1, wherein the retardation film has a protective film (X) laminated on the both sides thereof, and wherein the protective film (X) is made of a thermoplastic resin composition (P) having a rupture strength of 10 to 50 MPa, a rupture elongation of 300 to 1500%, a surface impact fracture energy of $5\times10^{-4}$ J/μm or more, and a dynamic storage elastic modulus and a dynamic loss elastic modulus of $1\times10^5$ to $2\times10^8$ Pa at −40° C. and a frequency of 1 Hz, and is approximately optically isotropic.

18. The retardation film according to claim 1, wherein the layer (A) having negative optical anisotropy due to molecular-orientation birefringence is made of a styrene resin comprising a copolymer of styrene and maleic anhydride at a styrene/maleic anhydride copolymerization molar ratio of 70/30 to 86/14, and has a photoelastic coefficient of $8\times10^{-12}$ $Pa^{-1}$ or less.

19. The retardation film according to claim 1, wherein the retardation film has observation wavelengths λ (nm) and λ' (nm) (400 nm $\leq$ λ<λ'$\leq$ 700 nm) satisfying the following relationship:

$$|\{Rth(\lambda)/Rth(\lambda')\}-\{R(\lambda)/R(\lambda')\}| \geq 0.1.$$

20. The retardation film according to claim 1, wherein the retardation film has observation wavelengths λ (nm) and λ' (nm) (400 nm $\leq$ λ<λ'$\leq$ 700 nm) satisfying the following relationship:

one of $\{R(\lambda)/R(\lambda')\}$ and $\{Rth(\lambda)/Rth(\lambda')\}$ is less than one, and the other is more than one.

21. The retardation film according to claim 1,
wherein the layer (A) having optical anisotropy due to molecular-orientation birefringence is a layer (a) having negative optical anisotropy due to molecular-orientation birefringence, and at least one other layer of the at least two layers is a layer (i) having approximate optical isotropy,
wherein the layer (a) having negative optical anisotropy and the layer (i) having approximate optical isotropy have optical anisotropies within planes due to molecular-orientation birefringence, and
wherein the slow axis of the layer (a) having negative optical anisotropy and the slow axis of the layer (i) having approximate optical isotropy are arranged in approximately perpendicular or approximately parallel to each other.

22. The retardation film according to claim 1,
wherein the layer (A) having optical anisotropy due to molecular-orientation birefringence is a layer (a) having negative optical anisotropy due to molecular-orientation birefringence, and at least one other layer of the at least two layers is a layer (b) having negative optical anisotropy due to molecular-orientation birefringence, and the layer (a) having negative optical anisotropy and the layer (b) having negative optical anisotropy have optical anisotropies within planes due to molecular-orientation birefringence, and
wherein the slow axis of the layer (a) having negative optical anisotropy and the slow axis of the layer (b) having negative optical anisotropy are arranged in approximately parallel to each other.

23. The retardation film according to claim 1, wherein the periodic structure comprises a unit of a layer (a) having negative optical anisotropy, and a layer (i) having approximate optical isotropy or a layer (b) having negative optical anisotropy, and
wherein when the periodic structure comprises a unit of the layer (a) having negative optical anisotropy and the layer (i) having approximate optical isotropy, the following formulae (3) and (4) are satisfied, and when the periodic structure comprises a unit of the layer (a) having negative optical anisotropy and the layer (b) having negative optical anisotropy, the following formulae (3), (4) and (4') are satisfied:

$$\sqrt{d_1 n_{1x}^2 + d_2 n_{2x}^2} > \frac{d_1 + d_2}{\sqrt{d_1 n_{1z}^{-2} + d_2 n_{2z}^{-2}}} > \sqrt{d_1 n_{1y}^2 + d_2 n_{2y}^2} \quad (3)$$

$$n_{1x} \leq n_{1z} \quad (4)$$

$$n_{2x} \leq n_{2z} \quad (4')$$

(wherein,
$d_1$: the film thickness (nm) of the layer (a) having negative optical anisotropy;
$d_2$: the film thickness (nm) of the layer (i) having approximate optical isotropy or the layer (b) having negative optical anisotropy;
$n_{1x}$: the three-dimensional refractive index in the x-axis direction of the layer (a) having negative optical anisotropy;
$n_{1y}$: the three-dimensional refractive index in the y-axis direction of the layer (a) having negative optical anisotropy;
$n_{1z}$: the three-dimensional refractive index in the z-axis direction of the layer (a) having negative optical anisotropy;
$n_{2x}$: the three-dimensional refractive index in the x-axis direction of the layer (i) having approximate optical isotropy or the layer (b) having negative optical anisotropy;
$n_{2y}$: the three-dimensional refractive index in the y-axis direction of the layer (i) having approximate optical isotropy or the layer (b) having negative optical anisotropy;
$n_{2z}$: the a three-dimensional refractive index in the z-axis direction of the layer (i) having approximate optical isotropy or the layer (b) having negative optical anisotropy;
x axis: the slow axis of the periodic structure within a plane of the periodic structure;
y axis: the axis perpendicular to the x axis within a plane of the periodic structure;
z axis: the axis in the normal direction of a plane of the periodic structure).

24. The retardation film according to claim 1, wherein the periodic structure comprises a unit of a layer (a) having negative optical anisotropy, and a layer (i) having approximate optical isotropy or a layer (b) having negative optical anisotropy, and has observation wavelengths λ (nm) and λ' (nm) (400 nm $\leq$ λ<λ'$\leq$ 700 nm) satisfying the following formula (200):

$$\left| \frac{\sqrt{d_1 n_{1x}^2(\lambda) + d_2 n_{2x}^2(\lambda)} + \sqrt{d_1 n_{1y}^2(\lambda) + d_2 n_{2y}^2(\lambda)} - \frac{2(d_1 + d_2)}{\sqrt{d_1 n_{1z}^{-2}(\lambda) + d_2 n_{2z}^{-2}(\lambda)}}}{\sqrt{d_1 n_{1x}^2(\lambda') + d_2 n_{2x}^2(\lambda')} + \sqrt{d_1 n_{1y}^2(\lambda') + d_2 n_{2y}^2(\lambda')} - \frac{2(d_1 + d_2)}{\sqrt{d_1 n_{1z}^{-2}(\lambda') + d_2 n_{2z}^{-2}(\lambda')}}} - \right. \quad (200)$$

$$\left| \frac{\sqrt{d_1 n_{1x}^2(\lambda) + d_2 n_{2x}^2(\lambda)} - \sqrt{d_1 n_{1y}^2(\lambda) + d_2 n_{2y}^2(\lambda)}}{\sqrt{d_1 n_{1x}^2(\lambda') + d_2 n_{2x}^2(\lambda')} - \sqrt{d_1 n_{1y}^2(\lambda') + d_2 n_{2y}^2(\lambda')}} \right| \geq 0.1$$

(wherein, $d_1$: the film thickness (nm) of the layer (a) having negative optical anisotropy;

$d_2$: the film thickness (nm) of the layer (i) having approximate optical isotropy or the layer (b) having negative optical anisotropy;

$n_{1x}$: the three-dimensional refractive index in the x-axis direction of the layer (a) having negative optical anisotropy;

$n_{1y}$: the three-dimensional refractive index in the y-axis direction of the layer (a) having negative optical anisotropy;

$n_{1z}$: the three-dimensional refractive index in the z-axis direction of the layer (a) having negative optical anisotropy;

$n_{2x}$: the three-dimensional refractive index in the x-axis direction of the layer (i) having approximate optical isotropy or the layer (b) having negative optical anisotropy;

$n_{2y}$: the three-dimensional refractive index in the y-axis direction of the layer (i) having approximate optical isotropy or the layer (b) having negative optical anisotropy;

$n_{2z}$: the a three-dimensional refractive index in the z-axis direction of the layer (i) having approximate optical isotropy or the layer (b) having negative optical anisotropy;

x axis: the slow axis of the periodic structure within a plane of the periodic structure;

y axis: the axis perpendicular to the x axis within a plane of the periodic structure;

z axis: the axis in the normal direction of a plane of the periodic structure).

25. The retardation film according to claim 1, wherein the periodic structure comprises a unit of a layer (a) having negative optical anisotropy, and a layer (i) having approximate optical isotropy or a layer (b) having negative optical anisotropy, and has observation wavelengths λ (nm) and λ' (nm) (400 nm $\leq \lambda < \lambda' \leq$ 700 nm) satisfying that one of the following formulae (100) and (100') is less than one, and the other is more than one:

$$\frac{\sqrt{d_1 n_{1x}^2(\lambda) + d_2 n_{2x}^2(\lambda)} - \sqrt{d_1 n_{1y}^2(\lambda) + d_2 n_{2y}^2(\lambda)}}{\sqrt{d_1 n_{1x}^2(\lambda') + d_2 n_{2x}^2(\lambda')} - \sqrt{d_1 n_{1y}^2(\lambda') + d_2 n_{2y}^2(\lambda')}} \quad (100)$$

$$\frac{\sqrt{d_1 n_{1x}^2(\lambda) + d_2 n_{2x}^2(\lambda)} + \sqrt{d_1 n_{1y}^2(\lambda) + d_2 n_{2y}^2(\lambda)} - \frac{2(d_1 + d_2)}{\sqrt{d_1 n_{1z}^{-2}(\lambda) + d_2 n_{2z}^{-2}(\lambda)}}}{\sqrt{d_1 n_{1x}^2(\lambda') + d_2 n_{2x}^2(\lambda')} + \sqrt{d_1 n_{1y}^2(\lambda') + d_2 n_{2y}^2(\lambda')} - \frac{2(d_1 + d_2)}{\sqrt{d_1 n_{1z}^{-2}(\lambda') + d_2 n_{2z}^{-2}(\lambda')}}} \quad (100')$$

(wherein, $d_1$: the film thickness (nm) of the layer (a) having negative optical anisotropy;

$d_2$: the film thickness (nm) of the layer (i) having approximate optical isotropy or the layer (b) having negative optical anisotropy;

$n_{1x}$: the three-dimensional refractive index in the x-axis direction of the layer (a) having negative optical anisotropy;

$n_{1y}$: the three-dimensional refractive index in the y-axis direction of the layer (a) having negative optical anisotropy;

$n_{1z}$: the three-dimensional refractive index in the z-axis direction of the layer (a) having negative optical anisotropy;

$n_{2x}$: the three-dimensional refractive index in the x-axis direction of the layer (i) having approximate optical isotropy or the layer (b) having negative optical anisotropy;

$n_{2y}$: the three-dimensional refractive index in the y-axis direction of the layer (i) having approximate optical isotropy or the layer (b) having negative optical anisotropy;

$n_{2z}$: the three-dimensional refractive index in the z-axis direction of the layer (i) having approximate optical isotropy or the layer (b) having negative optical anisotropy;

x axis: the slow axis of the periodic structure within a plane of the periodic structure;

y axis: the axis perpendicular to the x axis within a plane of the periodic structure;

z axis: the axis in the normal direction of a plane of the periodic structure).

26. A laminated polarizing film, wherein the laminated polarizing film is a laminate of the retardation film of claim 1 and a polarizing film.

27. A liquid crystal display device, provided with the retardation film of claim 1.

* * * * *